US011953788B2

(12) United States Patent
Hakoi

(10) Patent No.: US 11,953,788 B2
(45) Date of Patent: Apr. 9, 2024

(54) LIQUID CRYSTAL DISPLAY DEVICE COMPRISING A REFLECTIVE PIXEL REGION HAVING A PLURALITY OF LIQUID CRYSTAL DOMAINS WHICH ARE DIFFERENT FROM EACH OTHER

(71) Applicant: Sharp Display Technology Corporation, Kameyama (JP)

(72) Inventor: Hiroyuki Hakoi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/132,845

(22) Filed: Apr. 10, 2023

(65) Prior Publication Data
US 2023/0324742 A1  Oct. 12, 2023

(30) Foreign Application Priority Data

Apr. 12, 2022 (JP) ................................ 2022-065600

(51) Int. Cl.
| | | |
|---|---|---|
| G02F 1/1337 | (2006.01) | |
| G02F 1/1335 | (2006.01) | |
| G02F 1/13363 | (2006.01) | |
| G02F 1/1343 | (2006.01) | |

(52) U.S. Cl.
CPC .. G02F 1/133753 (2013.01); G02F 1/133541 (2021.01); G02F 1/133638 (2021.01); G02F 1/133788 (2013.01); G02F 1/134336 (2013.01); G02F 1/13439 (2013.01)

(58) Field of Classification Search
CPC ......... G02F 1/133769; G02F 1/133371; G02F 2203/09; G02F 2201/34
See application file for complete search history.

(56) References Cited

U.S. PATENT DOCUMENTS

| | | | |
|---|---|---|---|
| 6,512,564 B1 | 1/2003 | Yoshida et al. | |
| 2007/0076148 A1* | 4/2007 | Yang ................. | G02F 1/133555 349/114 |

(Continued)

FOREIGN PATENT DOCUMENTS

| | | |
|---|---|---|
| JP | H11-133429 A | 5/1999 |
| JP | 2000-122094 A | 4/2000 |

(Continued)

*Primary Examiner* — Paul C Lee
(74) *Attorney, Agent, or Firm* — ScienBiziP, P.C.

(57) ABSTRACT

A liquid crystal display device includes a first substrate, a second substrate located closer to an observer than the first substrate, and a liquid crystal layer provided between the first substrate and the second substrate, and performs display in a twisted vertical alignment mode. Each pixel includes a reflective region where display is performed in a reflection mode. The first substrate includes a reflective electrode including a portion located in the reflective region, and a first vertical alignment film. The second substrate includes a second vertical alignment film. The liquid crystal layer includes a liquid crystal material having negative dielectric anisotropy, and a chiral agent. The reflective electrode includes silver or a silver alloy. The reflective region includes a plurality of liquid crystal domains in which reference alignment azimuths of liquid crystal molecules are different from each other.

12 Claims, 49 Drawing Sheets

(56) References Cited

U.S. PATENT DOCUMENTS

| | | | |
|---|---|---|---|
| 2007/0195241 A1* | 8/2007 | Lim | G02F 1/133555 349/114 |
| 2008/0143911 A1* | 6/2008 | Jin | G02F 1/134336 349/48 |
| 2008/0198310 A1* | 8/2008 | Kim | G02F 1/133555 349/106 |
| 2009/0279044 A1 | 11/2009 | Hakoi et al. | |
| 2010/0279445 A1* | 11/2010 | Shin | G02F 1/133555 257/E21.158 |
| 2014/0342104 A1 | 11/2014 | Tauchi et al. | |
| 2016/0187740 A1* | 6/2016 | Lin | G02F 1/1337 349/113 |
| 2021/0165274 A1 | 6/2021 | Sasaki et al. | |
| 2021/0181576 A1 | 6/2021 | Sasaki et al. | |

FOREIGN PATENT DOCUMENTS

| | | |
|---|---|---|
| JP | 3394926 B2 | 4/2003 |
| JP | 2003-131268 A | 5/2003 |
| JP | 2008-015228 A | 1/2008 |
| JP | 2009-517697 A | 4/2009 |
| JP | 2013-151735 A | 8/2013 |
| JP | 2021-086097 A | 6/2021 |
| JP | 2021-096461 A | 6/2021 |
| WO | 2012/108313 A1 | 8/2012 |

* cited by examiner

ACTUALLY MEASURED CR VIEWING ANGLE CHARACTERISTICS OF COMPARATIVE EXAMPLE 1: TRANSMISSIVE DISPLAY

CALCULATED CR VIEWING ANGLE CHARACTERISTICS
OF EXAMPLE 1: TRANSMISSIVE DISPLAY

CALCULATED CR VIEWING ANGLE CHARACTERISTICS
OF EXAMPLE 2: REFLECTIVE DISPLAY

FIRST ALIGNMENT REGION

SECOND ALIGNMENT REGION

FIRST ALIGNMENT REGION
+
SECOND ALIGNMENT REGION

LIQUID CRYSTAL DISPLAY DEVICE COMPRISING A REFLECTIVE PIXEL REGION HAVING A PLURALITY OF LIQUID CRYSTAL DOMAINS WHICH ARE DIFFERENT FROM EACH OTHER

CROSS-REFERENCE TO RELATED APPLICATIONS

This application claims the benefit of priority to Japanese Patent Application Number 2022-065600 filed on Apr. 12, 2022. The entire contents of the above-identified application are hereby incorporated by reference.

BACKGROUND

Technical Field

The disclosure relates to a liquid crystal display device, and particularly relates to a liquid crystal display device in which each pixel has a reflective region.

Liquid crystal display devices (hereinafter also referred to as "LCDs") are generally roughly classified into a transmissive LCD and a reflective LCD. The transmissive LCD performs display in a transmission mode using light emitted from a backlight. On the other hand, the reflective LCD performs display in a reflection mode using ambient light. An LCD has been also proposed in which each pixel includes a reflective region for performing display in the reflection mode, and a transmissive region for performing display in the transmission mode. Such an LCD is referred to as a transflective or transmissive/reflective dual-mode LCD.

Reflective and transflective LCDs are, for example, suitable for use as medium or small display devices for mobile applications used outside. An example of the reflective LCD is disclosed in JP 2000-122094 A. An example of the transflective LCD is disclosed in JP 2003-131268 A. A twisted vertical alignment (TVA) mode is known as one of display modes of the reflective and transflective LCDs. In recent years, application of reflective and transflective LCDs to digital signage used for bus stop timetables and outdoor advertisements has been also considered.

SUMMARY

However, the reflective (or transflective) LCD using the TVA mode has a problem of having poor viewing angle characteristics and a low contrast ratio in a specific azimuth. To improve the degree of freedom of design as a signboard, it is preferable that both vertical placement and horizontal placement can be achieved, and it is necessary to improve the viewing angle characteristics.

An embodiment of the disclosure has been made in view of the problem described above, and an object of the disclosure is to improve the viewing angle characteristics of a liquid crystal display device including a reflective region in which each pixel performs display in the reflection mode.

The present specification discloses a liquid crystal display device according to the following items.

Item 1
A liquid crystal display device, including:
a first substrate;
a second substrate facing the first substrate and located closer to an observer than the first substrate; and
a liquid crystal layer provided between the first substrate and the second substrate, and further including
a plurality of pixels arrayed in a matrix shape including a plurality of rows and a plurality of columns,
the liquid crystal display device configured to perform display in a twisted vertical alignment mode in which liquid crystal molecules are in a vertical alignment state when no voltage is applied to the liquid crystal layer and the liquid crystal molecules are in a twisted alignment state when a predetermined voltage is applied to the liquid crystal layer,
wherein each of the plurality of pixels includes a reflective region in which display is performed in a reflection mode,
the first substrate includes a reflective electrode including a portion located in the reflective region, and a first vertical alignment film located on a surface on the liquid crystal layer side,
the second substrate includes a second vertical alignment film located on a surface on the liquid crystal layer side,
the liquid crystal layer includes a liquid crystal material having negative dielectric anisotropy and a chiral agent,
the reflective electrode includes silver or a silver alloy,
at least one of the first vertical alignment film and the second vertical alignment film is a photo-alignment film including an alignment film material having a reaction wavelength with respect to light of at least 313 nm, and
the reflective region includes a plurality of liquid crystal domains in which reference alignment azimuths of liquid crystal molecules are different from each other.

Item 2
The liquid crystal display device according to item 1, wherein
each of the plurality of pixels further includes a transmissive region in which display is performed in a transmission mode, and
the transmissive region includes a plurality of additional liquid crystal domains in which reference alignment azimuths of liquid crystal molecules are different from each other.

Item 3
The liquid crystal display device according to item 1 or 2, wherein
only one vertical alignment film of the first vertical alignment film and the second vertical alignment film is subjected to photo-alignment treatment, and
the one vertical alignment film subjected to the photo-alignment treatment includes a plurality of regions defining pretilt azimuths different from each other in each of the plurality of pixels.

Item 4
The liquid crystal display device according to item 3, wherein only the first vertical alignment film of the first vertical alignment film and the second vertical alignment film is subjected to the photo-alignment treatment.

Item 5
The liquid crystal display device according to item 4, wherein the second substrate does not include a black matrix.

Item 6
The liquid crystal display device according to any one of items 1 to 5, wherein the first substrate further includes a transparent conductive layer formed on the reflective electrode.

Item 7
The liquid crystal display device according to item 6, wherein the transparent conductive layer includes indium tin oxide, and the transparent conductive layer has a thickness of 0.04 nm or more and 12.28 nm or less.

Item 8

The liquid crystal display device according to item 7, wherein the transparent conductive layer has a thickness of 1.99 nm or more and 9.64 nm or less.

Item 9

The liquid crystal display device according to item 6, wherein the transparent conductive layer includes indium zinc oxide, and the transparent conductive layer has a thickness of 0.04 nm or more and 12.74 nm or less.

Item 10

The liquid crystal display device according to item 9, wherein the transparent conductive layer has a thickness of 2.02 nm or more and 10.11 nm or less.

Item 11

The liquid crystal display device according to any one of items 1 to 10, further including a pair of circular polarizers opposed to each other with at least the liquid crystal layer interposed therebetween, wherein each of the pair of circular polarizers includes a λ/4 plate having reverse wavelength dispersion characteristics.

Item 12

The liquid crystal display device according to any one of items 1 to 11, wherein the reflective electrode has an uneven surface structure, and the first substrate further includes a thin film transistor provided in each of the plurality of pixels, an organic insulating layer covering the reflective electrode, and a transparent electrode provided on the organic insulating layer, including a transparent conductive material, and electrically connected to the thin film transistor.

With embodiments of the disclosure, it is possible to improve the viewing angle characteristics in liquid crystal display devices in which each pixel includes a reflective region where display is performed in the reflection mode.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described with reference to the accompanying drawings. Note that the disclosure is not limited to the embodiments to be described below.

First Embodiment

Figure 1:
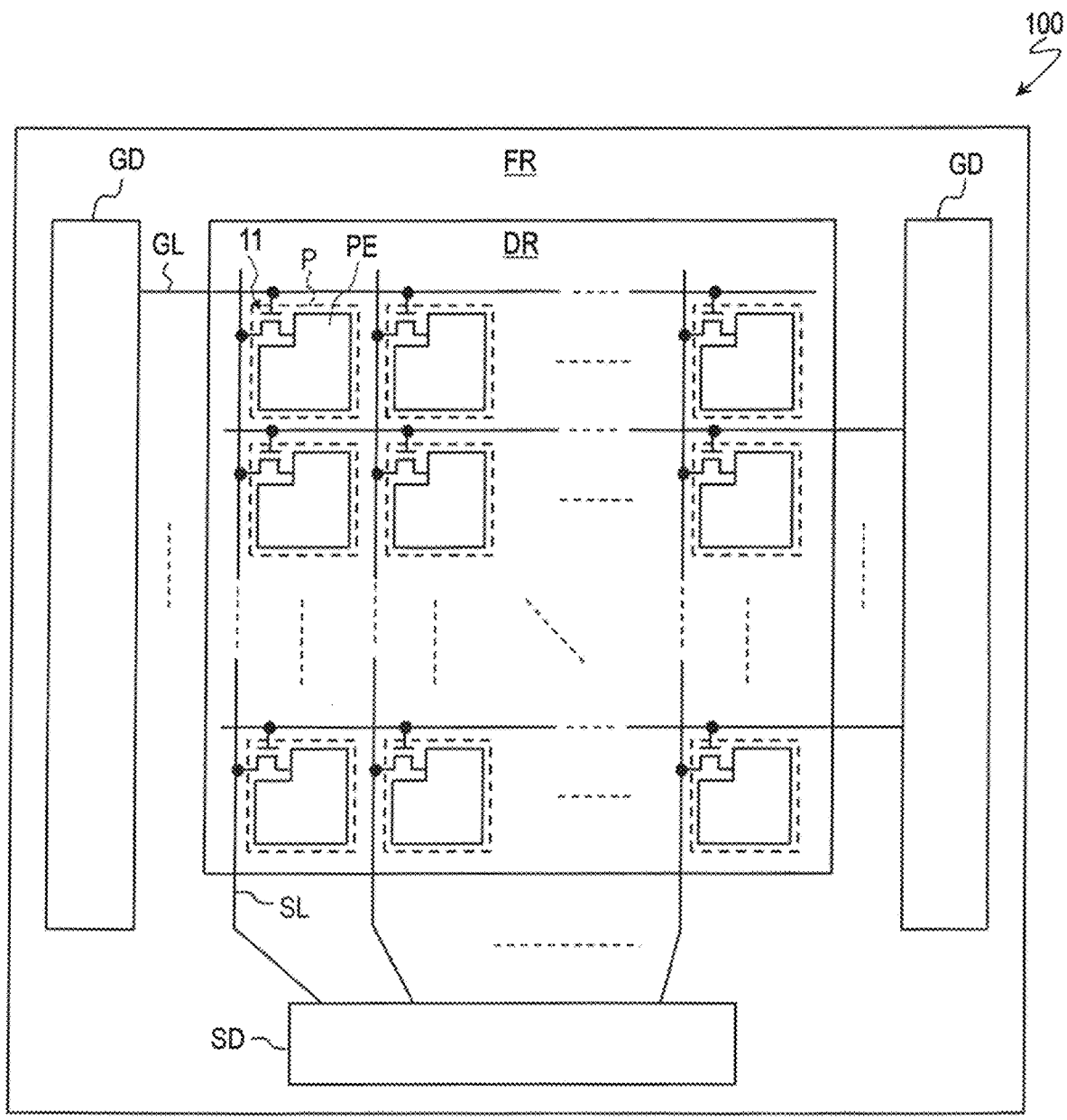
FIG. 1 is a plan view illustrating a schematic configuration of a liquid crystal display device 100 according to an embodiment of the disclosure.

A liquid crystal display device 100 according to a present embodiment will be described with reference to FIG. 1. FIG. 1 is a plan view illustrating a schematic configuration of the liquid crystal display device 100.

The liquid crystal display device 100, as illustrated in FIG. 1, includes a display region DR and a peripheral region (also referred to as a "frame region") FR positioned around the display region DR. The display region DR includes a plurality of pixels P. The plurality of pixels P are arrayed in a matrix shape including a plurality of rows and a plurality of columns. The plurality of pixels P typically include red pixels that display red, green pixels that display green, and blue pixels that display blue. Each pixel P is provided with a thin film transistor (TFT) 11, and a pixel electrode PE.

In the display region DR, a plurality of gate bus lines GL extending in a row direction, and a plurality of source bus lines SL extending in a column direction are formed. Each pixel P is a region surrounded by a pair of the gate bus lines GL adjacent to each other and a pair of the source bus lines SL adjacent to each other, for example. A scanning signal and a display signal are supplied from a corresponding gate bus line GL and a corresponding source bus line SL, respectively, to the TFT 11 of each pixel P.

A peripheral circuit is provided in the peripheral region FR. Specifically, in the peripheral region FR, a gate driver GD for driving the gate bus line GL is formed integrally (monolithically), and a source driver SD for driving the source bus line SL is mounted. Note that in the peripheral region FR, a source shared driving (SSD) circuit that drives the source bus line SL in a time division manner, or the like may be further provided.

Figure 2:
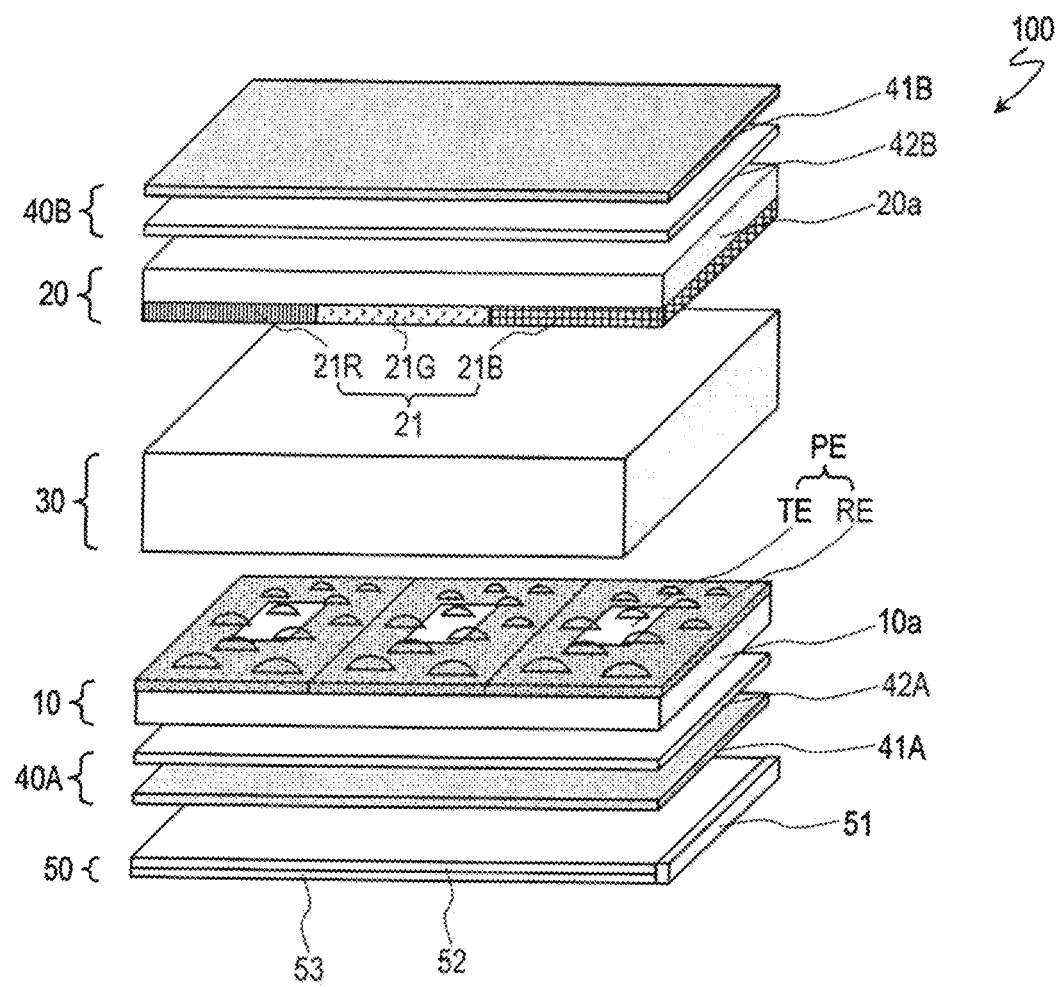
FIG. 2 is an exploded perspective view schematically illustrating the liquid crystal display device 100.
Figure 3:
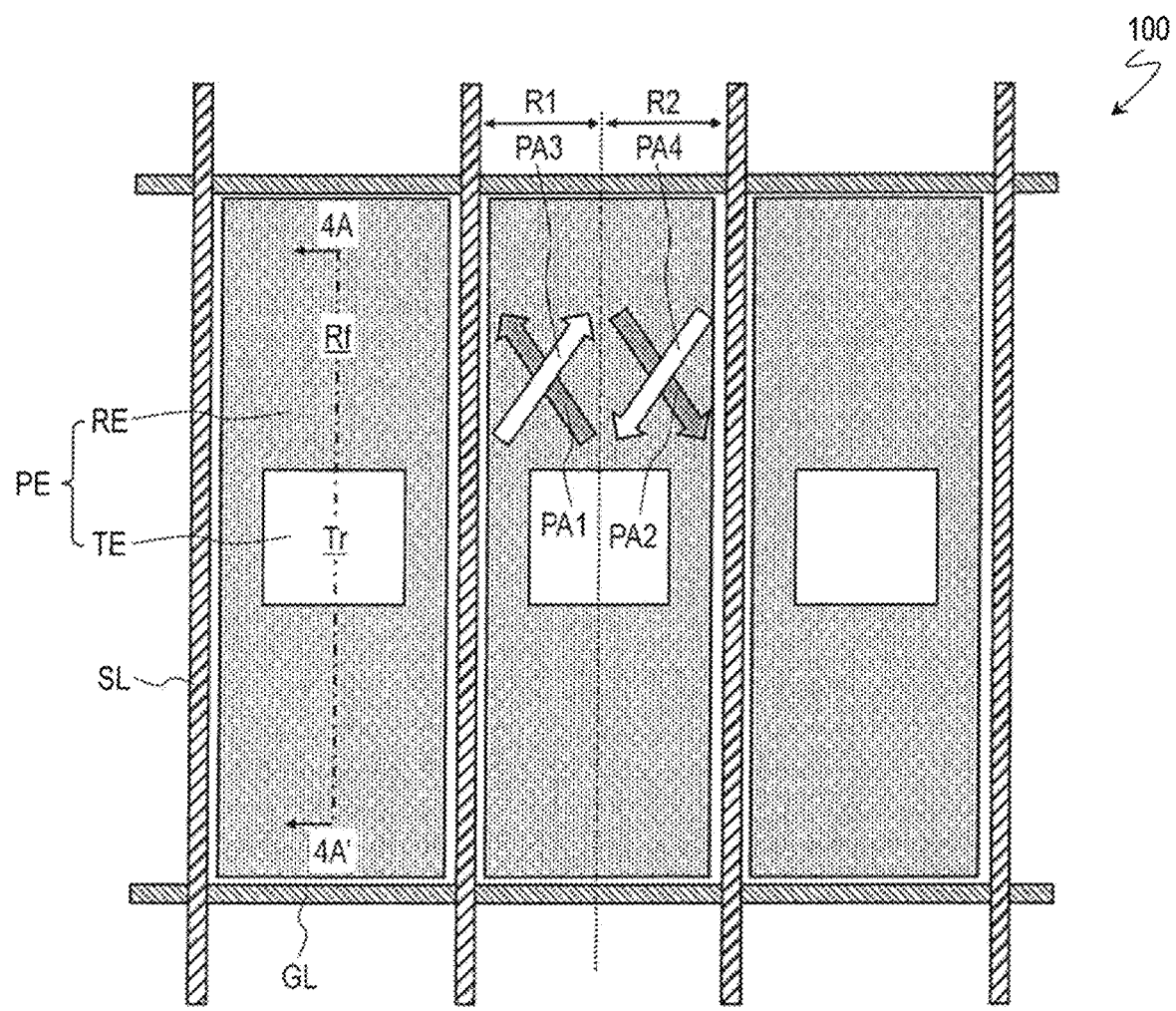
FIG. 3 is a plan view schematically illustrating the liquid crystal display device 100 and illustrates a region corresponding to three pixels P.
Figure 4:
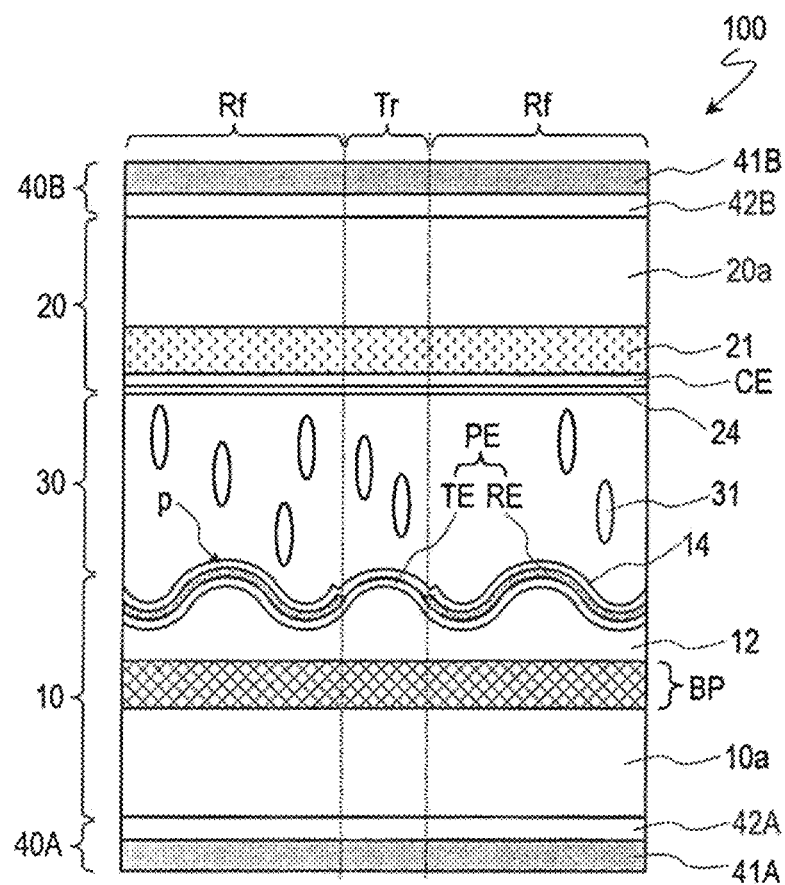
FIG. 4 is a cross-sectional view schematically illustrating the liquid crystal display device 100 and illustrates a cross section taken along a line 4A-4A' in FIG. 3.

The liquid crystal display device 100 will be described more specifically with reference to FIG. 2, FIG. 3, and FIG. 4. FIG. 2 is an exploded perspective view schematically illustrating the liquid crystal display device 100. FIG. 3 is a plan view schematically illustrating the liquid crystal display device 100 and illustrates a region corresponding to three pixels P. FIG. 4 is a cross-sectional view schematically illustrating the liquid crystal display device 100 and illustrates a cross section taken along a line 4A-4A' in FIG. 3.

As illustrated in FIG. 2, the liquid crystal display device 100 includes a TFT substrate (first substrate) 10, a counter substrate (second substrate) 20 opposite to the TFT substrate 10 and located closer to an observer than the TFT substrate 10, and a liquid crystal layer 30 provided between the TFT substrate 10 and the counter substrate 20. The TFT substrate 10, the counter substrate 20, and the liquid crystal layer 30 may be collectively referred to as a "liquid crystal panel". In addition, the liquid crystal display device 100 further includes a pair of circular polarizers 40A and 40B that face each other with at least the liquid crystal layer 30 interposed therebetween, and a backlight (lighting device) 50 disposed on a back face side of the liquid crystal panel (side opposite to the observer).

Each pixel P includes a reflective region Rf for display in a reflection mode, and a transmissive region Tr for display in a transmission mode, as illustrated in FIG. 3 and FIG. 4. In other words, the liquid crystal display device 100 is a transflective (transmission/reflection dual-mode) LCD. The area of the transmissive region Tr occupying the pixel P may be appropriately set depending on the application and the like, and is, for example, 20% or more and 90% or less. The position and the shape of the transmissive region Tr within the pixel P may also be appropriately set depending on the application or the like.

The TFT substrate 10 includes a substrate 10a, a backplane circuit BP, an interlayer insulating layer 12, the pixel electrode PE, and a first vertical alignment film 14.

The substrate 10a supports the backplane circuit BP and the like. The substrate 10a is transparent and has insulating properties. The substrate 10a is, for example, a glass substrate or a plastic substrate.

The backplane circuit BP is provided on the substrate 10a. The backplane circuit BP is a circuit for driving the plurality of pixels P. Here, the backplane circuit BP includes the gate bus lines GL, the source bus lines SL, the TFTs 11, and the like.

The interlayer insulating layer 12 is provided to cover the backplane circuit BP. The interlayer insulating layer 12 has a surface with an uneven shape. That is, the interlayer insulating layer 12 has an uneven surface structure. The interlayer insulating layer 12 having the uneven surface structure may be formed by using a photosensitive resin, as described, for example, in JP 3394926 B. That is, the interlayer insulating layer 12 may be an organic insulating layer.

The pixel electrode PE is provided on the interlayer insulating layer 12. The pixel electrode PE is electrically connected to the TFT 11 of the backplane circuit BP. Here, the pixel electrode PE includes a transparent electrode TE and a reflective electrode RE located on the transparent electrode TE.

The transparent electrode TE includes a transparent conductive material. As the transparent conductive material, for example, indium tin oxide (ITO), indium zinc oxide (IZO (trade name)), or a mixture thereof may be used. A thickness of the transparent electrode TE is, for example, 1 nm or more and 100 nm or less. In an example illustrated, the transparent electrode TE is disposed in substantially the entire pixel P.

The reflective electrode RE includes silver or a silver alloy. A thickness of the reflective electrode RE is, for example, 70 nm or more and 200 nm or less. The reflective electrode RE is disposed in a part of the pixel P. Of the pixel P, a region in which the reflective electrode RE is disposed is the reflective region Rf. In other words, the reflective electrode RE is located in the reflective region Rf. Of the pixel P, a region in which the reflective electrode RE is not disposed and the transparent electrode TE is disposed is the transmissive region Tr.

A surface of the reflective electrode RE has an uneven shape reflecting the uneven surface structure of the interlayer insulating layer 12. That is, the reflective electrode RE also has an uneven surface structure. The uneven surface structure of the reflective electrode RE is also referred to as a micro reflective structure (MRS), and is provided to diffusely reflect ambient light to achieve display similar to paper white. The uneven surface structure can, for example, be constituted by a plurality of protruding portions p arranged randomly such that a center spacing between adjacent protruding portions p is from 5 μm to 50 μm, and preferably from 10 μm to 20 μm. When viewed from the normal direction of the substrate 10a, the shapes of the protruding portions p are substantially circular or substantially polygonal. An area of the protruding portions p occupying the pixel P is, for example, from approximately 20% to 40%. A height of the protruding portions p is from 1 μm to 5 μm, for example.

The first vertical alignment film 14 is located on a surface of the TFT substrate 10 on the liquid crystal layer 30 side. Thus, the first vertical alignment film 14 is in contact with the liquid crystal layer 30.

The counter substrate 20 includes a substrate 20a, a color filter layer 21, a counter electrode (common electrode) CE, and a second vertical alignment film 24. Although not illustrated here, the counter substrate 20 further includes a plurality of columnar spacers. Note that the counter substrate 20 does not have a black matrix (light-blocking layer).

The substrate 20a supports the color filter layer 21 and the like. The substrate 20a is transparent and has insulating properties. The substrate 20a is, for example, a glass substrate or a plastic substrate.

The color filter layer 21 typically includes a red color filter 21R provided in a region corresponding to a red pixel, a green color filter 21G provided in a region corresponding to a green pixel, and a blue color filter 21B provided in a region corresponding to a blue pixel. The red color filter 21R, the green color filter 21G, and the blue color filter 21B transmit red light, green light, and blue light, respectively.

The counter electrode CE is provided on the color filter layer 21 to face the pixel electrode PE. The counter electrode CE includes a transparent conductive material. A material the same as or similar to that of the transparent electrode TE of the pixel electrode PE can be used as the transparent conductive material for forming the counter electrode CE. Note that an overcoat layer may be provided between the counter electrode CE and the color filter layer 21 (that is, to cover the color filter layer 21).

The second vertical alignment film 24 is located on a surface of the counter substrate 20 on the liquid crystal layer 30 side. Thus, the second vertical alignment film 24 is in contact with the liquid crystal layer 30.

The columnar spacers define the thickness (cell thickness) of the liquid crystal layer 30. The columnar spacers can include a photosensitive resin.

The liquid crystal layer 30 includes a liquid crystal material having negative dielectric anisotropy (that is, negative-type), and a chiral agent. The liquid crystal layer 30 can be formed, for example, by the falling drop method. In the present embodiment, the thickness of the liquid crystal layer 30 is substantially the same in the reflective region Rf and the transmissive region Tr.

Each of the first vertical alignment film 14 and the second vertical alignment film 24 is subjected to alignment treatment, and defines a pretilt direction (a pretilt angle and a pretilt azimuth) of liquid crystal molecules 31 included in the liquid crystal layer 30. The liquid crystal molecules 31 of the liquid crystal layer 30 are in a vertical alignment state when no voltage is applied to the liquid crystal layer 30 (see FIG. 4), and tilt to be in a twisted alignment state when a predetermined voltage is applied to the liquid crystal layer 30. As described above, the liquid crystal layer 30 is a vertical alignment type liquid crystal layer, and the liquid crystal display device 100 performs display in a twisted vertical alignment (TVA) mode. In addition, here, the liquid crystal display device 100 performs display in a normally black mode.

One (first circular polarizer) 40A of the pair of circular polarizers 40A and 40B is disposed on the back face side of the TFT substrate 10, and the other (second circular polarizer) 40B is disposed on the observer side of the counter substrate 20. The first circular polarizer (back circular polarizer) 40A includes a first linear polarizer 41A and a first retarder 42A located between the first linear polarizer 41A and the TFT substrate 10. The second circular polarizer (front circular polarizer) 40B includes a second linear polarizer 41B and a second retarder 42B located between the second linear polarizer 41B and the counter substrate 20.

The second linear polarizer (front linear polarizer) 41B is an absorptive linear polarizer. As the absorptive linear polarizer, a linear polarizer composed of a film polarizing plate dyed and stretched with polyvinyl alcohol (PVA) and a triacetyl cellulose (TAC) protection layer, a dye-based polarizer, a coated polarizer, and the like can be used. The absorptive linear polarizer has a transmission axis and an absorption axis orthogonal to the transmission axis.

As the first linear polarizer (back linear polarizer) 41A, an absorptive linear polarizer can be used in the same manner as the front linear polarizer 41B. In addition, a reflective linear polarizer or a layered body of an absorptive linear polarizer and a reflective linear polarizer may be used. Examples of the reflective linear polarizer include a multi-layer reflective polarizer (trade name: DBEF) manufactured by Sumitomo 3M Ltd., or a combination of a cholesteric LC film and a λ/4 plate. Unlike the absorptive linear polarizer, the reflective linear polarizer has a reflection axis in a direction orthogonal to the transmission axis. Thus, part of the light from backlight 50 is reflected by the reflective linear polarizer and further reflected by a reflector 53 included in the backlight 50, thereby being reused. Note that the reflective linear polarizer may be included in the backlight 50 instead of the back linear polarizer 41A.

The first retarder 42A and the second retarder 42B may each be one λ/4 plate, may be a combination of one λ/4 plate and one or two λ/2 plates, or may be a combination of one λ/4 plate and one negative C-plate.

The backlight 50 is provided on the back face side of the back circular polarizer 40A. The backlight 50 includes a light source (for example, an LED) 51 that emits light, a light guide plate 52 that guides the light from the light source 51 toward the liquid crystal panel, and the reflector 53 disposed on the back face side of the light guide plate 52. The backlight 50 may further include a prism sheet and a diffuser sheet disposed on the front face side (or back face side) of the light guide plate 52.

In the present embodiment, each of the first vertical alignment film 14 and the second vertical alignment film 24 is a photo-alignment film including an alignment film material having a reaction wavelength of at least 313 nm with respect to light. In the present specification, the "vertical alignment film" may be any film that aligns the liquid crystal molecules 31 in the vicinity of the alignment film substantially vertically to the surface of the alignment film, and may be, for example, an alignment film that imparts a pretilt angle of 86.0° or more to the liquid crystal molecules 31. Further, the "photo-alignment film" is an alignment film in which an intensity and a direction of an alignment regulating force for the liquid crystal molecules 31 are changed by photo-alignment treatment (light irradiation/exposure).

The main component of the photo-alignment film having vertical alignment properties is preferably, for example, polyimide, polyamic acid, polymaleimide, or polysiloxane. These are a group of polymers that can be effectively utilized as an alignment film. In addition, the photo-alignment film preferably contains at least one of a cinnamate group, an azobenzene group, a chalcone group, a stilbene group, and a coumarin group as a photoreactive functional group. This reduces the possibility of elution of photodecomposition products into the liquid crystal layer 30, so that the reliability can be improved, and the photo-alignment treatment can be performed with a relatively low irradiation energy. In particular, the cinnamate group or a derivative thereof is preferably used as the photoreactive functional group.

The cinnamate group ($C_6H_5$—CH=CH—COO—) has an advantage of being easy to synthesize. Irradiation of the cinnamate group with polarized ultraviolet light can effectively cause a dimerization reaction and a cis-trans isomerization reaction. Thus, the photo-alignment film subjected to alignment treatment with polarized ultraviolet light exhibits an excellent alignment regulating force.

The polarized ultraviolet light preferably has a wavelength of 250 nm or more and 400 nm or less. When the wavelength of the polarized ultraviolet light is set to 250 nm or more and 400 nm or less, the dimerization reaction and the cis-trans isomerization reaction of the cinnamate group can be caused more effectively.

As a light source for irradiation with polarized ultraviolet light, for example, a high-pressure mercury lamp can be used. The high-pressure mercury lamp has a dominant wavelength of 365 nm and emits intense light having wavelengths of, for example, 254 nm, 313 nm, 405 nm, and 436 nm. When a sharp cut filter (SCF), a band-pass filter (BPF), or the like is used, a wavelength range of light emitted from the high-pressure mercury lamp can be adjusted to a desired range. For example, when an SCF that absorbs light having a wavelength of 270 nm or less (referred to as a "270-nm SCF") is used, light having a wavelength of 254 nm among light emitted from the high-pressure mercury lamp is cut. Thus, if the 270-nm SCF is used when a photo-alignment film having a reaction wavelength of 350 nm or less is subjected to photo-alignment treatment, the dominant wavelength of the photo-reaction becomes 313 nm.

FIG. 3 illustrates pretilt azimuths PA1 and PA2 defined by the first vertical alignment film 14 provided in the TFT substrate 10, and pretilt azimuths PA3 and PA4 defined by the second vertical alignment film 24 provided in the counter substrate 20. As illustrated in FIG. 3, in the present embodiment, two different pretilt azimuths PA1 and PA2 are defined by the first vertical alignment film 14 in each pixel P. That is, the first vertical alignment film 14 has a plurality of (here, two) regions that define the pretilt azimuths PA1 and PA2 different from each other in each pixel P. Furthermore, in each pixel P, two different pretilt azimuths PA3 and PA4 are defined by the second vertical alignment film 24. That is, the second vertical alignment film 24 has a plurality of (here, two) regions that define the pretilt azimuths PA3 and PA4 different from each other in each pixel P. In the illustrated example, the pretilt azimuth by the first vertical alignment film 14 is different between the left half (hereinafter referred to as a "first alignment region") R1 and the right half (hereinafter referred to as a "second alignment region") R2 of the pixel P. Similarly, the pretilt azimuth by the second vertical alignment film 24 is different between the first alignment region R1 and the second alignment region R2 of the pixel P.

In the present specification, the reference of an azimuth angle direction is defined as the horizontal direction of the display surface, and the counterclockwise direction is defined as a positive direction. More specifically, when the display surface is compared to a clock face, a three o'clock direction is denoted as an azimuth angle of 0°, and a counterclockwise rotation represents a positive rotation. In the example illustrated in FIG. 3, of the pretilt azimuths PA1 and PA2 by the first vertical alignment film 14, the pretilt azimuth PA1 in the first alignment region R1 is a substantially 125° direction, and the pretilt azimuth PA2 in the second alignment region R2 is a substantially 305° direction. Of the pretilt azimuths PA3 and PA4 by the second vertical alignment film 24, the pretilt azimuth PA3 in the first alignment region R1 is a substantially 55° direction, and the pretilt azimuth PA4 in the second alignment region R2 is a substantially 235° direction.

As described above, each of the first vertical alignment film 14 and the second vertical alignment film 24 is subjected to photo-alignment treatment (hereinafter, referred to as "divided photo-alignment treatment" or "divided exposure") to have a plurality of regions that define different pretilt azimuths in each pixel P. As the method of divided exposure, there are a general exposure method using a photomask and a method called a "scanning exposure method".

The exposure method using a photomask is disclosed in, for example, JP H11-133429 A. In the method disclosed in JP H11-133429 A, a photomask having a stripe shape with light-blocking portions and light-transmitting portions is used to perform first exposure, and then, the photomask is displaced by a distance the same as a width of the stripe to perform second exposure from an azimuth opposite to that in the first exposure, so that a multi-domain is formed.

The scanning exposure method is disclosed in, for example, JP 2009-517697 T. In the scanning exposure method, a linear pattern on a substrate (wiring lines of a TFT substrate, a black matrix of a color filter substrate, or the like) is read by a camera, and exposure is performed while the position of a photomask is corrected each time, so that a large area can be divided and exposed with high accuracy. Thus, the scanning exposure method is suitable for dividing and exposing a large panel for digital signage.

Figure 5:
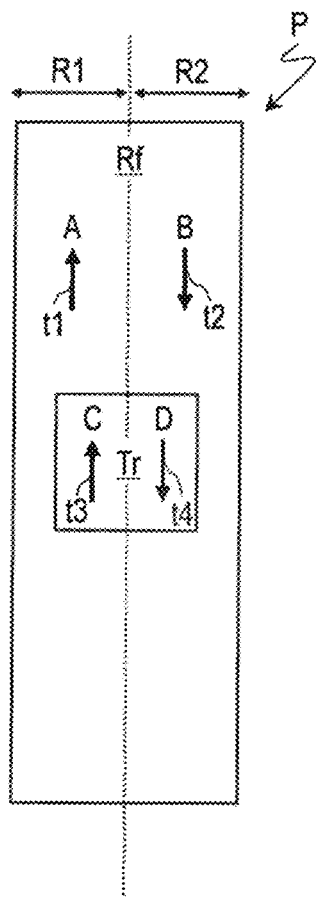
FIG. 5 is a diagram illustrating liquid crystal domains A to D formed in each pixel P of the liquid crystal display device 100.

The pretilt azimuth by the first vertical alignment film 14 and the pretilt azimuth by the second vertical alignment film 24 are set as described above, so that in the liquid crystal display device 100 of the present embodiment, when a voltage is applied to the liquid crystal layer 30, a plurality of liquid crystal domains are formed in each of the reflective region Rf and the transmissive region Tr. FIG. 5 is a diagram illustrating liquid crystal domains A to D formed in each pixel P.

As illustrated in FIG. 5, two liquid crystal domains A and B are formed in the reflective region Rf, and two liquid crystal domains C and D are formed in the transmissive region Tr. FIG. 5 illustrates reference alignment azimuths t1, t2, t3, and t4 of the liquid crystal molecules 31 in the liquid crystal domains A, B, C, and D, respectively. The "reference alignment azimuth" is a tilt azimuth of the liquid crystal molecules 31 at or near the center in the thickness direction of the liquid crystal layer 30, and has a dominant influence on the viewing angle dependence of each liquid crystal domain.

The liquid crystal domains A and C are located in the first alignment region R1 of the pixel P, and thus, the reference alignment azimuths t1 and t3 of the liquid crystal domains A and C are defined to be intermediate between the pretilt azimuth PA1 and the pretilt azimuth PA3. Here, the reference alignment azimuths t1 and t3 are a substantially 90° direction. The liquid crystal domains B and D are located in the second alignment region R2 of the pixel P, and thus, the reference alignment azimuths t2 and t4 of the liquid crystal domains B and D are defined to be intermediate between the pretilt azimuth PA2 and the pretilt azimuth PA4. Here, the reference alignment azimuths t2 and t4 are a substantially 270° direction. Note that the liquid crystal domains A and C are adjacent to each other and the reference alignment azimuths t1 and t3 thereof are the same (substantially 90° direction), and thus, the liquid crystal domains A and C can be regarded as one liquid crystal domain. Similarly, the liquid crystal domains B and D are adjacent to each other and the reference alignment azimuths t2 and t4 thereof are the same (substantially 270° direction), and thus, the liquid crystal domains B and D can be regarded as one liquid crystal domain.

As described above, in the present embodiment, the reflective region Rf includes the plurality of liquid crystal domains A and B in which the reference alignment azimuths of the liquid crystal molecules 31 are different from each other. In addition, the transmissive region Tr includes a plurality of liquid crystal domains C and D in which the reference alignment azimuths of the liquid crystal molecules 31 are different from each other. That is, each of the reflective region Rf and the transmissive region Tr is formed into a multi-domain (here, formed into two domains). This improves the viewing angle characteristics of the reflective display and the transmissive display.

Here, a result of verifying an effect of improving (ameliorating) the viewing angle characteristics according to the embodiment of the disclosure will be described. The effect of improving the viewing angle characteristics was verified by simulation calculation using a liquid crystal simulator (LCD master available from SHINTECH, Inc.).

First, for a transflective LCD of Comparative Example 1, actually-measured contrast viewing angle characteristics were compared with contrast viewing angle characteristics obtained by simulation calculation. The transflective LCD of Comparative Example 1 is a mono-domain alignment LCD. That is, in Comparative Example 1, only one liquid crystal domain is formed in each of the reflective region and the transmissive region (it can also be said that only one liquid crystal domain is formed in the entire pixel). Specifications of the transflective LCD of Comparative Example 1 are shown in Table 1.

TABLE 1

| Comparative Example 1 | | | |
|---|---|---|---|
| Pretilt azimuth | | | |
| TFT substrate side | Counter substrate side | Configuration of front circular polarizer | Configuration of back circular polarizer |
| — | 310° | Linear polarizer: 45° | $\lambda/4$ plate with flat wavelength dispersion (Re 140 nm): 0° |
| | | $\lambda/4$ plate with flat wavelength dispersion (Re 140 nm): 90° | Linear polarizer: 135° |

As shown in Table 1, in Comparative Example 1, only the vertical alignment film on the counter substrate side is subjected to alignment treatment, and the pretilt azimuth defined by the vertical alignment film on the counter substrate side is a 310° direction. The front circular polarizer in Comparative Example 1 includes a linear polarizer having an absorption axis set in a 45° direction and a λ/4 plate having a slow axis set in a 90° direction in this order from the observer side. The back circular polarizer in Comparative Example 1 includes a λ/4 plate having a slow axis set in a 0° direction and a linear polarizer having an absorption axis set in a 135° direction in this order from the observer side. The λ/4 plate of the front circular polarizer and the λ/4 plate of the back circular polarizer have a flat wavelength dispersion characteristic, and a retardation Re (represented by an equation $Re=(n_x-n_y)$) in an in-plane direction thereof is 140 nm.

Figure 6A:
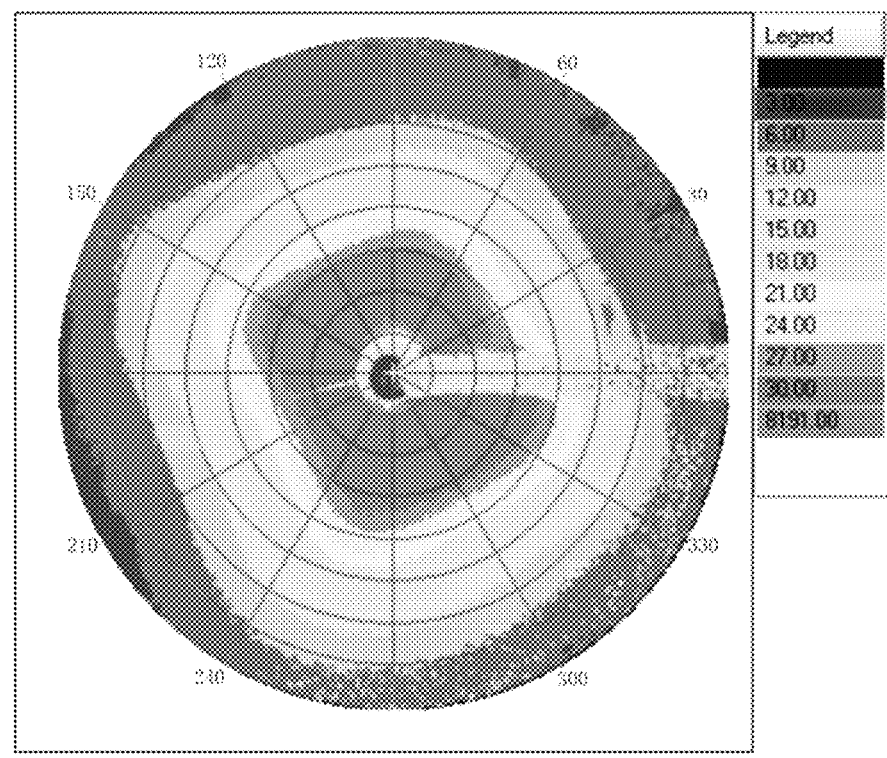
FIG. 6A is a diagram showing a result of actual measurement of contrast viewing angle characteristics in Comparative Example 1 for reflective display.
Figure 6B:
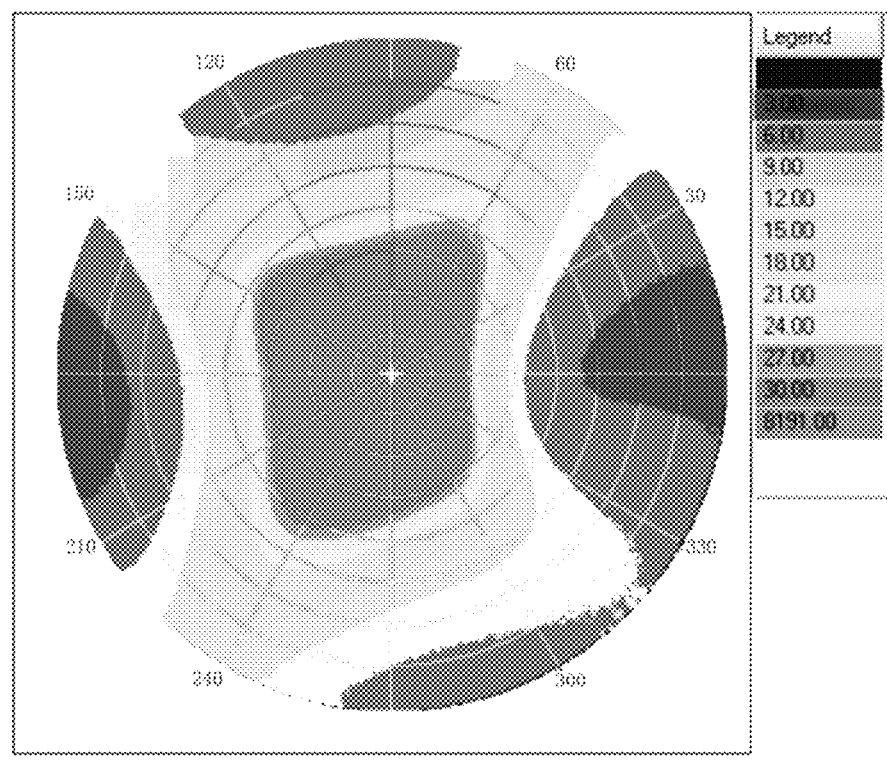
FIG. 6B is a diagram showing a result of actual measurement of contrast viewing angle characteristics in Comparative Example 1 for transmissive display.
Figure 7A:
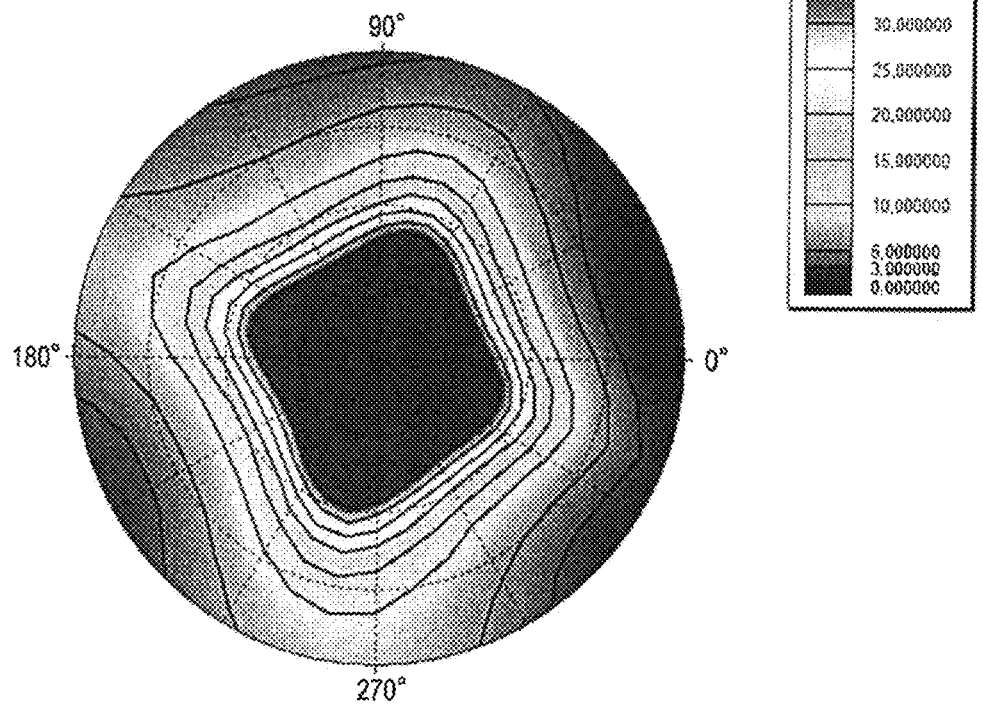
FIG. 7A is a diagram showing a result of contrast viewing angle characteristics in Comparative Example 1 obtained by simulation calculation for reflective display.
Figure 7B:
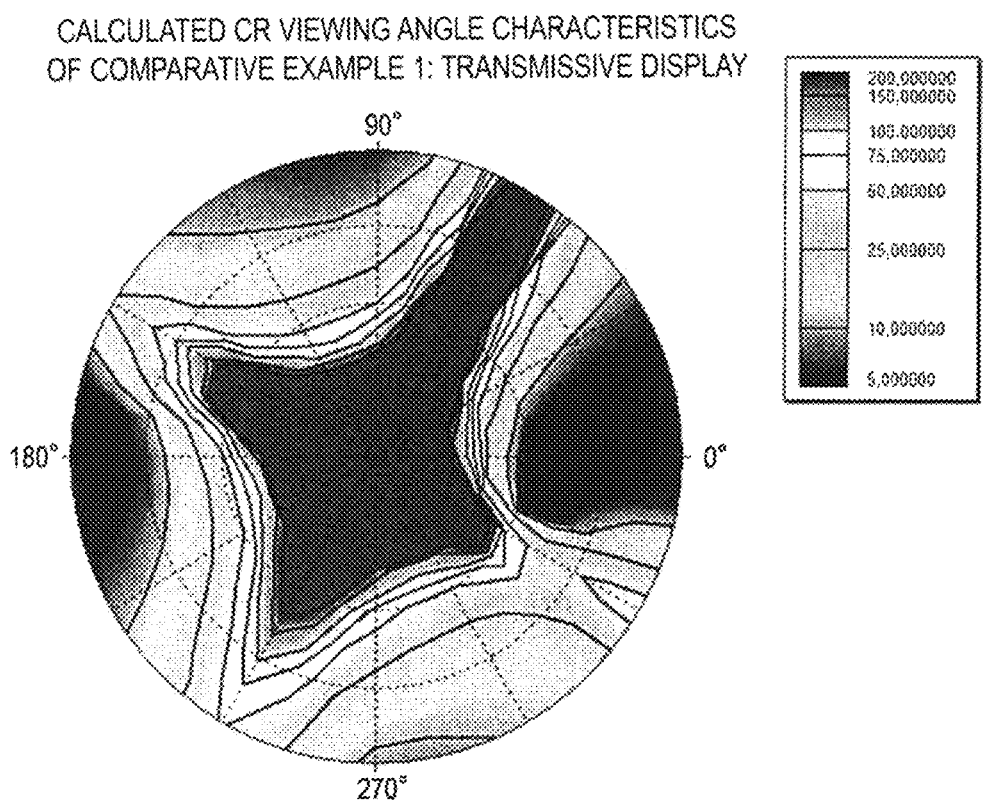
FIG. 7B is a diagram showing a result of contrast viewing angle characteristics in Comparative Example 1 obtained by simulation calculation for transmissive display.

FIG. 6A and FIG. 6B show actually-measured contrast viewing angle characteristics for reflective display and transmissive display, respectively. FIG. 7A and FIG. 7B show contrast viewing angle characteristics obtained by simulation calculation for reflective display and transmissive display, respectively. In a plurality of equivalent contrast curves shown in FIG. 7A and FIG. 7B, the contrast ratio becomes higher from the outer side to the inner side of the drawings (the same applies to FIG. 8 and the like to be described below). In both the actual measurement and the simulation calculation, a black display voltage is 0 V and a white display voltage is 5 V. The contrast viewing angle characteristics of the reflective display are viewing angle characteristics for light incident on the liquid crystal panel from the observer side along the panel normal direction.

From comparison between FIG. 6A and FIG. 7A and comparison between FIG. 6B and FIG. 7B, it can be seen that the contrast viewing angle characteristics obtained by simulation calculation are similar to the actually-measured contrast viewing angle characteristics for both the reflective display and the transmissive display. In this way, it was confirmed that the contrast viewing angle characteristics can be calculated by simulation with high accuracy.

Next, simulation calculation of contrast viewing angle characteristics was performed for the liquid crystal display device 100 of the present embodiment (Example 1). Specifications of Example 1 are shown in Tables 2 and 3.

TABLE 2

| Example 1 Pretilt azimuth | | | |
|---|---|---|---|
| TFT substrate side | | Counter substrate side | |
| First alignment region | Second alignment region | First alignment region | Second alignment region |
| 125° | 305° | 55° | 235° |

TABLE 3

| Example 1 | |
|---|---|
| Configuration of front circular polarizer | Configuration of back circular polarizer |
| Linear polarizer: 170° | λ/4 plate with reverse wavelength dispersion (Re 140 nm): 125° |

TABLE 3-continued

| Example 1 | |
|---|---|
| Configuration of front circular polarizer | Configuration of back circular polarizer |
| λ/4 plate with reverse wavelength dispersion (Re 140 nm): 35° Negative C-plate (Rth 190 nm) | Linear polarizer: 80° |

In Example 1, both the first vertical alignment film 14 on the TFT substrate 10 side and the second vertical alignment film 24 on the counter substrate 20 side are subjected to alignment treatment. As shown in Table 2, the pretilt azimuth defined by the first vertical alignment film 14 is a 125° direction in the first alignment region R1 and a 305° direction in the second alignment region R2. The pretilt azimuth defined by the second vertical alignment film 24 is a 55° direction in the first alignment region R1 and a 235° direction in the second alignment region R2. A twist angle is 70° in each of the first alignment region R1 and the second alignment region R2, and the liquid crystal layer 30 contains a chiral agent.

As shown in Table 3, the front circular polarizer 40B includes a linear polarizer having an absorption axis set in a 170° direction, a λ/4 plate having a slow axis set in a 35° direction, and a negative C-plate in this order from the observer side. The back circular polarizer 40A includes a λ/4 plate having a slow axis set in a 125° direction and a linear polarizer having an absorption axis set in an 80° direction in this order from the observer side. The λ/4 plate of the front circular polarizer 40B and the λ/4 plate of the back circular polarizer 40A have reverse wavelength dispersion characteristics in which ratios of retardations at wavelengths of 450 nm and 650 nm to a retardation at a wavelength of 550 nm are 0.896 and 1.039, respectively, and have the retardation Re of 140 nm in the in-plane direction of the panel. Furthermore, a retardation Rth (represented by the equation $Rth=\{(n_x+n_y)/2-n_z\}\cdot d$) in a thickness direction of the negative C-plate of the front circular polarizer 40B is 190 nm.

Figure 8:
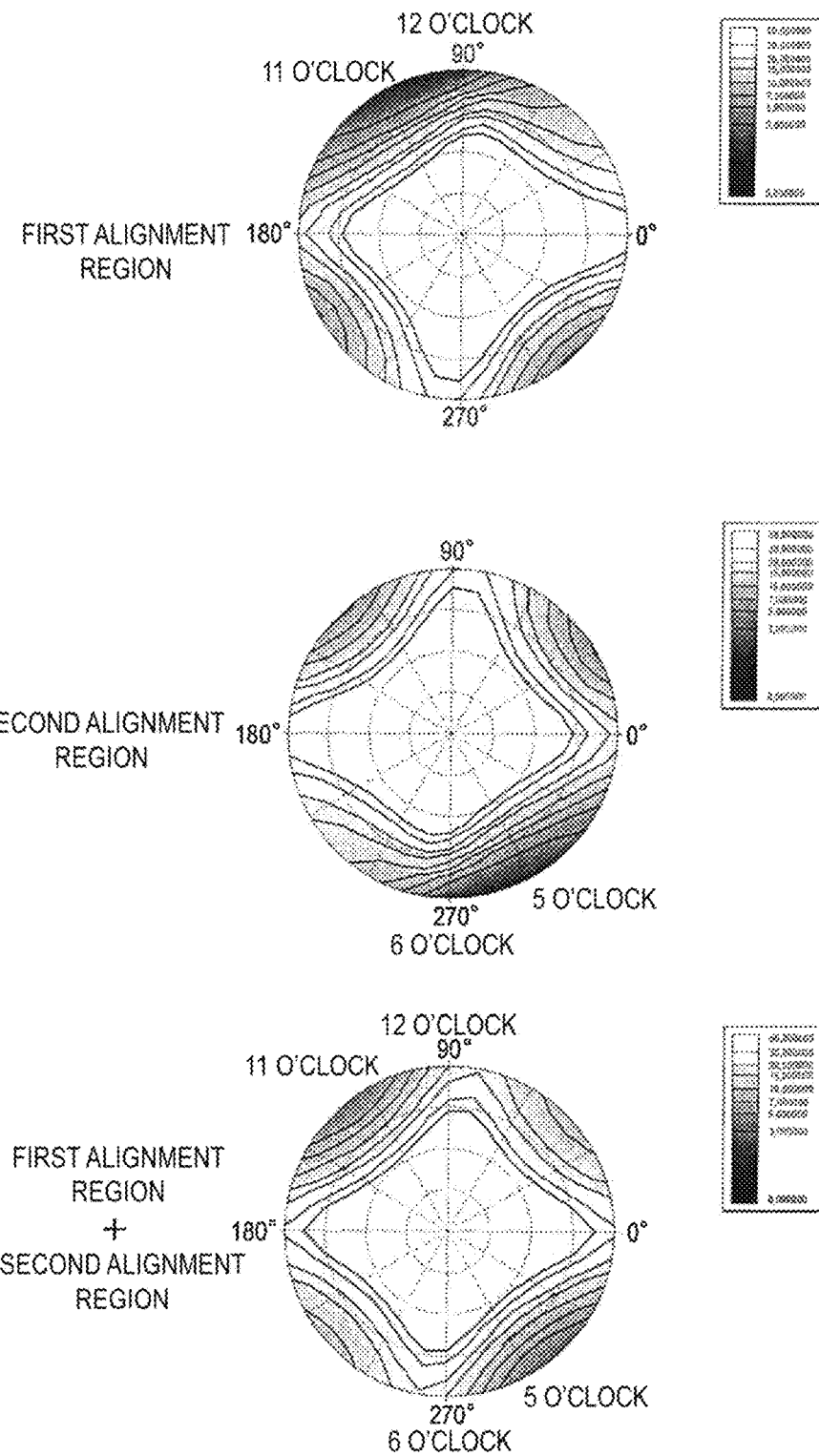
FIG. 8 is a diagram showing contrast viewing angle characteristics in Example 1 obtained by simulation calculation for reflective display.
Figure 9:
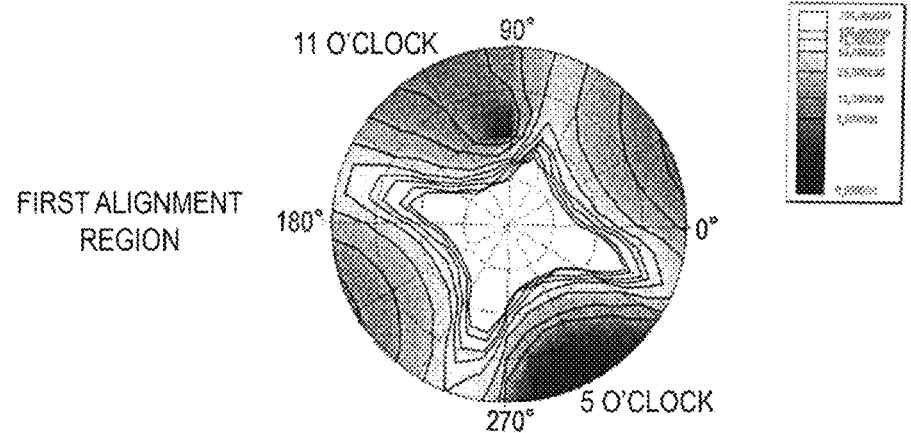
FIG. 9 is a diagram showing contrast viewing angle characteristics in Example 1 obtained by simulation calculation for transmissive display.
Figure 9:
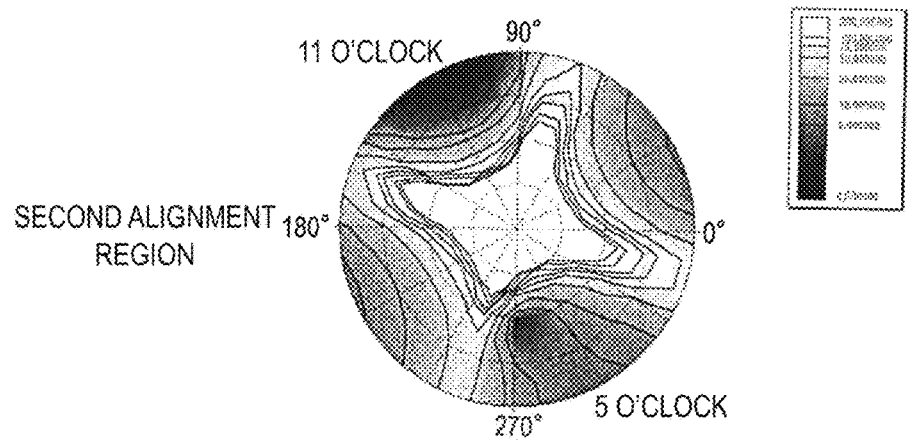
Figure 9:
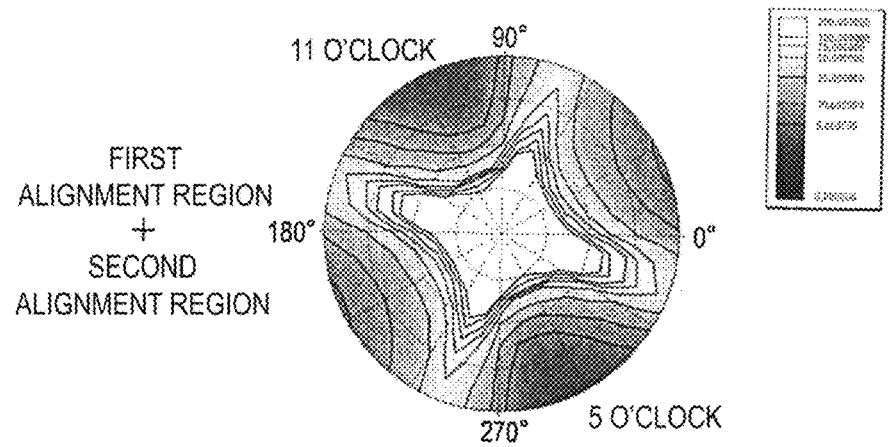

FIGS. 8 and 9 show contrast viewing angle characteristics of Example 1 obtained by simulation calculation for reflective display and transmissive display, respectively. The upper parts of FIGS. 8 and 9 show the contrast viewing angle characteristics in the first alignment region R1, and the middle parts of FIGS. 8 and 9 show the contrast viewing angle characteristics in the second alignment region R2. The lower parts of FIGS. 8 and 9 show the contrast viewing angle characteristics in the entirety of the first alignment region R1 and the second alignment region R2 (that is, the entire reflective region Rf or the entire transmissive region Tr).

From a comparison between the upper part and the middle part of FIG. 8 and the lower part of FIG. 8, it can be seen that the contrast viewing angles in the 5 to 6 o'clock direction and the 11 to 12 o'clock direction are ameliorated in the entire reflective region Rf of the two-domain structure as compared with the region of the mono-domain structure (each of the first alignment region R1 and the second alignment region R2). In addition, from a comparison between the upper part and the middle part of FIG. 9 and the lower part of FIG. 9, it can be seen that the contrast viewing angles in the 5 o'clock direction and the 11 o'clock direction are ameliorated in the entire transmissive region Tr of the two-domain structure as compared with the region of the mono-domain structure (each of the first alignment region R1 and the second alignment region R2).

Thus, it was confirmed that the contrast viewing angle characteristics of both the reflective display and the transmissive display can be improved (ameliorated) by forming each of the reflective region Rf and the transmissive region Tr into two domains.

In the liquid crystal display device 100 according to the present embodiment, the liquid crystal layer 30 contains a chiral agent. When the liquid crystal layer 30 contains a chiral agent, quality of the reflective display can be further improved. In this regard, results of verification by comparing Example 1 and Comparative Example 2 will be described below. Comparative Example 2 is different from Example 1 in that the liquid crystal layer does not contain a chiral agent.

Figure 10A:
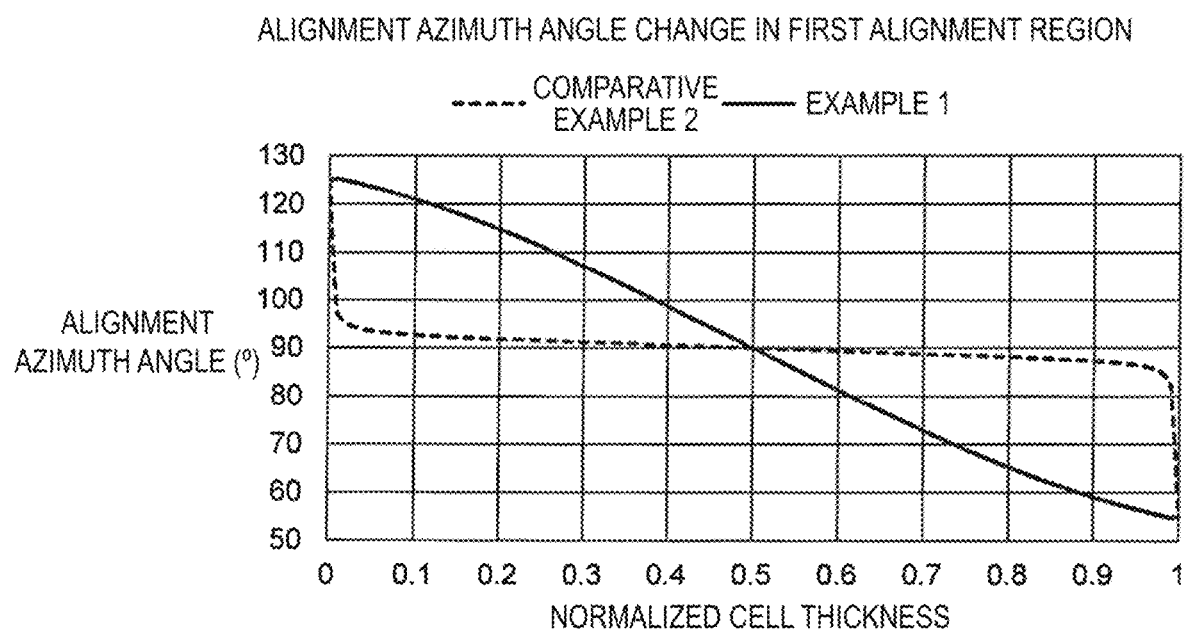
FIG. 10A is a graph showing a change in an alignment azimuth angle of liquid crystal molecules 31 along a cell thickness direction when a white display voltage is applied to a liquid crystal layer 30 in Comparative Example 2 and Example 1.
Figure 10B:
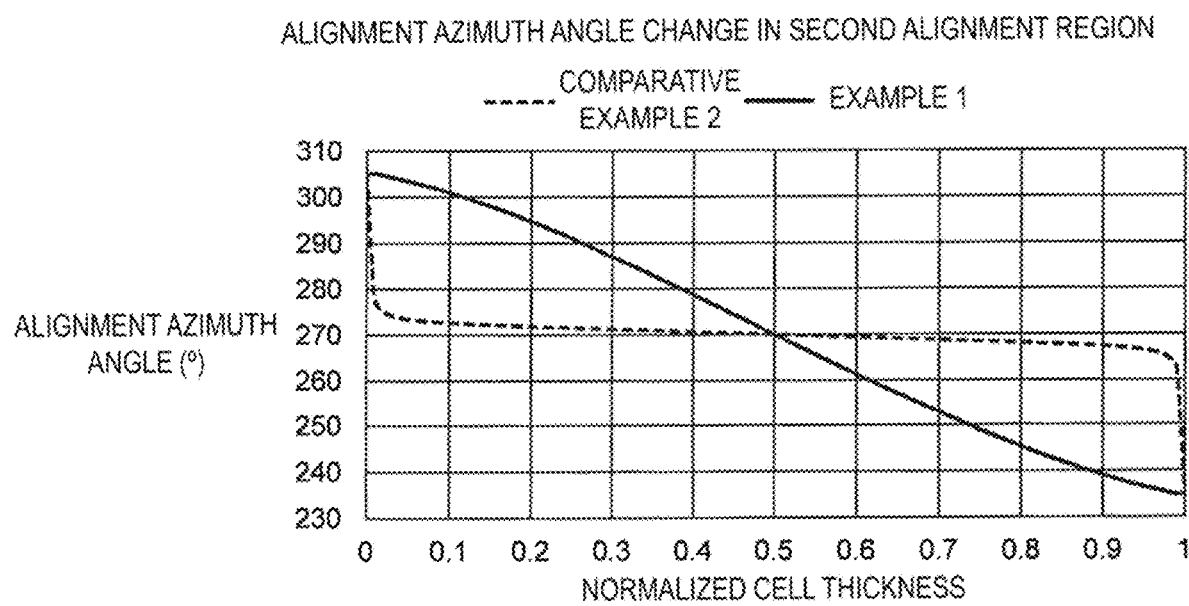
FIG. 10B is a graph showing a change in the alignment azimuth angle of the liquid crystal molecules 31 along the cell thickness direction when a white display voltage is applied to the liquid crystal layer 30 in Comparative Example 2 and Example 1.

FIGS. 10A and 10B show a change in the alignment azimuth angle of the liquid crystal molecules 31 along the cell thickness direction when a voltage of 5 V (white display voltage) is applied to the liquid crystal layer 30. FIGS. 10A and 10B each are a graph in which the horizontal axis represents a normalized cell thickness and the vertical axis represents an alignment azimuth angle. FIG. 10A shows a change in the alignment azimuth angle in the first alignment region R1 and FIG. 10B shows a change in the alignment azimuth angle in the second alignment region R2. A position where the normalized cell thickness is 0 corresponds to an interface between the TFT substrate 10 and the liquid crystal layer 30, and a position where the normalized cell thickness is 1 corresponds to an interface between the counter substrate 20 and the liquid crystal layer 30.

From FIGS. 10A and 10B, it can be seen that in each of the first alignment region R1 and the second alignment region R2, the alignment azimuth angle abruptly changes in the vicinity of the interface between the TFT substrate 10 and the liquid crystal layer 30 and in the vicinity of the interface between the counter substrate 20 and the liquid crystal layer 30 in Comparative Example 2, whereas the alignment azimuth angle gradually changes from the TFT substrate 10 side to the counter substrate 20 side in Example 1.

Table 4 shows a reflectivity and a reflection chromaticity for Example 1 and Comparative Example 2. In Table 4, a reflectivity normalized by setting the reflectivity of Comparative Example 2 to 1 is shown as the reflectivity, and a chromaticity at the time of white display is shown as the reflection chromaticity.

TABLE 4

|  | Normalized reflectivity | Reflection chromaticity | |
| --- | --- | --- | --- |
|  |  | x | y |
| Comparative Example 2 | 1.00 | 0.401 | 0.426 |
| Example 1 | 1.29 | 0.324 | 0.349 |

From Table 4, it can be seen that the reflectivity of Example 1 was higher than that of Comparative Example 2. In addition, in Example 1, it can be seen that the reflection chromaticity is close to the chromaticity (x, y)=(0.313, 0.329) of the CIE standard illuminant D65 and the yellow shift of the reflection chromaticity is small as compared with Comparative Example 2. The reason for these is considered as follows. In Comparative Example 2, the alignment azimuth angle rapidly changes in the vicinity of the interface between the liquid crystal layer and both substrates, and thus, the substantial twist angle is as small as about 15°, and the wavelength dispersion of the retardation of the liquid crystal layer is large. On the other hand, in Example 1, the alignment azimuth angle gradually changes from the TFT substrate 10 side to the counter substrate 20 side, and thus, the twist angle is as large as about 70°, and the wavelength dispersion of the retardation of the liquid crystal layer 30 is small, so that the reflectivity is high and the yellow shift of the reflection chromaticity is small.

In the liquid crystal display device 100 of the present embodiment, the reflective electrode RE includes silver or a silver alloy. This can realize bright reflective display, and makes it possible to perform the photo-alignment treatment suitably on the first vertical alignment film 14 of the TFT substrate 10. The reasons for this will be described below.

Figure 11:
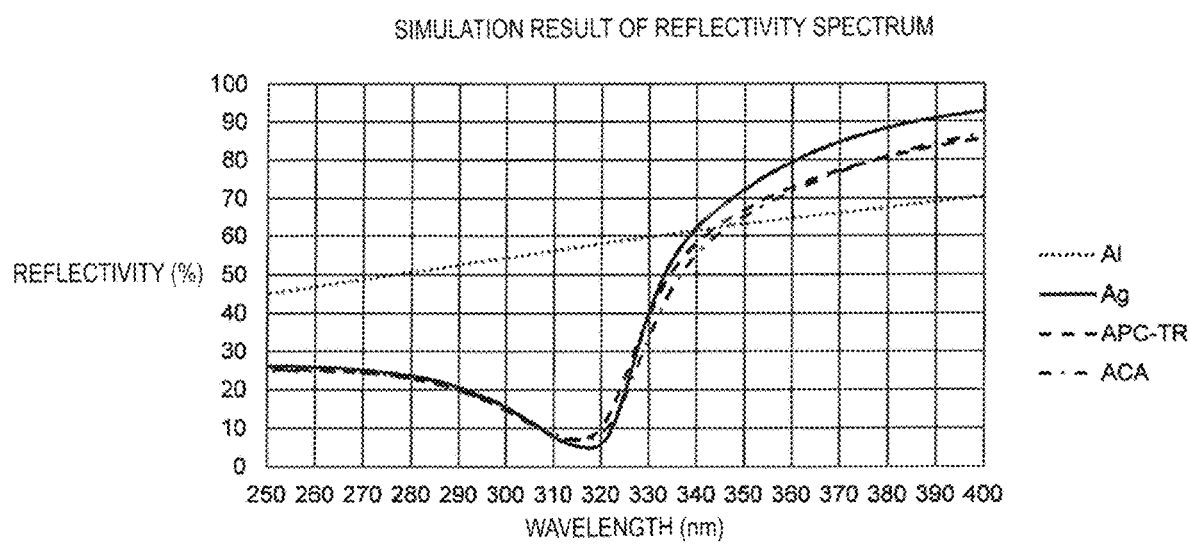
FIG. 11 is a graph showing results of reflectivity spectra obtained by simulation calculation for aluminum, silver, APC-TR, and ACA.

FIG. 11 shows simulation calculation results of reflectivity spectra of aluminum, silver, APC-TR (silver-palladium-copper alloy), and ACA (silver-copper-gold alloy). The simulation calculation was performed on the basis of actually-measured values of wavelength dispersion of the refractive index for each metal.

From FIG. 11, it can be seen that silver and silver alloys (APC-TR and ACA) have a lower reflectivity at or near the wavelength of 313 nm than that of aluminum. In the photo-alignment treatment, for imparting a pretilt angle to the liquid crystal molecules, irradiation with polarized ultraviolet light is performed from a direction inclined relative to the substrate normal direction (for example, a direction forming an angle of 5° to 70°). Silver and silver alloys have a low reflectivity at or near the wavelength of 313 nm, and thus, when the reflective electrode RE includes silver or silver alloys, re-isomerization reaction due to light reflected on the reflective electrode RE is less likely to occur, so that occurrence of tilt return, disturbance of the pretilt azimuth, and the like can be suppressed. The "tilt return" is a phenomenon in which the pretilt angle approaches 90° from a desired angle, and causes a decrease in alignment regulating force and a shift in electro-optical response characteristics. It can be said that silver and silver alloys have a reflectivity spectrum suitable for photo-alignment treatment of the vertical alignment film (first vertical alignment film 14) on the TFT substrate 10 side.

Note that the silver alloy used as the material of the reflective electrode RE is not limited to the exemplified APC-TR and ACA. In the present specification, the silver alloy is an alloy containing silver as a main component, and the silver content of the silver alloy is, for example, 97 mass % or more. Examples of the metal other than silver contained in the silver alloy include germanium, bismuth, and tin in addition to palladium, copper, and gold described above. The composition of the silver alloy is preferably such that the reflectivity with respect to light having a wavelength of 313 nm is 10% or less, more preferably 5% or less.

Figure 12:
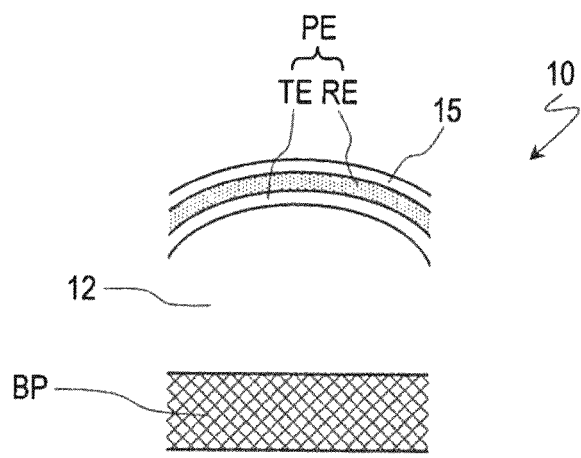
FIG. 12 is a view illustrating another example of a configuration of a TFT substrate 10 included in the liquid crystal display device 100.

FIG. 12 illustrates another example of the configuration of the TFT substrate 10. In the example illustrated in FIG. 12, the TFT substrate 10 further includes a transparent conductive layer 15 formed on the reflective electrode RE. The transparent conductive layer 15 includes a transparent conductive material (for example, ITO) and is provided immediately above the reflective electrode RE (that is, to be in contact with the reflective electrode RE). When the transparent conductive layer 15 is formed on the reflective electrodes RE including silver or a silver alloy, the reflectivity with respect to light having a wavelength of 313 nm can be further reduced.

Figure 13:
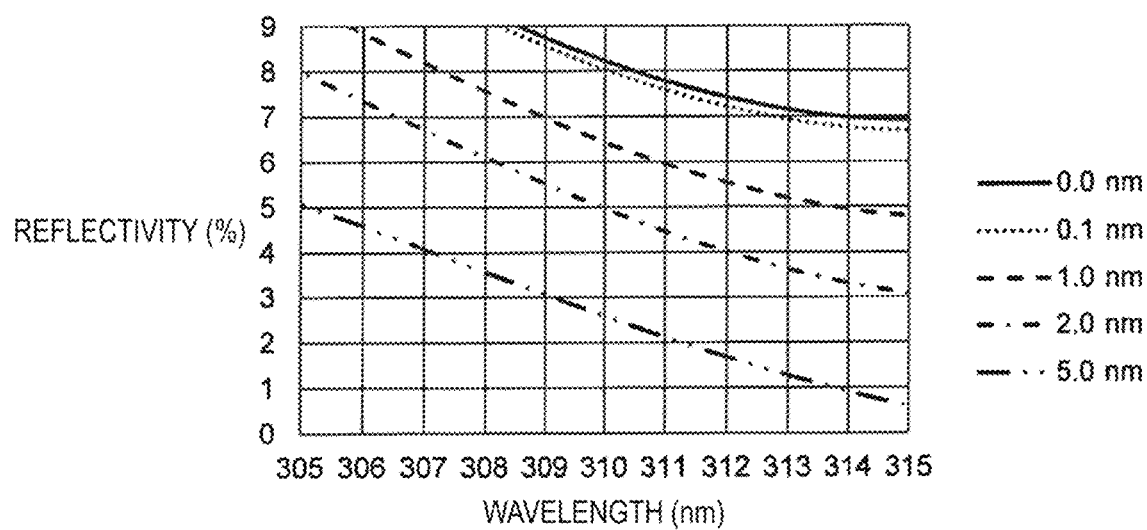
FIG. 13 is a graph showing a result of simulation calculation of a reflectivity spectrum by changing a thickness of an ITO layer in a configuration in which the ITO layer is provided on a reflective electrode RE including APC-TR.

FIG. 13 shows results obtained by simulation calculation of a reflectivity spectrum by changing, in a configuration in which the transparent conductive layer 15 including ITO (hereinafter referred to as an "ITO layer") is provided on the reflective electrode RE including APC-TR, the thickness of the ITO layer. From FIG. 13, it can be seen that in a case where the ITO layer is formed on the reflective electrodes RE and has thicknesses of 0.1 nm, 1.0 nm, 2.0 nm, and 5.0 nm, the reflectivity with respect to light having a wavelength of 313 nm is lower than that in a case where the ITO layer is not formed on the reflective electrodes RE (in a case where the thickness is 0.0 nm).

Figure 14A:
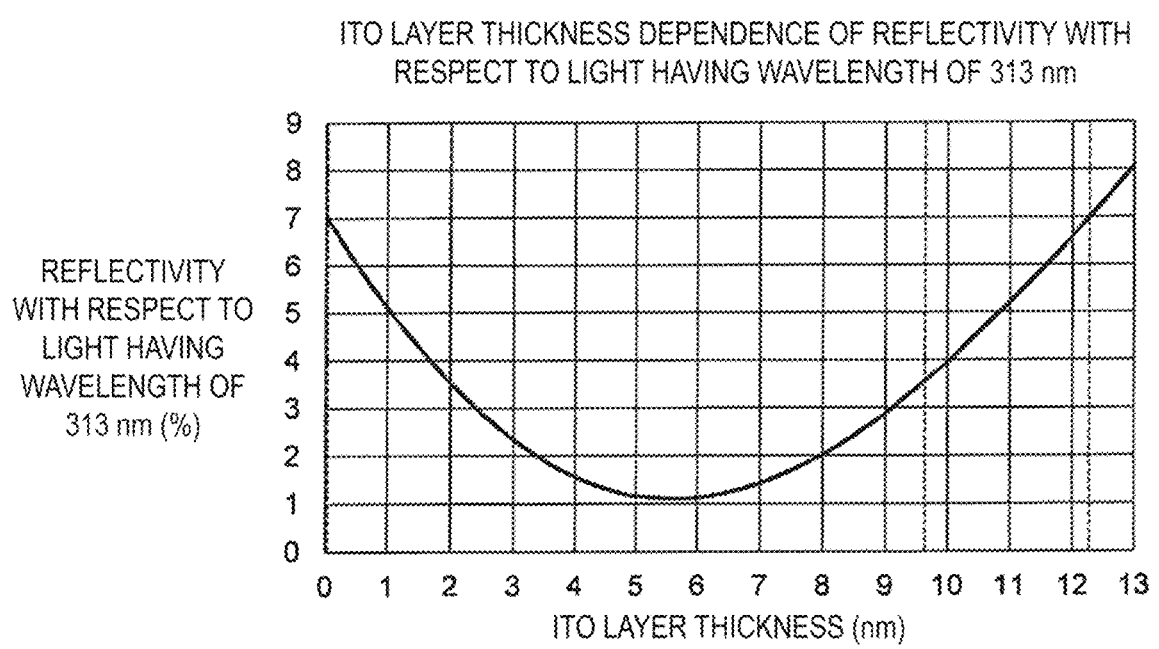
FIG. 14A is a graph showing a result obtained by simulation calculation of a relationship between a reflectivity with respect to light having a wavelength of 313 nm and a thickness of the ITO layer.

FIG. 14A shows a result of relationship between the reflectivity with respect to light having a wavelength of 313 nm and the thickness of the ITO layer obtained by simulation calculation. As shown in FIG. 14A, the reflectivity is 7.08% in a case where the ITO layer has a thickness of 0 nm (that is, in a case where the ITO layer is not formed), whereas the reflectivity can be made 7.0% or less when the ITO layer has a thickness of 0.04 nm or more and 12.28 nm or less. Furthermore, when the ITO layer has a thickness of 1.99 nm or more and 9.64 nm or less, the reflectivity can be made 3.54% or less (that is, a half or less of the reflectivity in the case where the ITO layer is not formed). Thus, the thickness of the ITO layer is preferably 0.04 nm or more and 12.28 nm or less, and more preferably 1.99 nm or more and 9.64 nm or less.

Figure 14B:
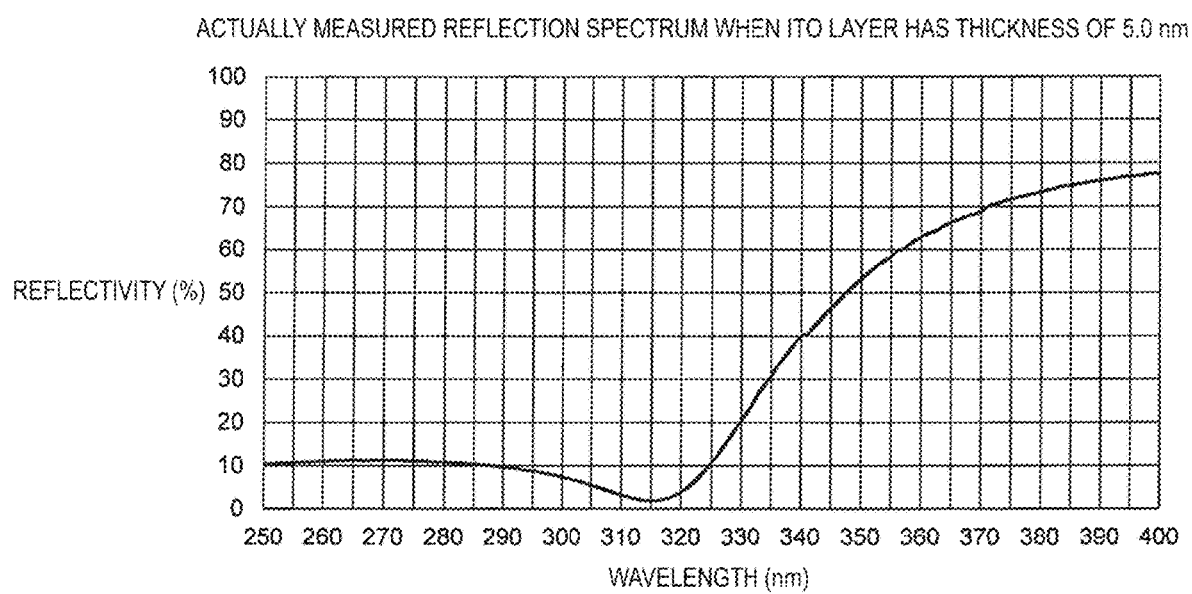
FIG. 14B is a graph showing a reflection spectrum actually measured by making a sample in which an ITO layer having a thickness of 5 nm is formed on the reflective electrode RE including APC-TR.

FIG. 14B shows a reflection spectrum actually measured by making a sample in which an ITO layer having a thickness of 5 nm is formed on the reflective electrode RE including APC-TR. As shown in FIG. 14B, the reflectivity with respect to the light having a wavelength of 313 nm is 2.2%, and it is confirmed that the reflectivity can be reduced to the same degree as the results of the simulation calculation shown in FIGS. 13 and 14A.

Table 5 shows visible light reflectivity for aluminum, silver, ACA, APC-TR, and a layered body in which an ITO layer having a thickness of 5 nm is formed on an APC-TR layer. From Table 5, it can be seen that when the reflective electrode RE includes silver or a silver alloy, bright display can be realized as compared with a case where the reflective electrode RE includes aluminum.

TABLE 5

|  | Aluminum | Silver | ACA | APC-TR | ITO: 5 nm/APC-TR |
|---|---|---|---|---|---|
| Visible light reflectivity (%) | 82.7 | 97.7 | 96.4 | 95.4 | 93.6 |

Note that as the material of the transparent conductive layer 15 provided on the reflective electrode RE, a transparent conductive material other than ITO (for example, indium zinc oxide) may be used.

Figure 15:
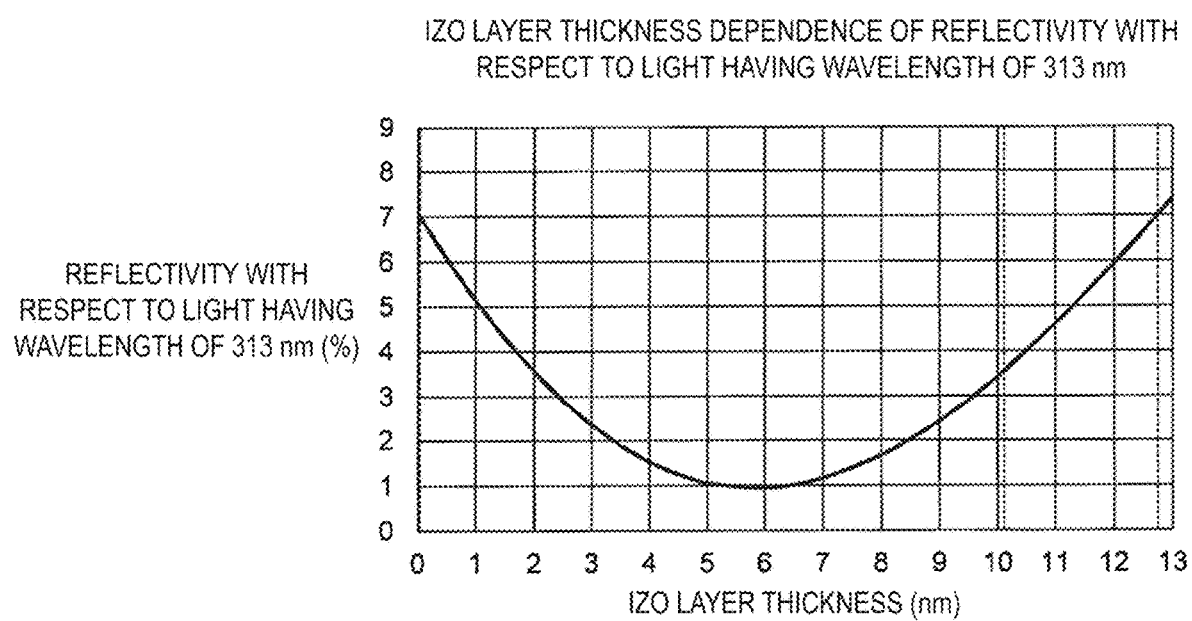
FIG. 15 is a graph showing a result obtained by simulation calculation of a relationship between a reflectivity with respect to light having a wavelength of 313 nm and a thickness of an IZO layer.

FIG. 15 shows a result of relationship, in a configuration in which the transparent conductive layer 15 including indium zinc oxide (hereinafter referred to as an "IZO layer") is provided on the reflective electrodes RE including APC-TR, between the reflectivity with respect to light having a wavelength of 313 nm and the thickness of the IZO layer obtained by simulation calculation. As shown in FIG. 15, the reflectivity is 7.08% in a case where the IZO layer has a thickness of 0 nm (that is, in a case where the IZO layer is not formed), whereas the reflectivity can be made 7.0% or less when the IZO layer has a thickness of 0.04 nm or more and 12.74 nm or less. Further, when the IZO layer has a thickness of 2.02 nm or more and 10.11 nm or less, the reflectivity can be made 3.54% or less (that is, a half or less of the reflectivity in a case where the IZO layer is not formed). Thus, the thickness of the IZO layer is preferably 0.04 nm or more and 12.74 nm or less, and more preferably 2.02 nm or more and 10.11 nm or less.

In addition, although in the present embodiment, a configuration in which the counter substrate 20 does not include a black matrix has been exemplified, the counter substrate 20 may include a black matrix formed to be positioned between pixels P. When the black matrix of the counter substrate 20 is omitted as in the present embodiment, brighter display can be realized.

Second Embodiment

Figure 16:
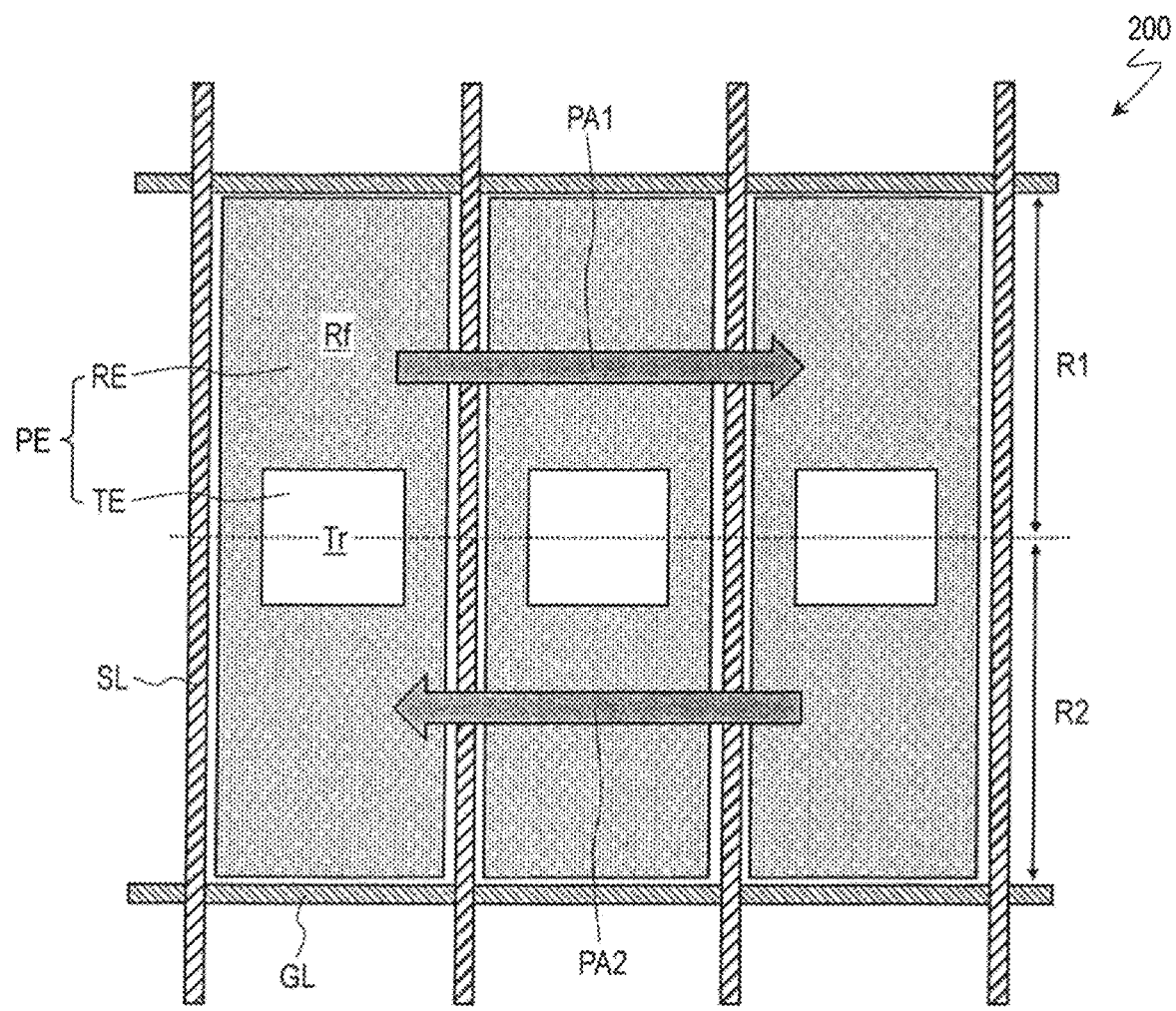
FIG. 16 is a plan view schematically illustrating another liquid crystal display device 200 according to an embodiment of the disclosure, illustrating a region corresponding to three pixels P.

A liquid crystal display device 200 according to a present embodiment will be described with reference to FIG. 16. FIG. 16 is a plan view schematically illustrating the liquid crystal display device 200. The following description will primarily focus on differences between the liquid crystal display device 200 and the liquid crystal display device 100 of the first embodiment. Among constituent elements of the liquid crystal display device 200, constituent elements having the same functions as the constituent elements of the liquid crystal display device 100 are denoted by the same reference signs, and descriptions thereof are omitted (the same applies in subsequent embodiments).

The liquid crystal display device 200 is different from the liquid crystal display device 100 of the first embodiment in that the second vertical alignment film 24 of the counter substrate 20 is not subjected to photo-alignment treatment. That is, in the liquid crystal display device 200, only the first vertical alignment film 14 of the TFT substrate 10 is subjected to photo-alignment treatment.

The pretilt azimuth by the first vertical alignment film 14 is different between the upper half (first alignment region) R1 and the lower half (second alignment region) R2 of the pixel P. As illustrated in FIG. 16, of pretilt azimuths PA1 and PA2 by the first vertical alignment film 14, the pretilt azimuth PA1 in the first alignment region R1 is a substantially 0° direction, and the pretilt azimuth PA2 in the second alignment region R2 is a substantially 180° direction.

Figure 17:
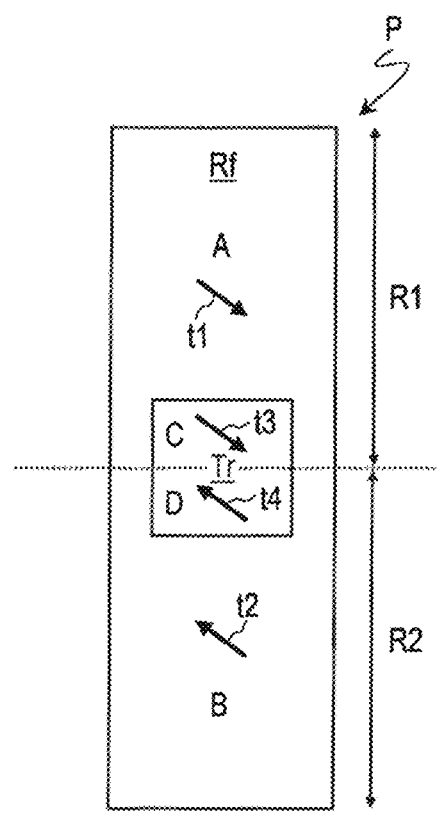
FIG. 17 is a diagram illustrating liquid crystal domains A to D formed in each pixel P of the liquid crystal display device 200.

The pretilt azimuth by the first vertical alignment film 14 is set as described above, and thus, in the liquid crystal display device 200 according to the present embodiment, when a voltage is applied to the liquid crystal layer 30, a plurality of liquid crystal domains are formed in each of the reflective region Rf and the transmissive region Tr. FIG. 17 is a diagram illustrating liquid crystal domains A to D formed in each pixel P.

As illustrated in FIG. 17, two liquid crystal domains A and B are formed in the reflective region Rf, and two liquid crystal domains C and D are formed in the transmissive region Tr. A chiral pitch is set in such a manner that the twist angle is substantially 70°, and thus, reference alignment azimuths t1 and t3 of the liquid crystal domains A and C located in the first alignment region R1 are a substantially 325° direction, and reference alignment azimuths t2 and t4 of the liquid crystal domains B and D located in the second alignment region R2 are a substantially 145° direction. Note that the liquid crystal domains A and C are adjacent to each other and the reference alignment azimuths t1 and t3 thereof are the same (substantially 325° direction), and thus, they can also be regarded as one liquid crystal domain. Similarly, the liquid crystal domains B and D are adjacent to each other and the reference alignment azimuths t2 and t4 thereof are the same (substantially 145° direction), and thus, they can also be regarded as one liquid crystal domain.

As described above, also in the present embodiment, the reflective region Rf includes a plurality of liquid crystal domains A and B in which the reference alignment azimuths of the liquid crystal molecules 31 are different from each other. In addition, the transmissive region Tr includes a plurality of liquid crystal domains C and D in which the reference alignment azimuths of the liquid crystal molecules 31 are different from each other. That is, each of the reflective region Rf and the transmissive region Tr is formed into a multi-domain (here, formed into two domains). This improves the viewing angle characteristics of the reflective display and the transmissive display. In addition, in the present embodiment, only one (first vertical alignment film 14) of the first vertical alignment film 14 and the second vertical alignment film 24 is subjected to photo-alignment treatment and the other (second vertical alignment film 24) is not subjected to the photo-alignment treatment, but the liquid crystal layer 30 includes a chiral agent, so that as in the liquid crystal display device 100 of the first embodiment, the alignment azimuth angle of the liquid crystal molecules 31 can be gradually changed from the TFT substrate 10 side to the counter substrate 20 side to realize a desired twist angle. Hereinafter, results of verifying these points will be described for Example 2 having specifications shown in Table 6 and Table 7.

TABLE 6

| Example 2 Pretilt azimuth | | | |
| --- | --- | --- | --- |
| TFT substrate side | | Counter substrate side | |
| First alignment region | Second alignment region | First alignment region | Second alignment region |
| 0° | 180° | — | — |

TABLE 7

| Example 2 | |
| --- | --- |
| Configuration of front circular polarizer | Configuration of back circular polarizer |
| Linear polarizer: 45° | λ/4 plate with reverse wavelength dispersion (Re 140 nm): 0° |
| λ/4 plate with reverse wavelength dispersion (Re 140 nm): 90° | Linear polarizer: 135° |
| Negative C-plate (Rth 190 nm) | — |

As shown in Table 6, the pretilt azimuth defined by the first vertical alignment film 14 is the 0° direction in the first alignment region R1, and is the 180° direction in the second alignment region R2. As shown in Table 7, the front circular polarizer 40B includes a linear polarizer having an absorption axis set in the 45° direction, a λ/4 plate having a slow axis set in the 90° direction, and a negative C-plate in this order from the observer side. In addition, the back circular polarizer 40A includes a λ/4 plate having a slow axis set in the 0° direction and a linear polarizer having an absorption axis set in the 135° direction in this order from the observer side. As can be seen from Table 7, the configurations of the front circular polarizer 40B and the back circular polarizer 40A of Example 2 are the same as those of the front circular polarizer 40B and the back circular polarizer 40A of Example 1 except for the direction of the absorption axis of the linear polarizer and the direction of the slow axis of the λ/4 plate.

Figure 18A:
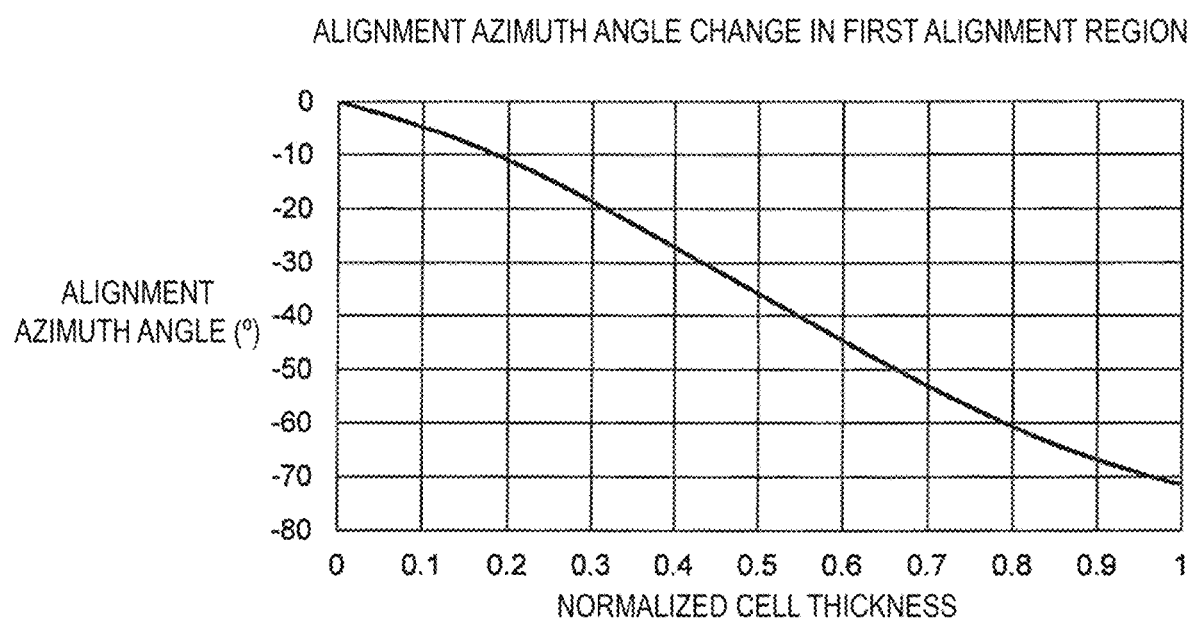
FIG. 18A is a graph showing a change in an alignment azimuth angle of liquid crystal molecules 31 along a cell thickness direction when a white display voltage is applied to a liquid crystal layer 30 in Example 2.
Figure 18B:
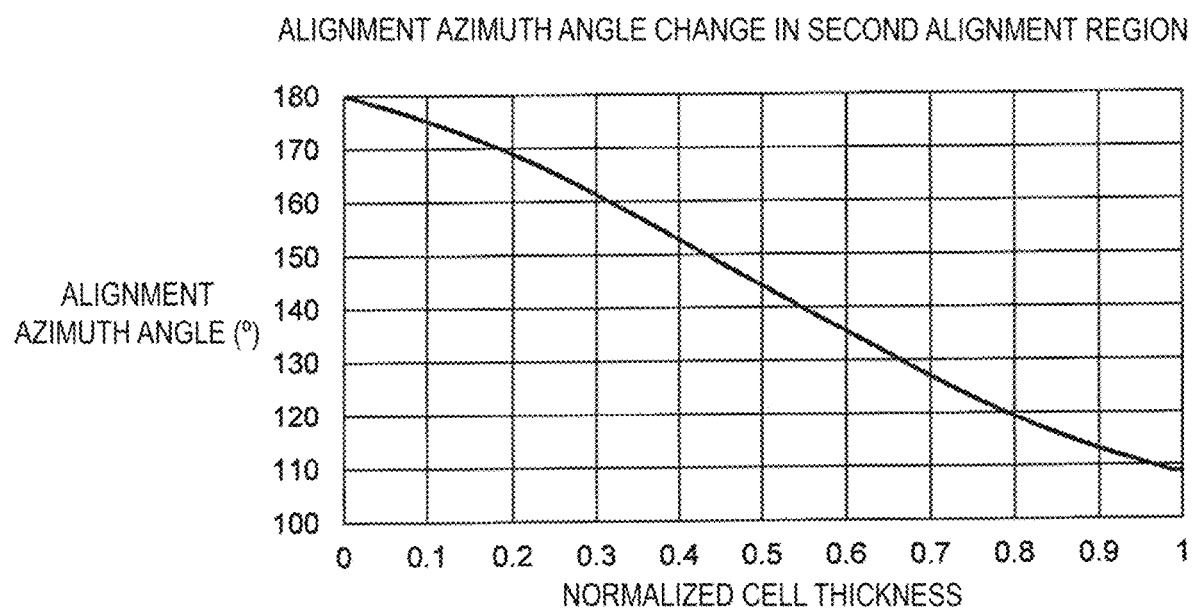
FIG. 18B is a graph showing a change in the alignment azimuth angle of the liquid crystal molecules 31 along the cell thickness direction when the white display voltage is applied to the liquid crystal layer 30 in Example 2.

FIGS. 18A and 18B each show a change in the alignment azimuth angle of the liquid crystal molecules 31 along the cell thickness direction when a voltage of 5 V (white display voltage) is applied to the liquid crystal layer 30. FIG. 18A shows a change in the alignment azimuth angle in the first alignment region R1, and FIG. 18B shows a change in the alignment azimuth angle in the second alignment region R2. A position where the normalized cell thickness is 0 corresponds to an interface between the TFT substrate 10 and the liquid crystal layer 30, and a position where the normalized cell thickness is 1 corresponds to an interface between the counter substrate 20 and the liquid crystal layer 30.

From FIGS. 18A and 18B, it can be seen that the alignment azimuth angle gradually changes from the TFT substrate 10 side to the counter substrate 20 side in each of the first alignment region R1 and the second alignment region R2. As described above, even in a case where only one of the first vertical alignment film 14 and the second vertical alignment film 24 is subjected to photo-alignment treatment, when the liquid crystal layer 30 includes a chiral agent, it is possible to realize a moderate change in the alignment azimuth angle and a sufficient twist angle with which the wavelength dispersion of retardation of the liquid crystal layer 30 is reduced. Note that the magnitude of the twist angle can be appropriately controlled by adjusting the chiral pitch.

Figure 19:
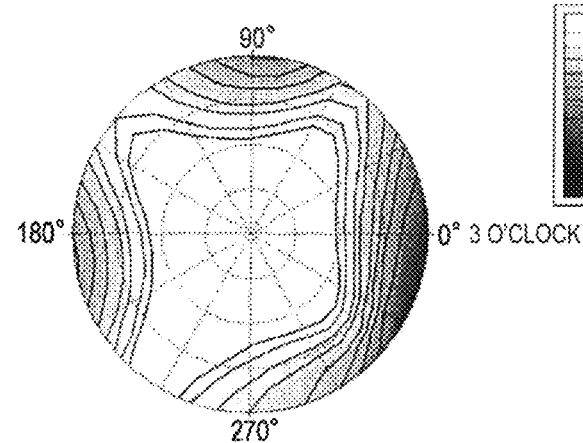
FIG. 19 is a diagram showing contrast viewing angle characteristics in Example 2 obtained by simulation calculation for reflective display.
Figure 19:
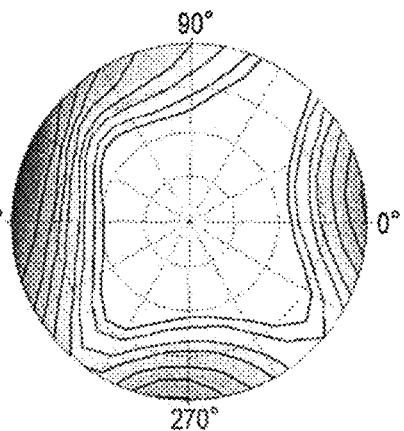
Figure 19:
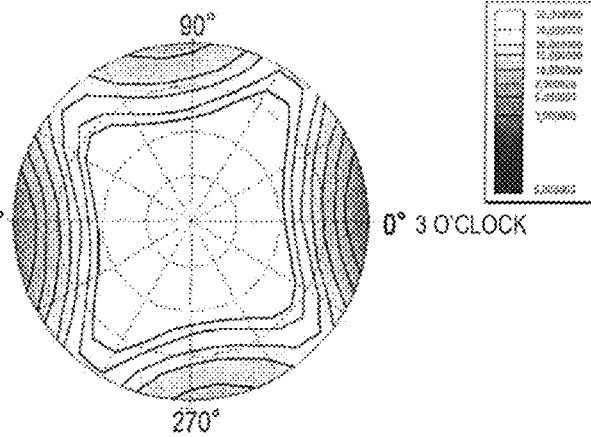
Figure 20:
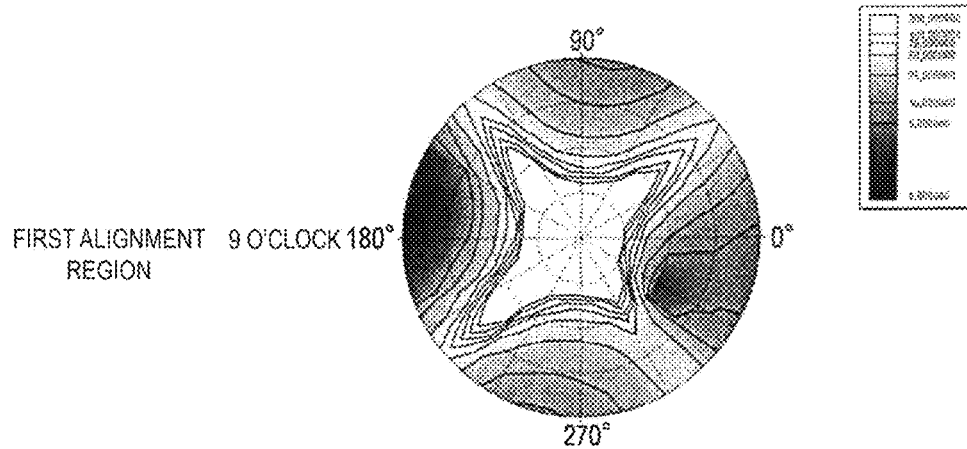
FIG. 20 is a diagram showing contrast viewing angle characteristics in Example 2 obtained by simulation calculation for transmissive display.
Figure 20:
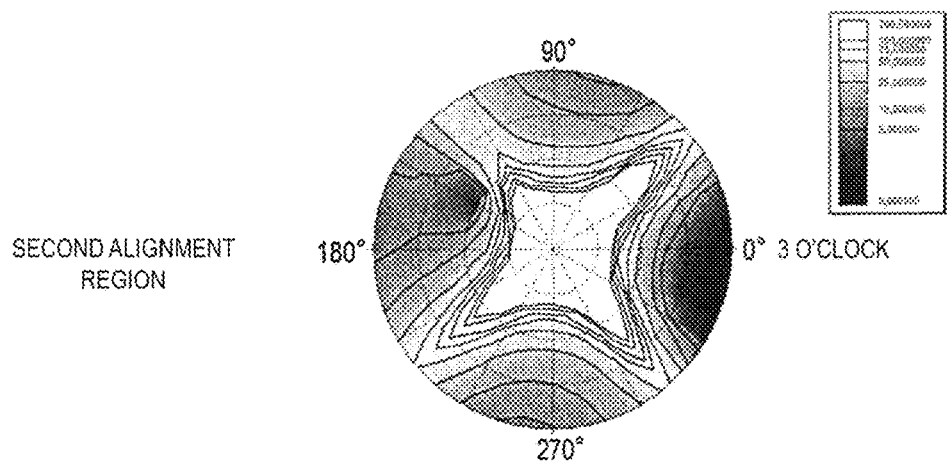
Figure 20:
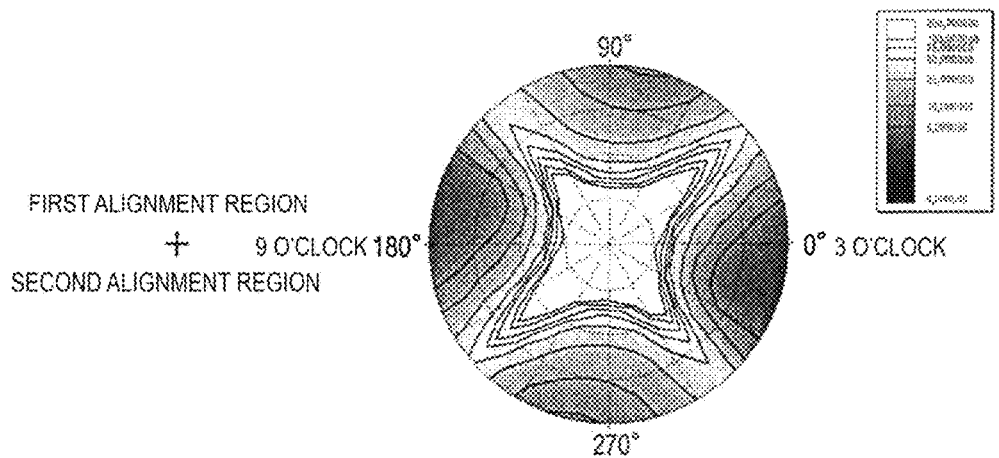

FIGS. 19 and 20 show contrast viewing angle characteristics of Example 2 for the reflective display and the transmissive display, respectively.

From comparison between the upper part and the middle part of FIG. 19 and the lower part of FIG. 19, it can be seen that contrast viewing angles in a 3 o'clock direction and a 9 o'clock direction are ameliorated in the entire reflective region Rf of the two-domain structure as compared with those of the region of the mono-domain structure (each of the first alignment region R1 and the second alignment region R2). In addition, from comparison between the upper part and the middle part of FIG. 20 and the lower part of FIG. 20, it can be seen that contrast viewing angles in the 3 o'clock direction and the 9 o'clock direction are ameliorated in the entire transmissive region Tr of the two-domain structure as compared with those of the region having the mono-domain structure (each of the first alignment region R1 and the second alignment region R2).

As described above, it was confirmed that even in a case where only one of the first vertical alignment film 14 and the second vertical alignment film 24 was subjected to photo-alignment treatment, the contrast viewing angle characteristics of both the reflective display and the transmissive display can be improved (ameliorated) by forming each of the reflective region Rf and the transmissive region Tr into two domains.

When only one of the first vertical alignment film 14 and the second vertical alignment film 24 is subjected to photo-alignment treatment (that is, the photo-alignment treatment on the other is omitted), the manufacturing cost can be reduced, so that both favorable viewing angle characteristics and a reduction in manufacturing cost can be achieved.

In addition, in the present embodiment, only the first vertical alignment film 14 of the TFT substrate 10 is subjected to photo-alignment treatment, and thus, it is possible to omit the black matrix of the counter substrate 20 even in a case where the scanning exposure method is adopted as the divided exposure method. When the counter substrate 20 has no black matrix (i.e., has a BM-less structure), the aperture ratio of the reflective region Rf (reflective aperture ratio) and/or the aperture ratio of the transmissive region Tr (transmissive aperture ratio) can be increased, and thus bright display with high reflectivity and/or transmittance can be realized.

Next, results of verifying an effect of improving the viewing angle characteristics in Example 3 having specifications shown in Table 8 will be described. Example 3 is different from Example 2 in the configurations of the front circular polarizer 40B and the back circular polarizer 40A, and is the same as Example 2 in the point that only the first vertical alignment film 14 is subjected to photo-alignment treatment and in the pretilt azimuths PA1 and PA2 by the first vertical alignment film 14.

TABLE 8

| Example 3 | |
|---|---|
| Configuration of front circular polarizer | Configuration of back circular polarizer |
| Linear polarizer: 45° | λ/4 plate with flat wavelength dispersion (Re 140 nm): 0° |
| λ/4 plate with flat wavelength dispersion (Re 140 nm): 90° | Linear polarizer: 135° |

As shown in Table 8, the front circular polarizer 40B of Example 3 includes a linear polarizer having an absorption axis set in a 45° direction and a λ/4 plate having a slow axis set in a 90° direction in this order from the observer side. The back circular polarizer 40A of Example 3 includes a λ/4 plate having a slow axis set in a 0° direction and a linear polarizer having an absorption axis set in a 135° direction in this order from the observer side. The λ/4 plate of the front circular polarizer 40B and the λ/4 plate of the back circular polarizer 40A have a flat wavelength dispersion characteristic having an Nz coefficient of 1.6, and have the retardation Re of 140 nm in the in-plane direction of the panel.

Figure 21:
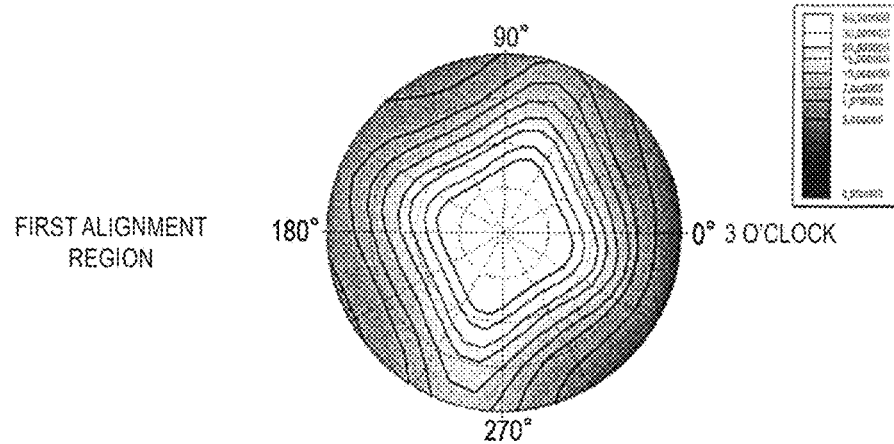
FIG. 21 is a diagram showing contrast viewing angle characteristics of Example 3 obtained by simulation calculation for reflective display.
Figure 21:
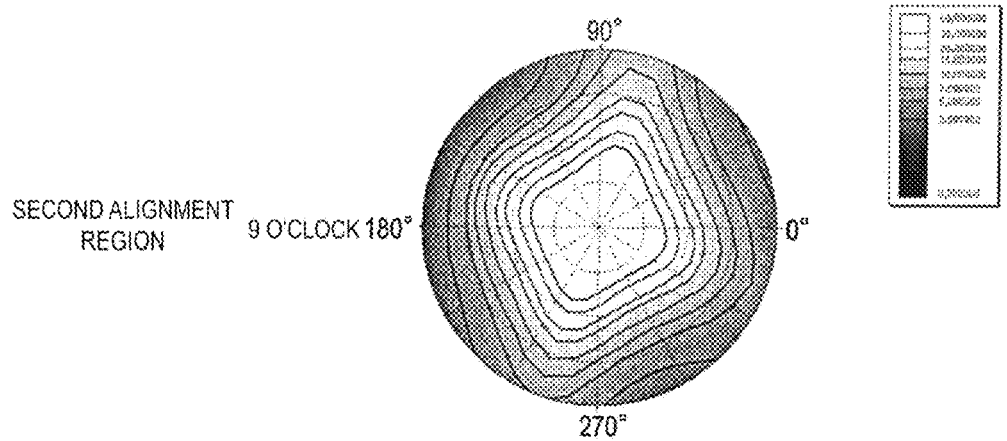
Figure 21:
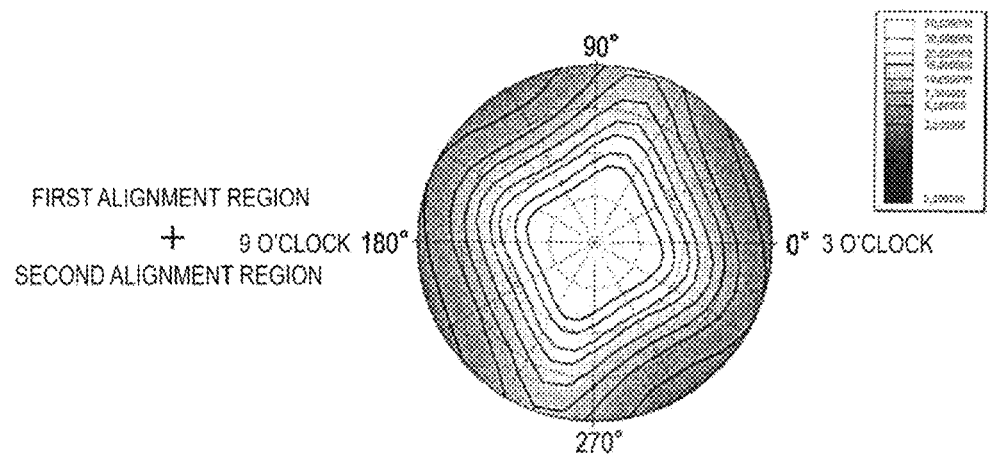
Figure 22:
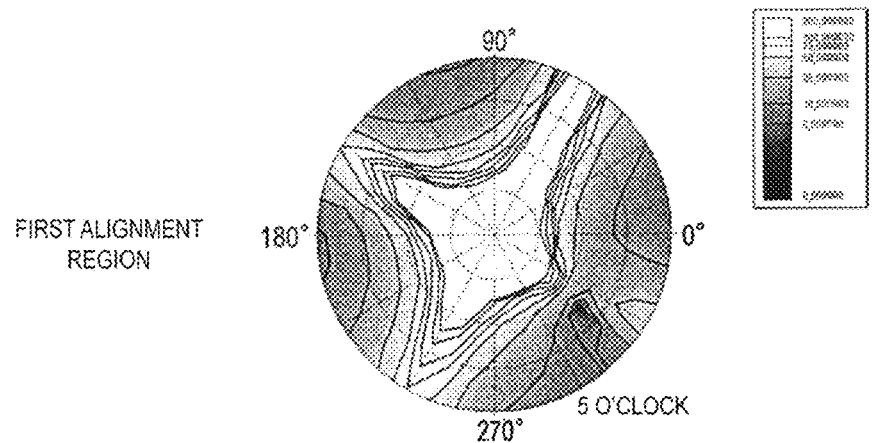
FIG. 22 is a diagram showing contrast viewing angle characteristics in Example 3 obtained by simulation calculation for transmissive display.
Figure 22:
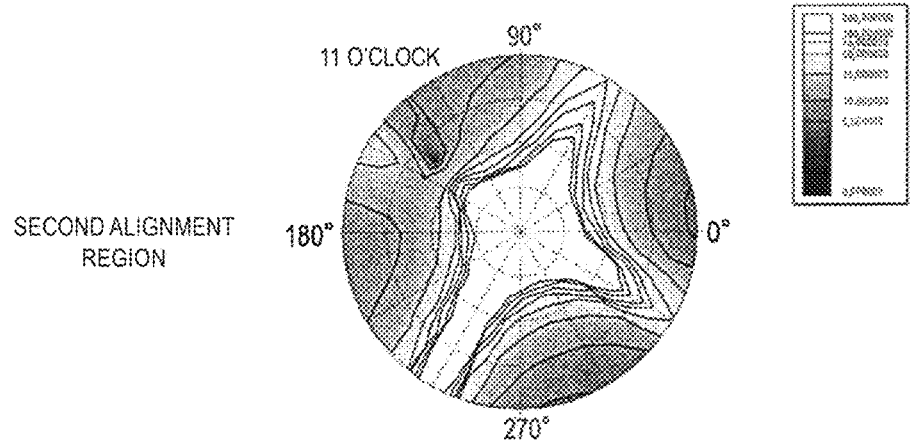
Figure 22:
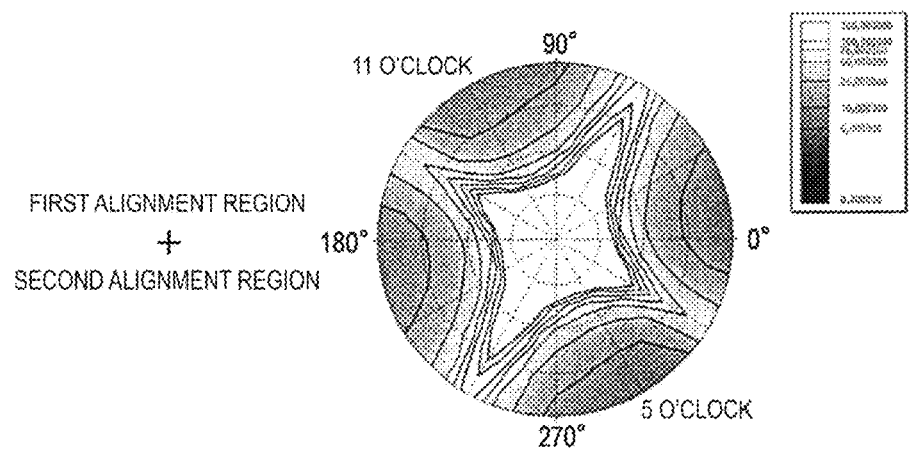

FIGS. 21 and 22 show contrast viewing angle characteristics of Example 3 for reflective display and transmissive display, respectively.

When the contrast viewing angle characteristics of the reflective display are focused on, a contrast ratio in the 3 o'clock direction is low as shown in the upper part of FIG. 21 only with the mono-domain structure of the first alignment region R1, and a contrast ratio in the 9 o'clock direction is low as shown in the middle part of FIG. 21 only with the mono-domain structure of the second alignment region R2. On the other hand, in the entire reflective region Rf of the two-domain structure, as shown in the lower part of FIG. 21, the contrast viewing angles in the 3 o'clock direction and the 9 o'clock direction are ameliorated.

In addition, when the contrast viewing angle of the transmissive display is focused on, a contrast ratio in the 5 o'clock direction is low as shown in the upper part of FIG. 22 only with the mono-domain structure of the first alignment region R1, and a contrast ratio in the 11 o'clock direction is low as shown in the middle part of FIG. 22 only with the mono-domain structure of the second alignment region R2. On the other hand, in the entire transmissive region Tr having the two-domain structure, as shown in the lower part of FIG. 22, the contrast viewing angles in the 5 o'clock direction and the 11 o'clock direction are ameliorated.

As described above, also in Example 3 in which the configurations of the front circular polarizer 40B and the back circular polarizer 40A were different from those of Example 2, it was confirmed that the contrast viewing angle characteristics of both the reflective display and the transmissive display can be improved (ameliorated) by forming each of the reflective region Rf and the transmissive region Tr into two domains.

Next, a result of verifying an effect of improving the viewing angle characteristics in Example 4 having specifications shown in Table 9 will be described. Example 4 is different from Example 2 in the configurations of the front circular polarizer 40B and the back circular polarizer 40A, and is the same as Example 2 in the point that only the first vertical alignment film 14 is subjected to photo-alignment treatment and in the pretilt azimuths PA1 and PA2 by the first vertical alignment film 14.

TABLE 9

| Example 4 | |
|---|---|
| Configuration of front circular polarizer | Configuration of back circular polarizer |
| Linear polarizer: 135° | λ/4 plate with flat wavelength dispersion (Re 140 nm): 120° |
| λ/2 plate with flat wavelength dispersion (Re 260 nm): 150° | λ/2 plate with flat wavelength dispersion (Re 270 nm): 60° |
| λ/4 plate with flat wavelength dispersion (Re 140 nm): 30° | Linear polarizer: 45° |

As shown in Table 9, the front circular polarizer 40B of Example 4 includes a linear polarizer having an absorption axis set in a 135° direction, a λ/2 plate having a slow axis set in a 150° direction, and a λ/4 plate having a slow axis set in a 30° direction in this order from the observer side. The back circular polarizer 40A of Example 4 includes a λ/4 plate having a slow axis set in a 120° direction, a λ/2 plate having a slow axis set in a 60° direction, and a linear polarizer having an absorption axis set in a 45° direction in this order from the observer side. The λ/4 plate of the front circular polarizer 40B and the λ/4 plate of the back circular polarizer 40A have flat wavelength dispersion characteristics, and have the retardation Re of 140 nm in the in-plane direction of the panel. The λ/2 plate of the front circular polarizer 40B and the λ/2 plate of the back circular polarizer 40A have flat wavelength dispersion characteristics, and have the retardations Re of 260 nm and 270 nm in the in-plane direction of the panel, respectively. The front circular polarizer 40B and the back circular polarizer 40A of Example 4 each are a broadband circular polarizer including a combination of a λ/2 plate and a λ/4 plate having flat wavelength dispersion characteristics.

Figure 23:
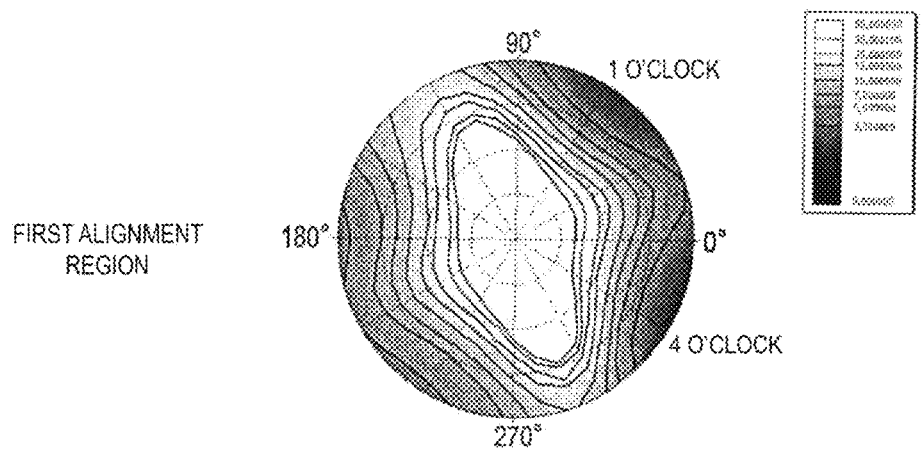
FIG. 23 is a diagram showing contrast viewing angle characteristics in Example 4 obtained by simulation calculation for reflective display.
Figure 23:
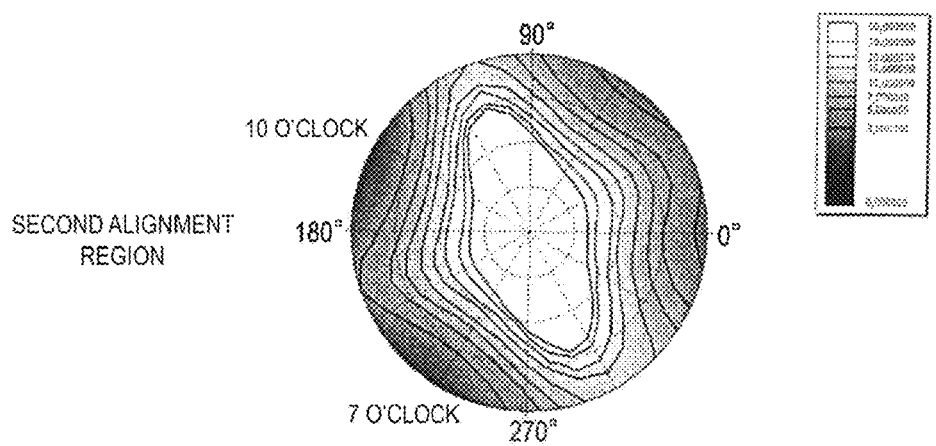
Figure 23:
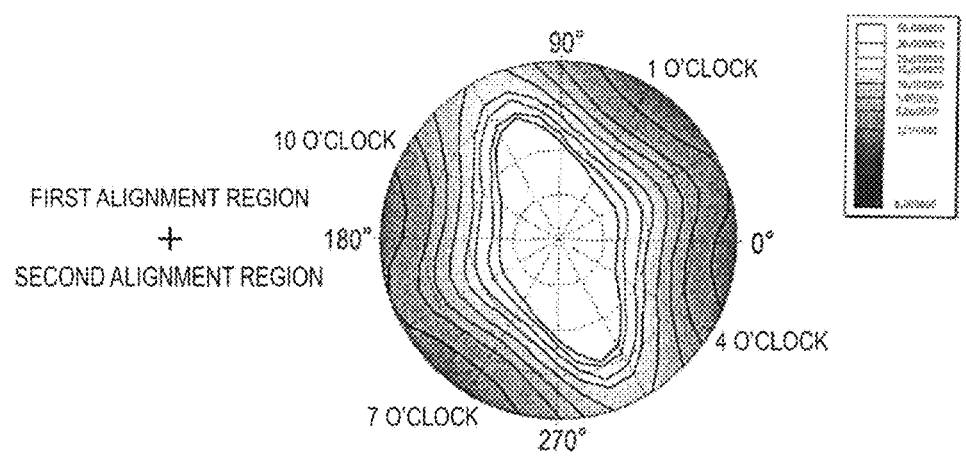
Figure 24:
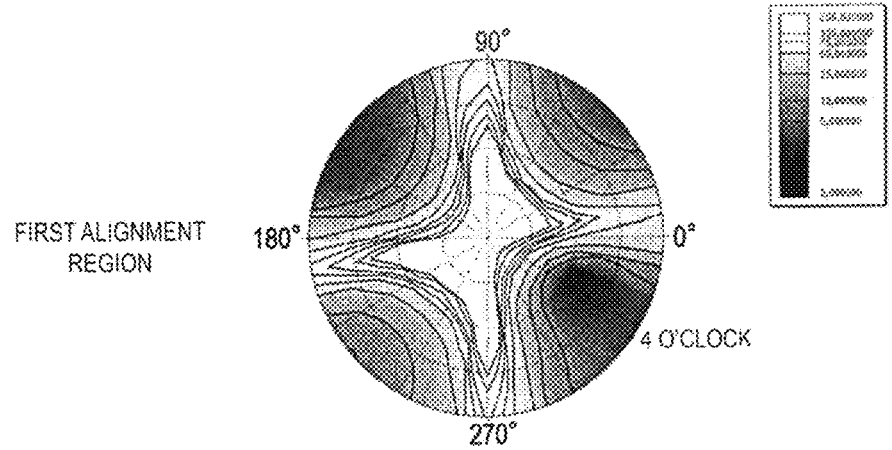
FIG. 24 is a diagram showing contrast viewing angle characteristics in Example 4 obtained by simulation calculation for transmissive display.
Figure 24:
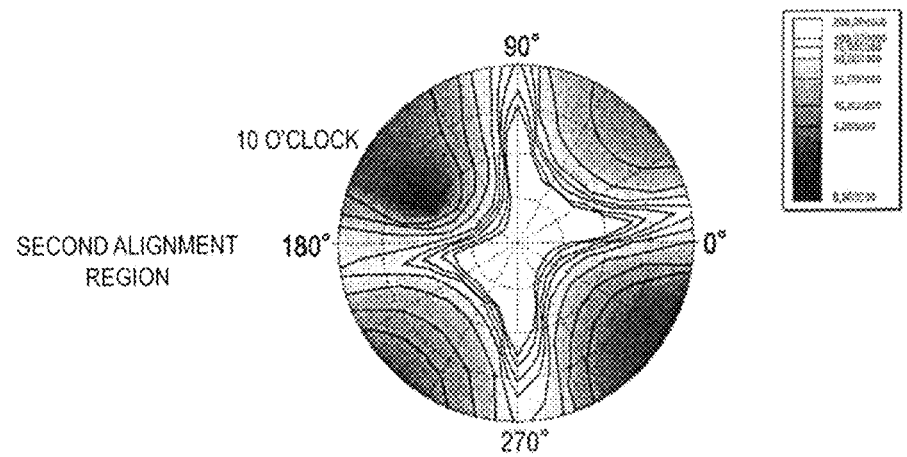
Figure 24:
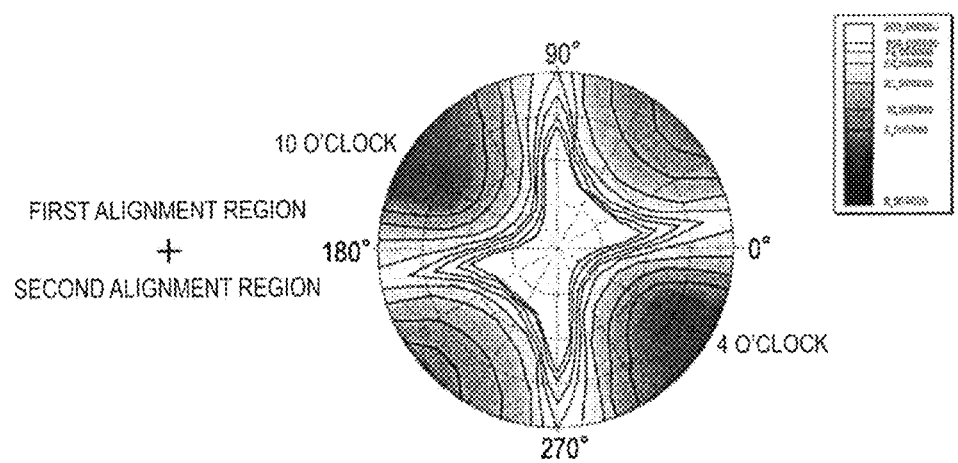

FIGS. 23 and 24 show contrast viewing angle characteristics of Example 4 for reflective display and transmissive display, respectively.

When the contrast viewing angle characteristics of the reflective display are focused on, contrast ratios in the 1 o'clock direction and the 4 o'clock direction are low as shown in the upper part of FIG. 23 only with the mono-domain structure of the first alignment region R1, and contrast ratios in the 7 o'clock direction and the 10 o'clock direction are low as shown in the middle part of FIG. 23 only with the mono-domain structure of the second alignment region R2. On the other hand, in the entire reflective region Rf of the two-domain structure, as shown in the lower part of FIG. 23, contrast viewing angles in the 1 o'clock direction, the 4 o'clock direction, the 7 o'clock direction, and the 10 o'clock direction are ameliorated.

In addition, when the contrast viewing angle of the transmissive display is focused on, a contrast ratio in the 4 o'clock direction is low as shown in the upper part of FIG. 24 only with the mono-domain structure of the first alignment region R1, and a contrast ratio in the 10 o'clock direction is low as shown in the middle part of FIG. 24 only with the mono-domain structure of the second alignment region R2. On the other hand, in the entire transmissive region Tr having the two-domain structure, as shown in the lower part of FIG. 24, contrast viewing angles in the 4 o'clock direction and the 10 o'clock direction are ameliorated.

As described above, also in Example 4 in which the configurations of the front circular polarizer 40B and the back circular polarizer 40A were different from those of Examples 2 and 3, it was confirmed that the contrast viewing angle characteristics of both the reflective display and the transmissive display can be improved (ameliorated) by forming each of the reflective region Rf and the transmissive region Tr into two domains.

Table 10 shows calculated values of the reflection contrast ratio in the front direction (panel normal direction) for Examples 2, 3, and 4.

TABLE 10

|  | Example 2 | Example 3 | Example 4 |
|---|---|---|---|
| Reflection contrast ratio | 166 | 68 | 112 |

As can be seen from Table 10, among Examples 2, 3, and 4, Example 2 has the highest reflection contrast ratio. Thus, from the viewpoint of increasing the reflection contrast ratio in the front direction, the front circular polarizer 40B and the back circular polarizer 40A preferably include the λ/4 plate having the reverse wavelength dispersion characteristics.

Third Embodiment

Figure 25:
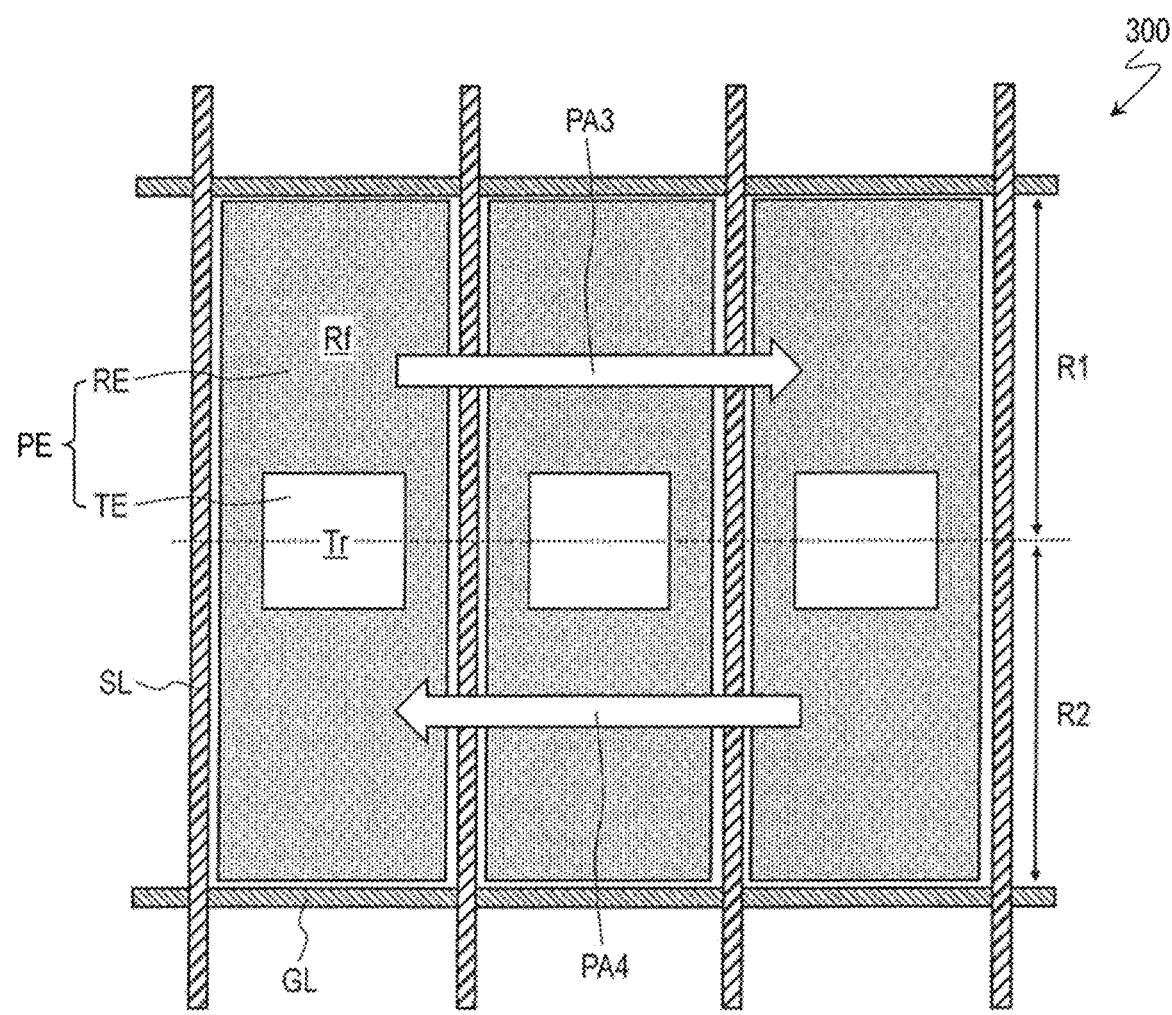
FIG. 25 is a plan view schematically illustrating yet another liquid crystal display device 300 according to an embodiment of the disclosure, illustrating a region corresponding to three pixels P.

A liquid crystal display device 300 of a present embodiment will be described with reference to FIG. 25. FIG. 25 is a plan view schematically illustrating the liquid crystal display device 300.

The liquid crystal display device 300 is different from the liquid crystal display device 100 of the first embodiment in that the first vertical alignment film 14 of the TFT substrate 10 is not subjected to photo-alignment treatment. That is, in the liquid crystal display device 300, only the second vertical alignment film 24 of the counter substrate 20 is subjected to photo-alignment treatment.

The pretilt azimuth by the second vertical alignment film 24 is different between an upper half (first alignment region) R1 and a lower half (second alignment region) R2 of the pixel P. As illustrated in FIG. 25, of pretilt azimuths PA3 and PA4 by the second vertical alignment film 24, the pretilt azimuth PA3 in the first alignment region R1 is a substantially 0° direction, and the pretilt azimuth PA4 in the second alignment region R2 is a substantially 180° direction.

Figure 26:
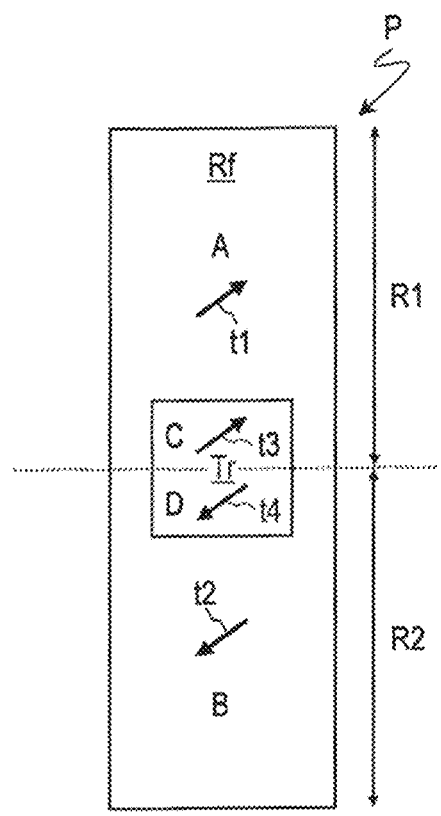
FIG. 26 is a diagram illustrating liquid crystal domains A to D formed in each pixel P of the liquid crystal display device 300.

The pretilt azimuths by the second vertical alignment film 24 are set as described above, and thus, in the liquid crystal display device 300 according to the present embodiment, when a voltage is applied to the liquid crystal layer 30, a plurality of liquid crystal domains are formed in each of the reflective region Rf and the transmissive region Tr. FIG. 26 is a diagram illustrating liquid crystal domains A to D formed in each pixel P.

As illustrated in FIG. 26, two liquid crystal domains A and B are formed in the reflective region Rf, and two liquid crystal domains C and D are formed in the transmissive region Tr. A chiral pitch is set in such a manner that the twist angle is substantially 70°, and thus, reference alignment azimuths t1 and t3 of the liquid crystal domains A and C located in the first alignment region R1 are a substantially 35° direction, and reference alignment azimuths t2 and t4 of the liquid crystal domains B and D located in the second alignment region R2 are a substantially 215° direction. Note that the liquid crystal domains A and C are adjacent to each other and the reference alignment azimuths t1 and t3 thereof are the same (substantially 35° direction), and can be thus regarded as one liquid crystal domain. Similarly, the liquid crystal domains B and D are adjacent to each other and the reference alignment azimuths t2 and t4 thereof are the same (substantially 215° direction), and can be thus regarded as one liquid crystal domain.

As described above, also in the present embodiment, the reflective region Rf includes a plurality of liquid crystal domains A and B in which the reference alignment azimuths of the liquid crystal molecules 31 are different from each other. In addition, the transmissive region Tr includes a plurality of liquid crystal domains C and D in which the reference alignment azimuths of the liquid crystal molecules 31 are different from each other. That is, each of the reflective region Rf and the transmissive region Tr is formed into a multi-domain (here, formed into two domains). This improves the viewing angle characteristics of the reflective display and the transmissive display. Hereinafter, a result of verifying an effect of improving the viewing angle characteristics for Example 5 having specifications shown in Tables 11 and 12 will be described.

TABLE 11

| Example 5 Pretilt azimuth | | | |
|---|---|---|---|
| TFT substrate side | | Counter substrate side | |
| First alignment region | Second alignment region | First alignment region | Second alignment region |
| — | — | 0° | 180° |

TABLE 12

| Example 5 | |
|---|---|
| Configuration of front circular polarizer | Configuration of back circular polarizer |
| Linear polarizer: 135° | λ/4 plate with reverse wavelength dispersion (Re 140 nm): 90° |
| λ/4 plate with reverse wavelength dispersion (Re 140 nm): 0° | Linear polarizer: 45° |
| Negative C-plate (Rth 190 nm) | — |

As shown in Table 11, the pretilt azimuth defined by the second vertical alignment film 24 is a 0° direction in the first alignment region R1, and is a 180° direction in the second alignment region R2. As shown in Table 12, the front circular polarizer 40B includes a linear polarizer having an absorption axis set in a 135° direction, a λ/4 plate having a slow axis set in a 0° direction, and a negative C-plate in this order from the observer side. The back circular polarizer 40A includes a λ/4 plate having a slow axis set in a 90° direction and a linear polarizer having an absorption axis set in a 45° direction in this order from the observer side. As can be seen from Table 12, the configurations of the front circular polarizer 40B and the back circular polarizer 40A of Example 5 are the same as those of the front circular polarizer 40B and the back circular polarizer 40A of Example 1 except for the direction of the absorption axis of the linear polarizer and the direction of the slow axis of the λ/4 plate.

Figure 27:
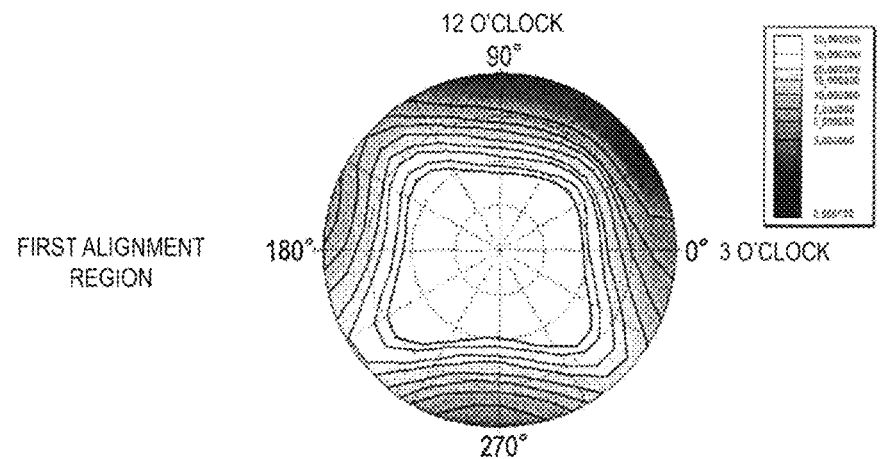
FIG. 27 is a diagram showing contrast viewing angle characteristics in Example 5 obtained by simulation calculation for reflective display.
Figure 27:
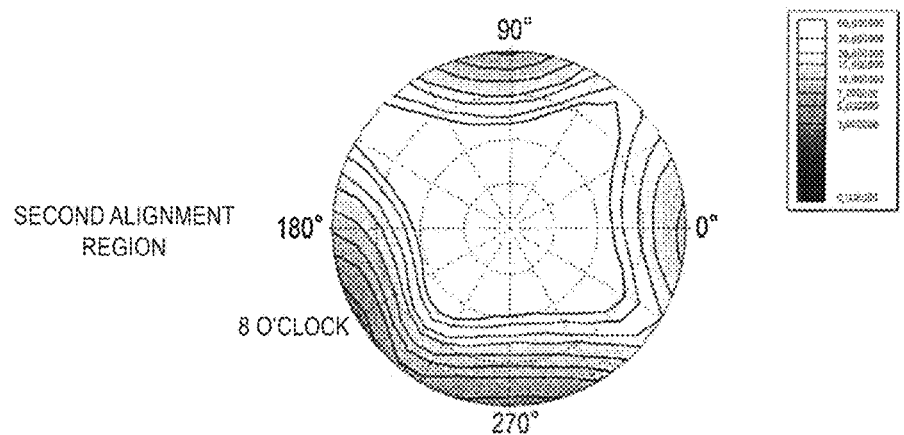
Figure 27:
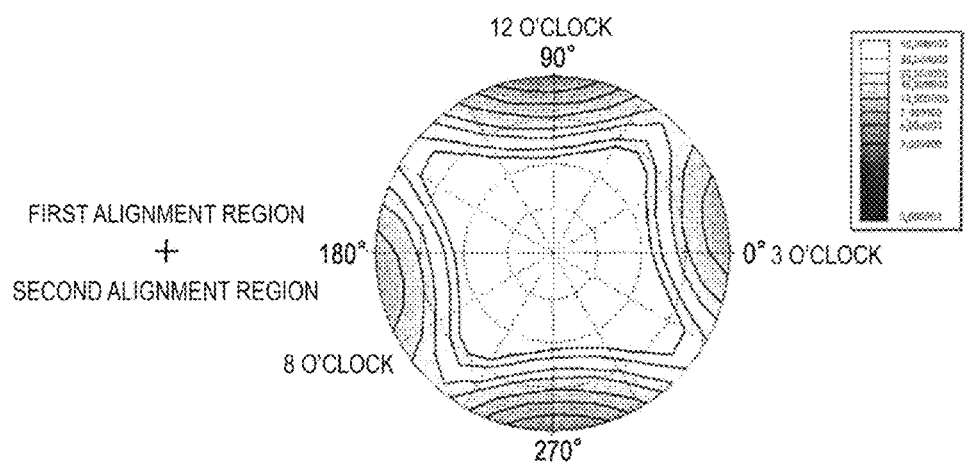
Figure 28:
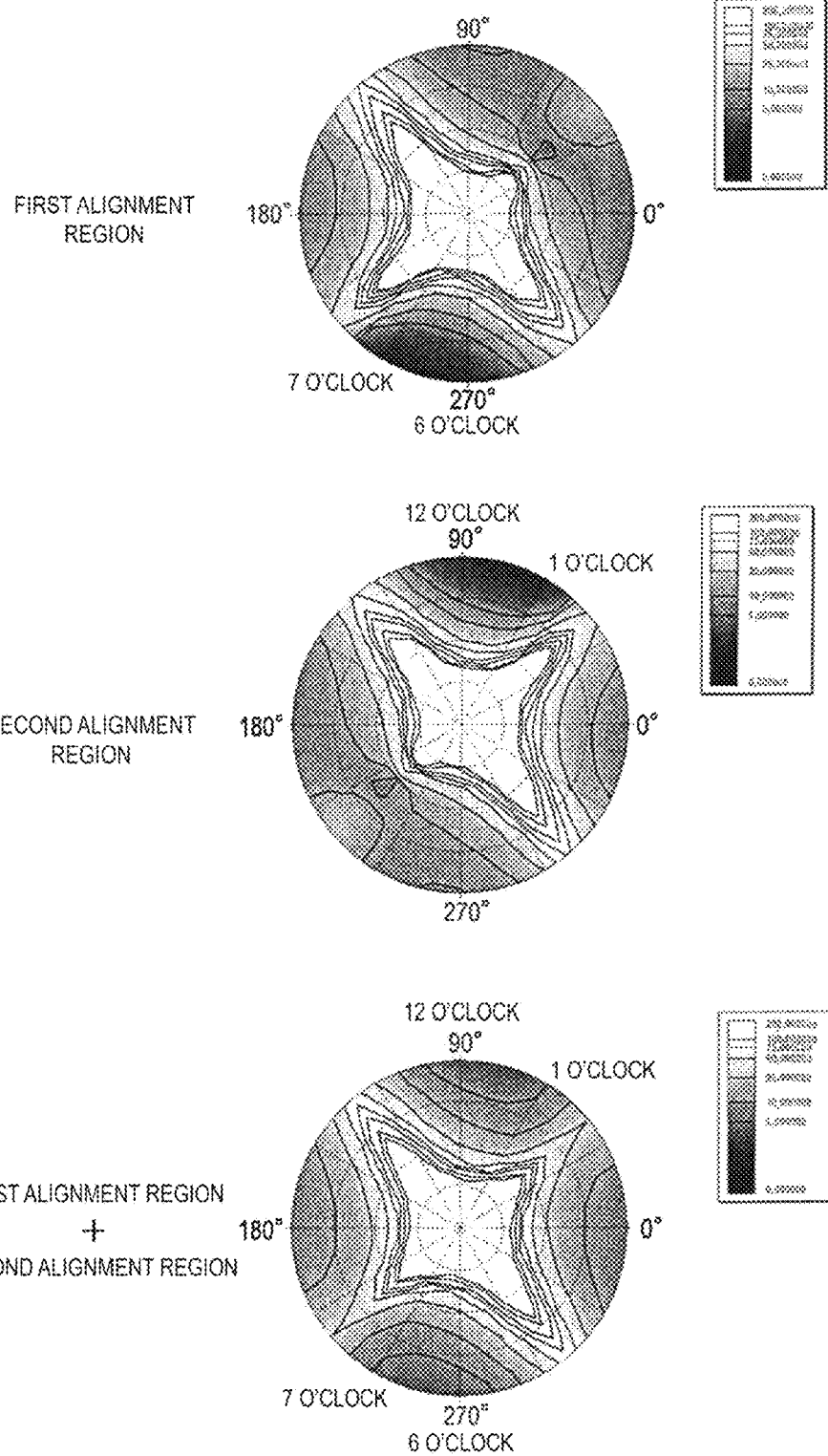
FIG. 28 is a diagram showing contrast viewing angle characteristics in Example 5 obtained by simulation calculation for transmissive display.

FIGS. 27 and 28 show contrast viewing angle characteristics of Example 5 for reflective display and transmissive display, respectively.

When the contrast viewing angle characteristics of the reflective display are focused on, contrast ratios in 12 to 3 o'clock direction are low as shown in the upper part of FIG. 27 only with the mono-domain structure of the first alignment region R1, and a contrast ratio in an 8 o'clock direction is low as shown in the middle part of FIG. 27 only with the mono-domain structure of the second alignment region R2. On the other hand, in the entire reflective region Rf having the two-domain structure, as shown in the lower part of FIG. 27, the contrast viewing angles in the 12 to 3 o'clock directions and the 8 o'clock direction are ameliorated.

In addition, when the contrast viewing angle of the transmissive display is focused on, contrast ratios in the 6 to 7 o'clock directions are low as shown in the upper part of FIG. 28 only with the mono-domain structure of the first alignment region R1, and contrast ratios in the 12 to 1 o'clock directions are low as shown in the middle part of FIG. 28 only with the mono-domain structure of the second alignment region R2. On the other hand, in the entire transmissive region Tr having the two-domain structure, as shown in the lower part of FIG. 28, the contrast viewing angles in the 6 to 7 o'clock directions and the 12 to 1 o'clock directions are ameliorated.

As described above, it was confirmed that even in a case where only the second vertical alignment film 24 of the first vertical alignment film 14 and the second vertical alignment film 24 was subjected to photo-alignment treatment, the contrast viewing angle characteristics of both the reflective display and the transmissive display can be improved (ameliorated) by forming each of the reflective region Rf and the transmissive region Tr into two domains.

Fourth Embodiment

Figure 29:
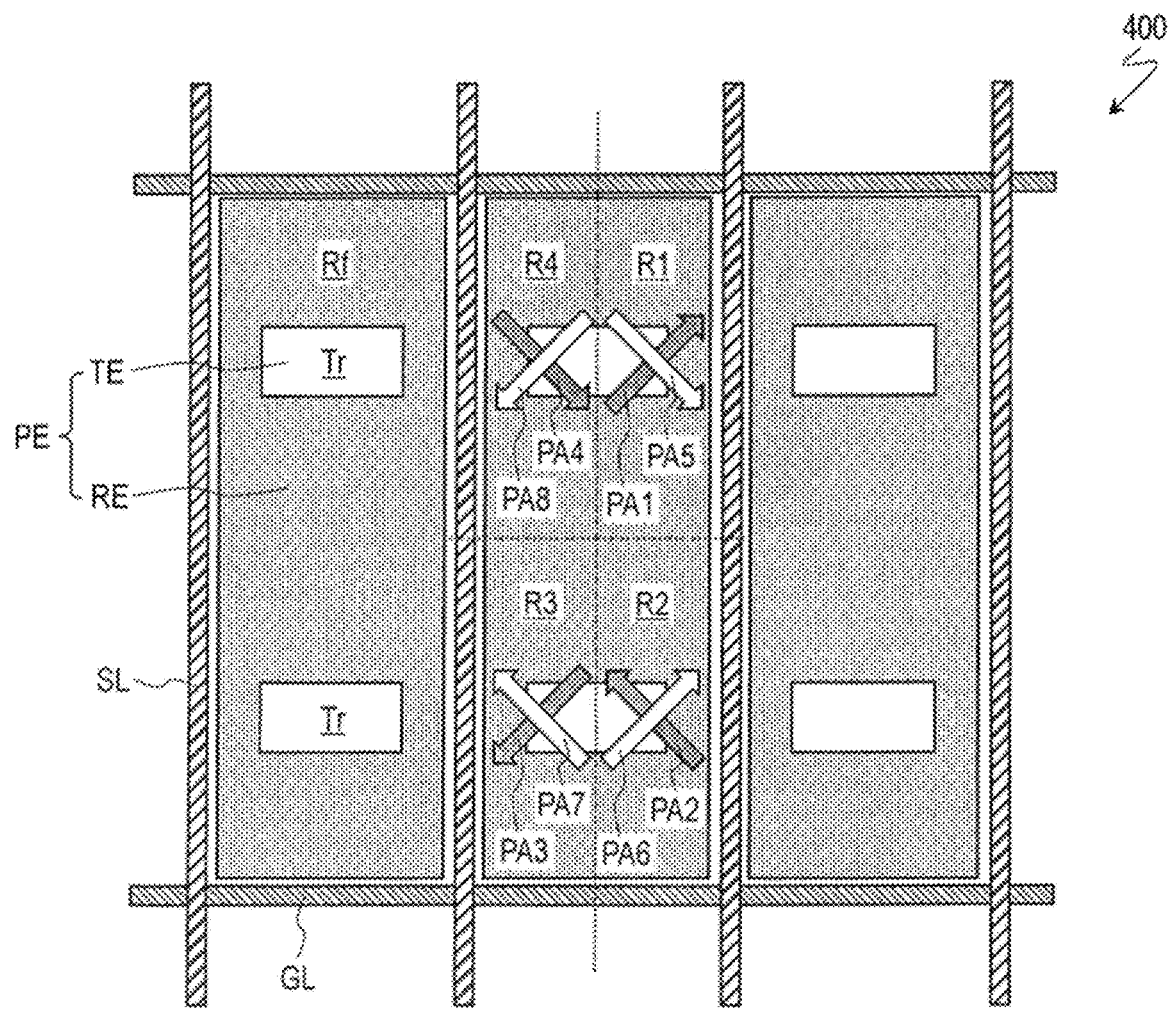
FIG. 29 is a plan view schematically illustrating yet another liquid crystal display device 400 according to an embodiment of the disclosure, illustrating a region corresponding to three pixels P.

A liquid crystal display device 400 according to a present embodiment will be described with reference to FIG. 29. FIG. 29 is a plan view schematically illustrating the liquid crystal display device 400.

The liquid crystal display device 400 is different from the liquid crystal display device 100 of the first embodiment in that four liquid crystal domains are formed in each of the reflective region Rf and the transmissive region Tr when a voltage is applied to the liquid crystal layer 30.

FIG. 29 illustrates pretilt azimuths PA1, PA2, PA3, and PA4 defined by the first vertical alignment film 14 of the TFT substrate 10 and pretilt azimuths PA5, PA6, PA7, and PA8 defined by the second vertical alignment film 24 of the counter substrate 20. As illustrated in FIG. 29, in the present embodiment, four different pretilt azimuths PA1, PA2, PA3, and PA4 are defined by the first vertical alignment film 14 in each pixel P. That is, the first vertical alignment film 14 has four regions that define different pretilt azimuths PA1, PA2, PA3, and PA4 in each pixel P. In addition, in each pixel P, four different pretilt azimuths PA5, PA6, PA7, and PA8 are defined by the second vertical alignment film 24. That is, the second vertical alignment film 24 has four regions that define different pretilt azimuths PA5, PA6, PA7, and PA8 in each pixel P. In the illustrated example, the pretilt azimuths by the first vertical alignment film 14 are different among an upper right (first alignment region) R1, a lower right (second alignment region) R2, a lower left (third alignment region) R3, and an upper left (fourth alignment region) R4 of the pixel P. Similarly, the pretilt azimuths by the second vertical alignment film 24 are different among the first alignment region R1, the second alignment region R2, the third alignment region R3, and the fourth alignment region R4 of the pixel P.

In the example illustrated in FIG. 29, among the pretilt azimuths PA1, PA2, PA3, and PA4 by the first vertical alignment film 14, the pretilt azimuth PA1 in the first alignment region R1 is a substantially 45° direction, and the pretilt azimuth PA2 in the second alignment region R2 is a substantially 135° direction. In addition, the pretilt azimuth PA3 in the third alignment region R3 is a substantially 225° direction, and the pretilt azimuth PA4 in the fourth alignment region R4 is a substantially 315° direction. Among the pretilt azimuths PA5, PA6, PA7, and PA8 by the second vertical alignment film 24, the pretilt azimuth PA5 in the first alignment region R1 is a substantially 315° direction, and the pretilt azimuth PA6 in the second alignment region R2 is a substantially 45° direction. In addition, the pretilt azimuth PA7 in the third alignment region R3 is a substantially 135° direction, and the pretilt azimuth PA8 in the fourth alignment region R4 is a substantially 225° direction.

Figure 30:
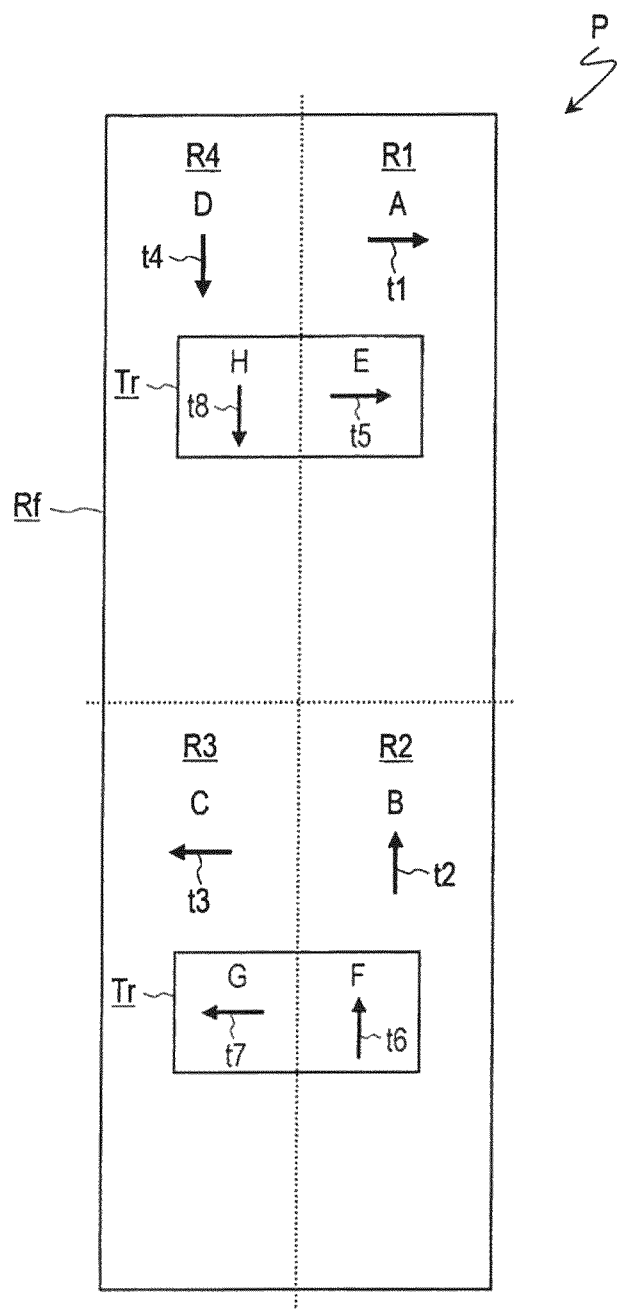
FIG. 30 is a diagram illustrating liquid crystal domains A to H formed in each pixel P of the liquid crystal display device 400.

The pretilt azimuths by the first vertical alignment film 14 and the pretilt azimuths by the second vertical alignment film 24 are set as described above, and thus, in the liquid crystal display device 400 of the present embodiment, when a voltage is applied to the liquid crystal layer 30, four liquid crystal domains are formed in each of the reflective region Rf and the transmissive region Tr. FIG. 30 is a diagram illustrating liquid crystal domains A to H formed in each pixel P.

As illustrated in FIG. 30, four liquid crystal domains A, B, C, and D are formed in the reflective region Rf, and four liquid crystal domains E, F, G, and H are formed in the transmissive region Tr. Reference alignment azimuths t1 and t5 of the liquid crystal domains A and E located in the first alignment region R1 are a substantially 0° direction, and reference alignment azimuths t2 and t6 of the liquid crystal domains B and F located in the second alignment region R2 are a substantially 90° direction. Reference alignment azimuths t3 and t7 of the liquid crystal domains C and G located in the third alignment region R3 are a substantially 180° direction, and reference alignment azimuths t4 and t8 of the liquid crystal domains D and H located in the fourth alignment region R4 are a substantially 270° direction. Note that the liquid crystal domain A and the liquid crystal domain E can be regarded as one liquid crystal domain, and the liquid crystal domain B and the liquid crystal domain F can be regarded as one liquid crystal domain. Similarly, the liquid crystal domain C and the liquid crystal domain G can be regarded as one liquid crystal domain, and the liquid crystal domain D and the liquid crystal domain H can be regarded as one liquid crystal domain.

As described above, in the present embodiment, the reflective region Rf includes a plurality of liquid crystal domains A, B, C, and D in which the reference alignment azimuths of the liquid crystal molecules 31 are different from each other. The transmissive region Tr includes a plurality of liquid crystal domains E, F, G, and H in which the reference alignment azimuths of the liquid crystal molecules 31 are different from each other. That is, each of the reflective region Rf and the transmissive region Tr is formed into a multi-domain (formed into four domains). This improves the viewing angle characteristics of the reflective display and the transmissive display. Hereinafter, a result of verifying an effect of improving the viewing angle characteristics for Example 6 having specifications shown in Tables 13 and 14 will be described.

TABLE 13

Example 6
Pretilt azimuth

| TFT substrate side | | | | Counter substrate side | | | |
|---|---|---|---|---|---|---|---|
| First alignment region | Second alignment region | Third alignment region | Fourth alignment region | First alignment region | Second alignment region | Third alignment region | Fourth alignment region |
| 45° | 135° | 225° | 315° | 315° | 45° | 135° | 225° |

TABLE 14

Example 6

| Configuration of front circular polarizer | Configuration of back circular polarizer |
|---|---|
| Linear polarizer: 45° | λ/4 plate with reverse wavelength dispersion (Re 140 nm): 0° |
| λ/4 plate with reverse wavelength dispersion (Re 140 nm): 90° | Linear polarizer: 135° |
| Negative C-plate (Rth 235 nm) | — |

As shown in Table 13, the pretilt azimuths defined by the first vertical alignment film 14 are the 45° direction, the 135° direction, the 225° direction, and the 315° direction in the first alignment region R1, the second alignment region R2, the third alignment region R3, and the fourth alignment region R4, respectively. The pretilt azimuths defined by the second vertical alignment film 24 are the 315° direction, the 45° direction, the 135° direction, and the 225° direction in the first alignment region R1, the second alignment region R2, the third alignment region R3, and the fourth alignment region R4, respectively.

As shown in Table 14, the front circular polarizer 40B includes a linear polarizer having an absorption axis set in the 45° direction, a λ/4 plate having the slow axis set in the 90° direction, and a negative C-plate in this order from the observer side. In addition, the back circular polarizer 40A includes a λ/4 plate having a slow axis set in the 0° direction and a linear polarizer having an absorption axis set in the 135° direction in this order from the observer side. The λ/4 plate of the front circular polarizer 40B and the λ/4 plate of the back circular polarizer 40A have reverse wavelength dispersion characteristics, and have the retardation Re of 140 nm in the in-plane direction of the panel. The retardation Rth of the negative C-plate of the front circular polarizer 40B in the thickness direction is 235 nm.

Figure 31:
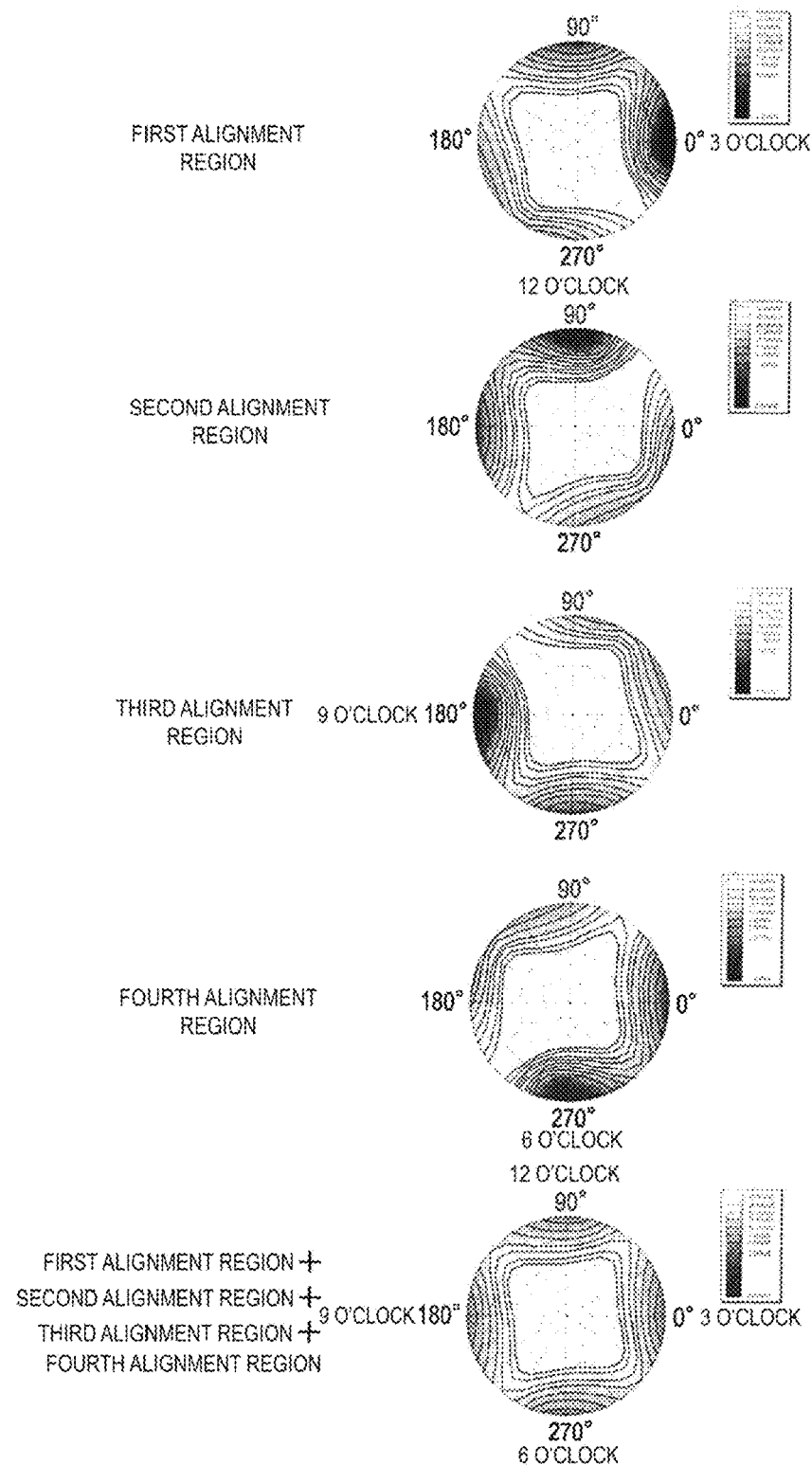
FIG. 31 is a diagram showing contrast viewing angle characteristics in Example 6 obtained by simulation calculation for reflective display.
Figure 32:
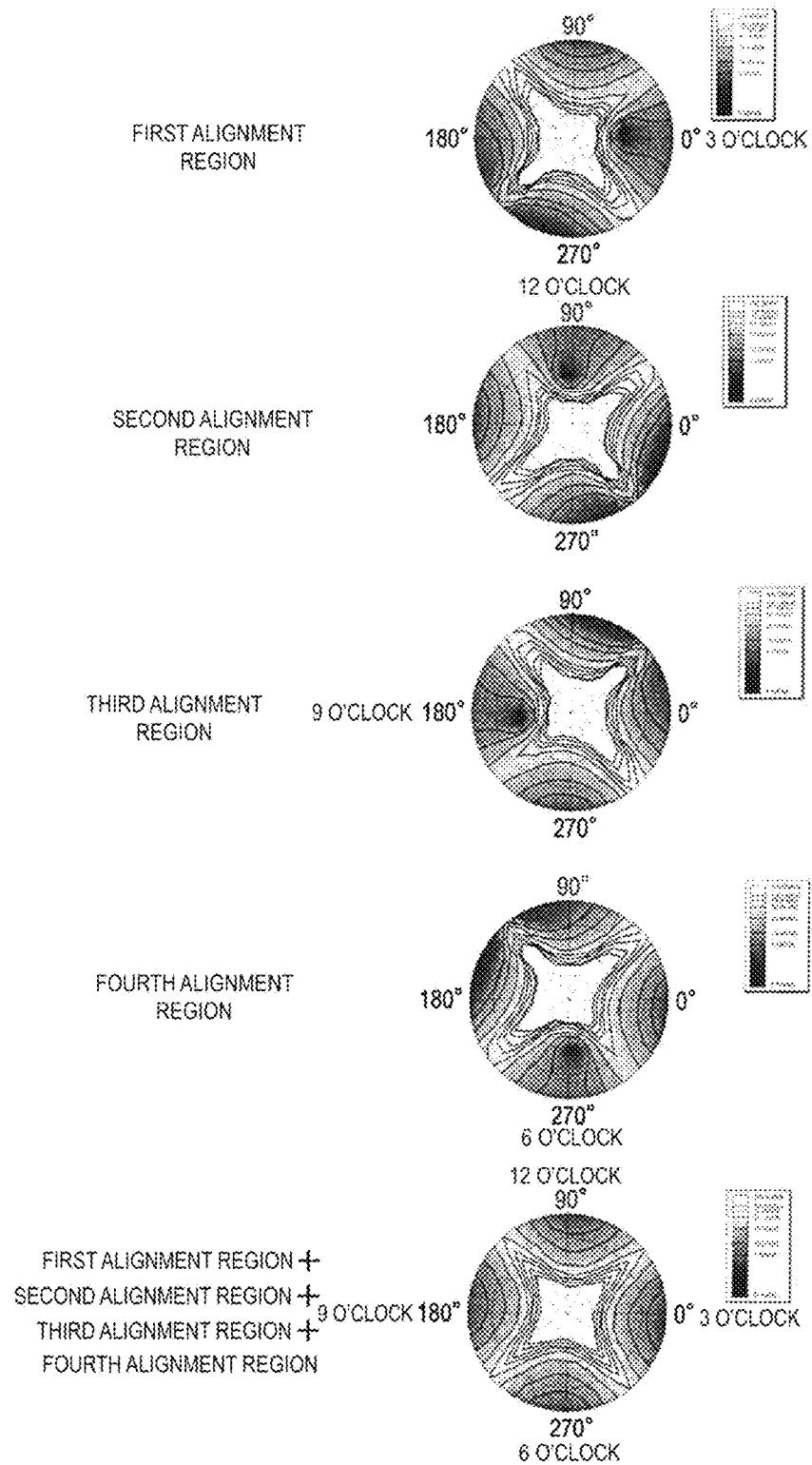
FIG. 32 is a diagram showing contrast viewing angle characteristics in Example 6 obtained by simulation calculation for transmissive display.

FIGS. 31 and 32 show contrast viewing angle characteristics of Example 6 for reflective display and transmissive display, respectively.

From FIG. 31, it can be seen that in the entire reflective region Rf having the four-domain structure, contrast viewing angles in the 3 o'clock direction, the 6 o'clock direction, the 9 o'clock direction, and the 12 o'clock direction are ameliorated as compared with the regions having the mono-domain structure (each of the first alignment region R1, the second alignment region R2, the third alignment region R3, and the fourth alignment region R4). From FIG. 32, it can be seen that in the entire transmissive region Tr having the four-domain structure, contrast viewing angles in the 3 o'clock direction, the 6 o'clock direction, the 9 o'clock direction, and the 12 o'clock direction are ameliorated as compared with the regions having the mono-domain structure (each of the first alignment region R1, the second alignment region R2, the third alignment region R3, and the fourth alignment region R4).

In this way, it was confirmed that the contrast viewing angle characteristics of both the reflective display and the transmissive display can be improved (ameliorated) by forming each of the reflective region Rf and the transmissive region Tr into four domains.

Fifth Embodiment

Figure 33:
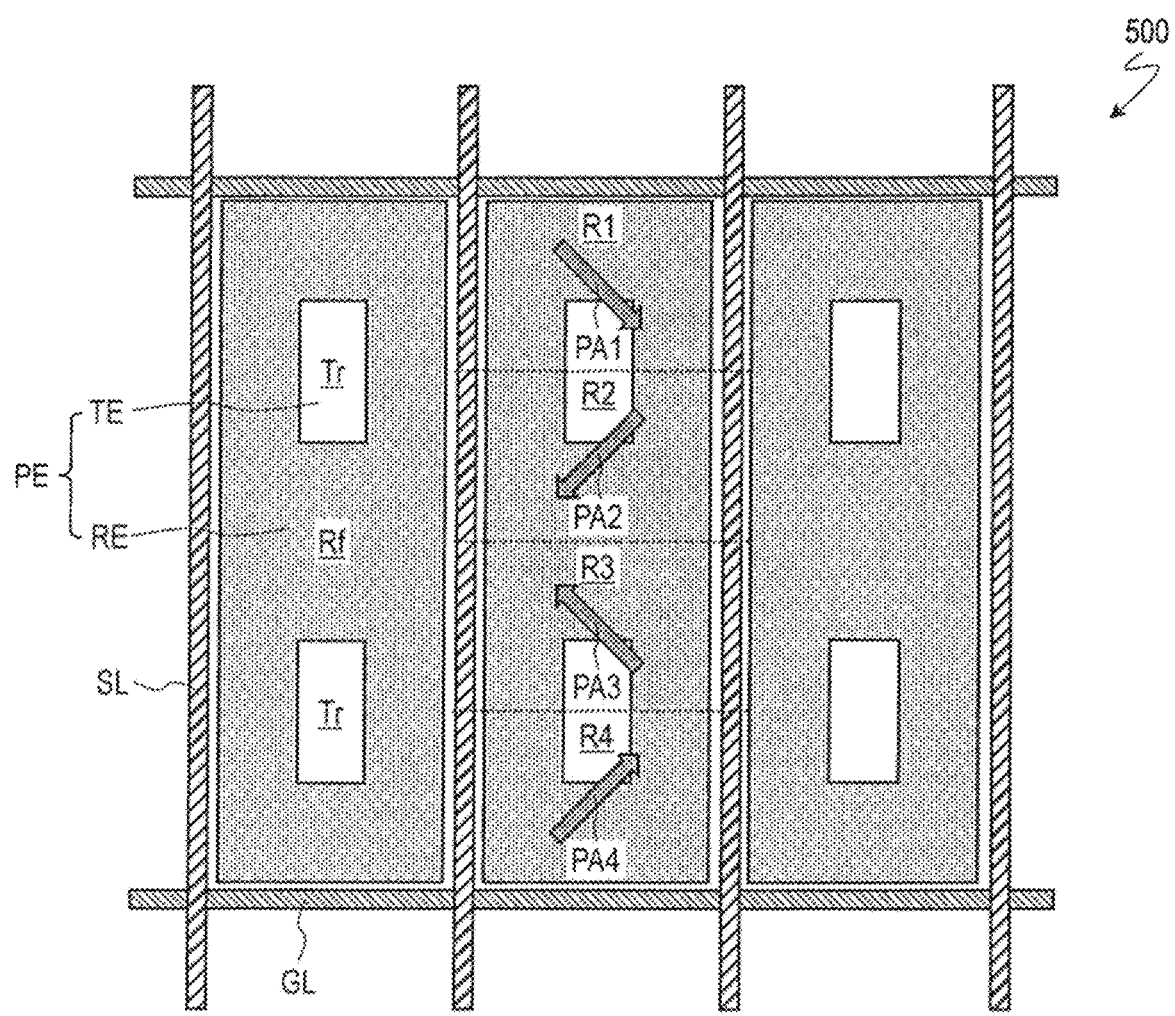
FIG. 33 is a plan view schematically illustrating yet another liquid crystal display device 500 according to an embodiment of the disclosure, illustrating a region corresponding to three pixels P.

A liquid crystal display device 500 according to a present embodiment will be described with reference to FIG. 33. FIG. 33 is a plan view schematically illustrating the liquid crystal display device 500. The following description will primarily focus on differences between the liquid crystal display device 500 and the liquid crystal display device 400 of the fourth embodiment.

The liquid crystal display device 500 is different from the liquid crystal display device 400 of the fourth embodiment in that the second vertical alignment film 24 of the counter substrate 20 is not subjected to photo-alignment treatment. That is, in the liquid crystal display device 500, only the first vertical alignment film 14 of the TFT substrate 10 is subjected to photo-alignment treatment.

The first alignment region R1, the second alignment region R2, the third alignment region R3, and the fourth alignment region R4 in the liquid crystal display device 500 are arranged in this order from the upper side to the lower side of the pixel P. As illustrated in FIG. 33, among the pretilt azimuths PA1, PA2, PA3, and PA4 by the first vertical alignment film 14, the pretilt azimuth PA1 in the first alignment region R1 is a substantially 315° direction, and the pretilt azimuth PA2 in the second alignment region R2 is a substantially 225° direction. The pretilt azimuth PA3 in the third alignment region R3 is a substantially 135° direction, and the pretilt azimuth PA4 in the fourth alignment region R4 is a substantially 45° direction.

Figure 34:
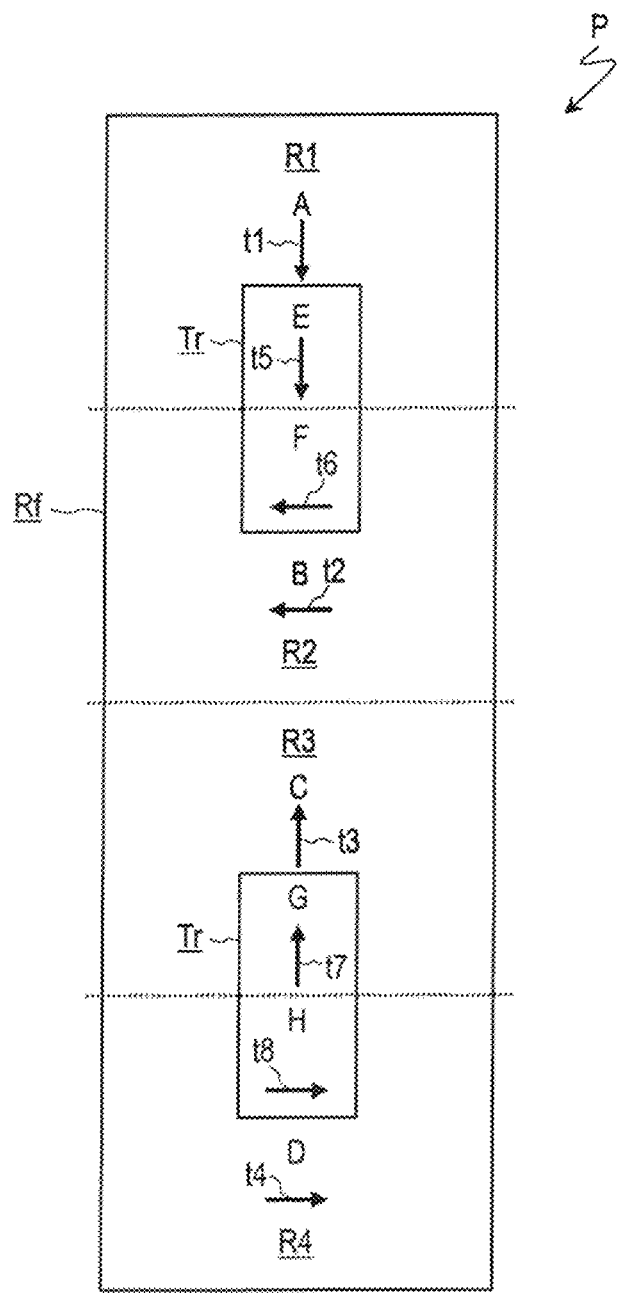
FIG. 34 is a diagram illustrating liquid crystal domains A to H formed in each pixel P of the liquid crystal display device 500.

The pretilt azimuth by the first vertical alignment film 14 is set as described above, and thus, in the liquid crystal display device 500 of the present embodiment, when a voltage is applied to the liquid crystal layer 30, four liquid crystal domains are formed in each of the reflective region Rf and the transmissive region Tr. FIG. 34 is a diagram illustrating liquid crystal domains A to H formed in each pixel P.

As illustrated in FIG. 34, four liquid crystal domains A, B, C, and D are formed in the reflective region Rf, and four liquid crystal domains E, F, G, and H are formed in the transmissive region Tr. Reference alignment azimuths t1 and t5 of the liquid crystal domains A and E located in the first alignment region R1 are a substantially 270° direction, and reference alignment azimuths t2 and t6 of the liquid crystal domains B and F located in the second alignment region R2 are a substantially 180° direction. Further, reference alignment azimuths t3 and t7 of the liquid crystal domains C and G located in the third alignment region R3 are a substantially 90° direction, and reference alignment azimuths t4 and t8 of the liquid crystal domains D and H located in the fourth alignment region R4 are a substantially 0° direction. Note that the liquid crystal domain A and the liquid crystal domain E can be regarded as one liquid crystal domain, and the liquid crystal domain B and the liquid crystal domain F can be regarded as one liquid crystal domain. Similarly, the liquid crystal domain C and the liquid crystal domain G can be regarded as one liquid crystal domain, and the liquid crystal domain D and the liquid crystal domain H can be regarded as one liquid crystal domain.

As described above, also in the present embodiment, the reflective region Rf includes a plurality of liquid crystal domains A, B, C, and D in which the reference alignment azimuths of the liquid crystal molecules 31 are different from each other. The transmissive region Tr includes a plurality of liquid crystal domains E, F, G, and H in which the reference alignment azimuths of the liquid crystal molecules 31 are different from each other. That is, each of the reflective region Rf and the transmissive region Tr is formed into a multi-domain (formed into four domains). This improves the viewing angle characteristics of the reflective display and the transmissive display. Hereinafter, a result of verifying an effect of improving the viewing angle characteristics of Example 7 having specifications shown in Tables 15 and 16 will be described.

TABLE 15

Example 7
Pretilt azimuth

| TFT substrate side | | | | Counter substrate side | | | |
|---|---|---|---|---|---|---|---|
| First alignment region | Second alignment region | Third alignment region | Fourth alignment region | First alignment region | Second alignment region | Third alignment region | Fourth alignment region |
| 315° | 225° | 135° | 45° | — | — | — | — |

TABLE 16

Example 7

| Configuration of front circular polarizer | Configuration of back circular polarizer |
|---|---|
| Linear polarizer: 45° | λ/4 plate with reverse wavelength dispersion (Re 140 nm): 0° |
| λ/4 plate with reverse wavelength dispersion (Re 140 nm): 90° | Linear polarizer: 1350 |
| Negative C-plate (Rth 190 nm) | — |

As shown in Table 15, the pretilt azimuths defined by the first vertical alignment film 14 are the 315° direction, the 225° direction, the 135° direction, and the 45° direction in the first alignment region R1, the second alignment region R2, the third alignment region R3, and the fourth alignment region R4, respectively. As shown in Table 16, the configurations of the front circular polarizer 40B and the back circular polarizer 40A of Example 7 are the same as those of the front circular polarizer 40B and the back circular polarizer 40A of Example 6 except that the retardation Rth of the negative C-plate of the front circular polarizer 40B in the thickness direction is 190 nm.

Figure 35:
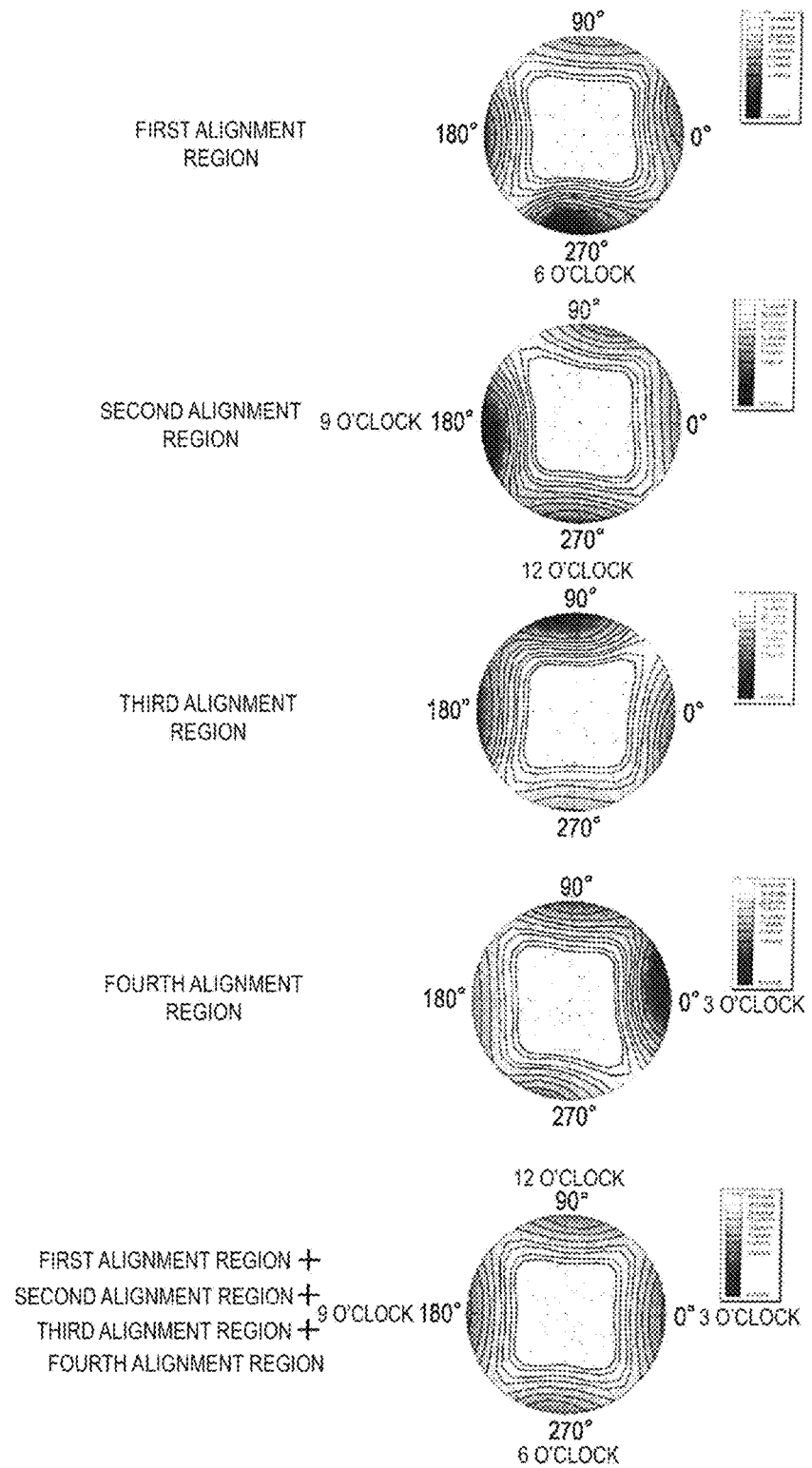
FIG. 35 is a diagram showing contrast viewing angle characteristics in Example 7 obtained by simulation calculation for reflective display.
Figure 36:
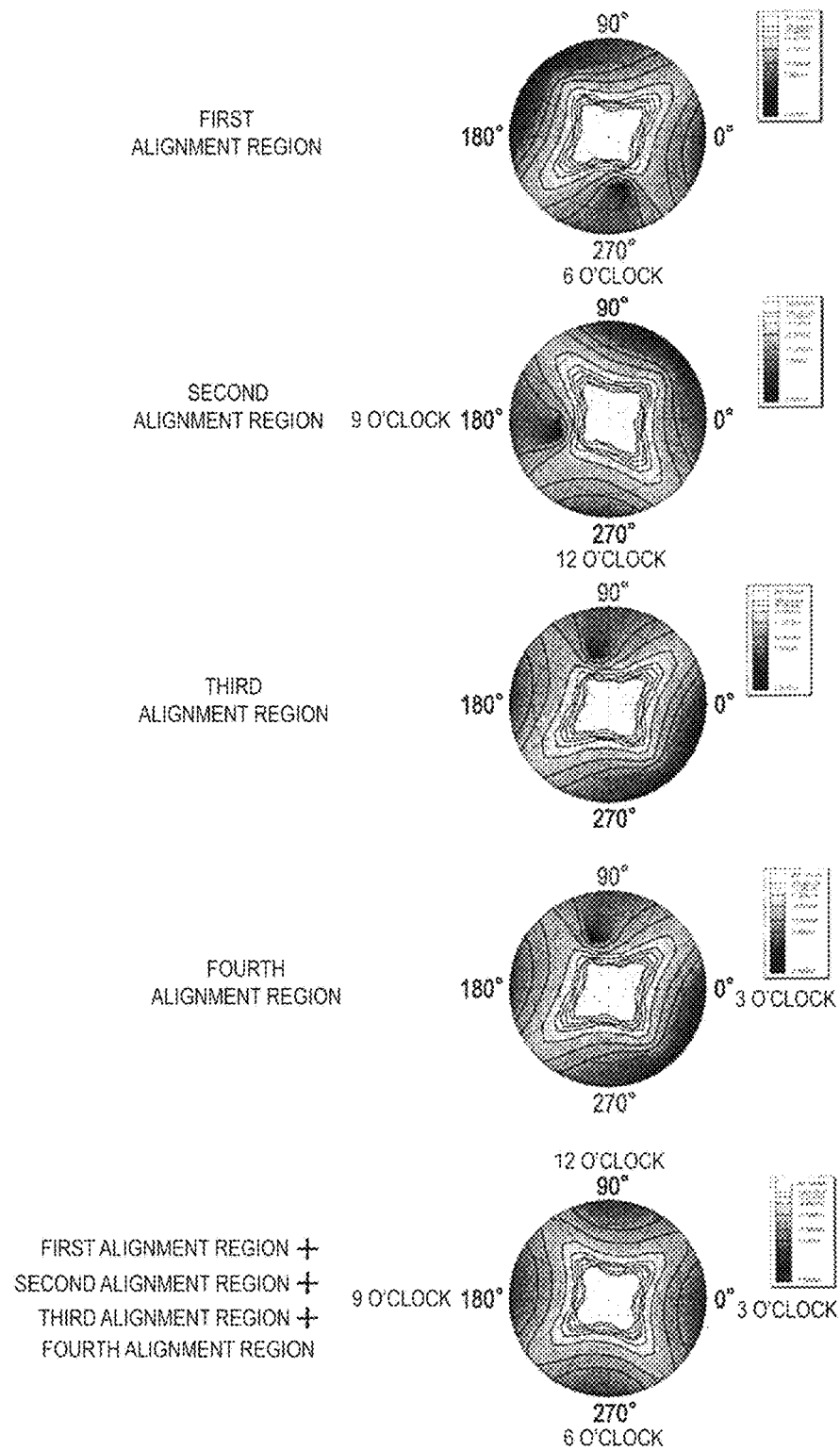
FIG. 36 is a diagram showing contrast viewing angle characteristics in Example 7 obtained by simulation calculation for transmissive display.

FIGS. 35 and 36 show contrast viewing angle characteristics of Example 7 for reflective display and transmissive display, respectively.

From FIG. 35, it can be seen that in the entire reflective region Rf having the four-domain structure, the contrast viewing angles in the 3 o'clock direction, the 6 o'clock direction, the 9 o'clock direction, and the 12 o'clock direction are ameliorated as compared with the region having the mono-domain structure (each of the first alignment region R1, the second alignment region R2, the third alignment region R3, and the fourth alignment region R4). In addition, from FIG. 36, it can be seen that in the entire transmissive region Tr having the four-domain structure, the contrast viewing angles in the 3 o'clock direction, the 6 o'clock direction, the 9 o'clock direction, and the 12 o'clock direction are ameliorated as compared with the region having the mono-domain structure (each of the first alignment region R1, the second alignment region R2, the third alignment region R3, and the fourth alignment region R4).

As described above, it was confirmed that even in a case where only the first vertical alignment film 14 of the TFT substrate 10 was subjected to the photo-alignment treatment, the contrast viewing angle characteristics of both the reflective display and the transmissive display can be improved (ameliorated) by forming each of the reflective region Rf and the transmissive region Tr into four domains.

Sixth Embodiment

Figure 37:
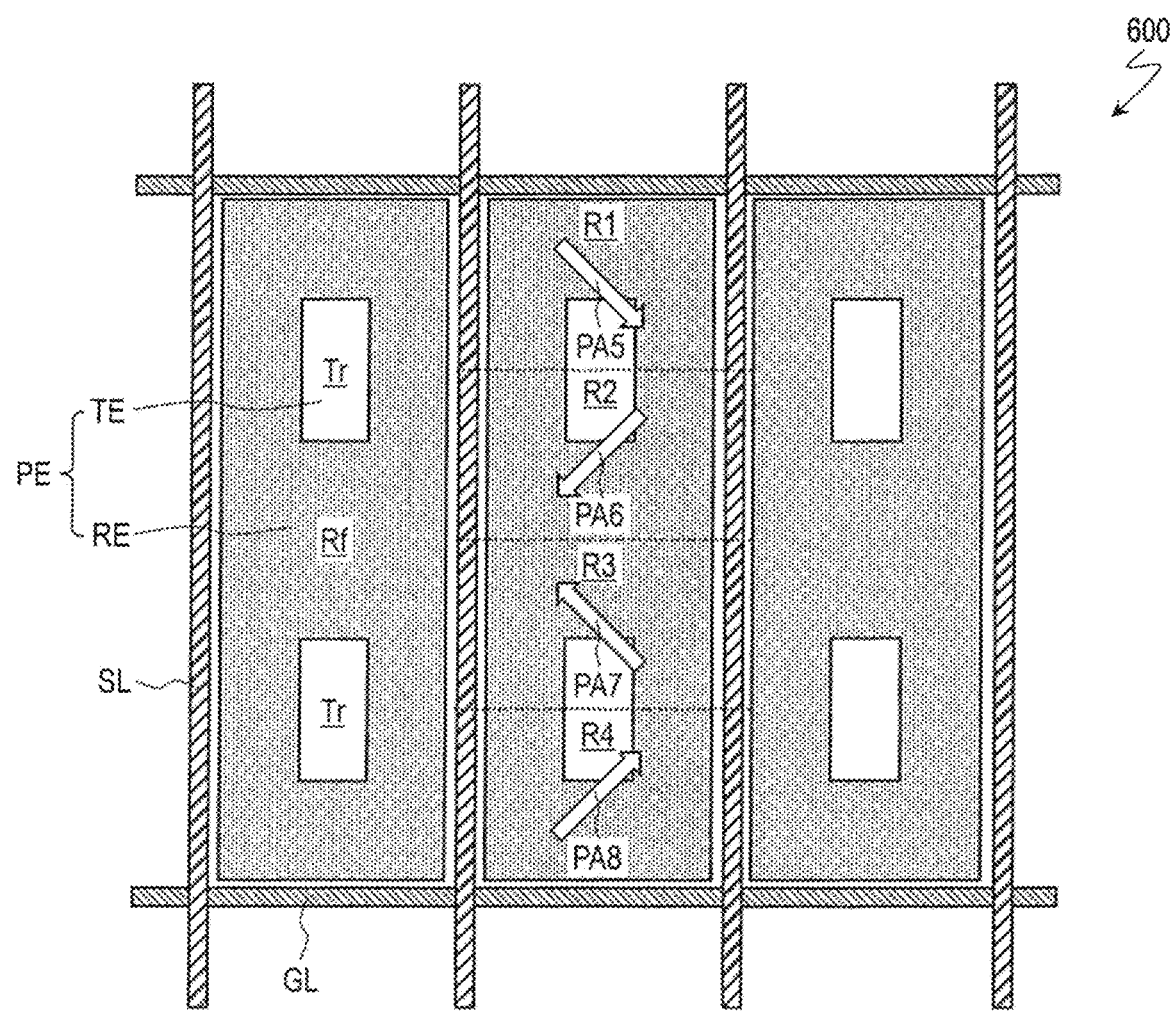
FIG. 37 is a plan view schematically illustrating yet another liquid crystal display device 600 according to an embodiment of the disclosure, illustrating a region corresponding to three pixels P.

A liquid crystal display device 600 of a present embodiment will be described with reference to FIG. 37. FIG. 37 is a plan view schematically illustrating the liquid crystal display device 600.

The liquid crystal display device 600 is different from the liquid crystal display device 400 of the fourth embodiment in that the first vertical alignment film 14 in the TFT substrate 10 is not subjected to photo-alignment treatment. That is, in the liquid crystal display device 600, only the second vertical alignment film 24 of the counter substrate 20 is subjected to photo-alignment treatment.

The first alignment region R1, the second alignment region R2, the third alignment region R3, and the fourth alignment region R4 in the liquid crystal display device 600 are arranged in this order from the upper side to the lower side of the pixel P. As illustrated in FIG. 37, among the pretilt azimuths PA5, PA6, PA7, and PA8 by the second vertical alignment film 24, the pretilt azimuth PA5 in the first alignment region R1 is a substantially 315° direction, and the pretilt azimuth PA6 in the second alignment region R2 is a substantially 225° direction. The pretilt azimuth PA7 in the third alignment region R3 is a substantially 135° direction, and the pretilt azimuth PA8 in the fourth alignment region R4 is a substantially 45° direction.

Figure 38:
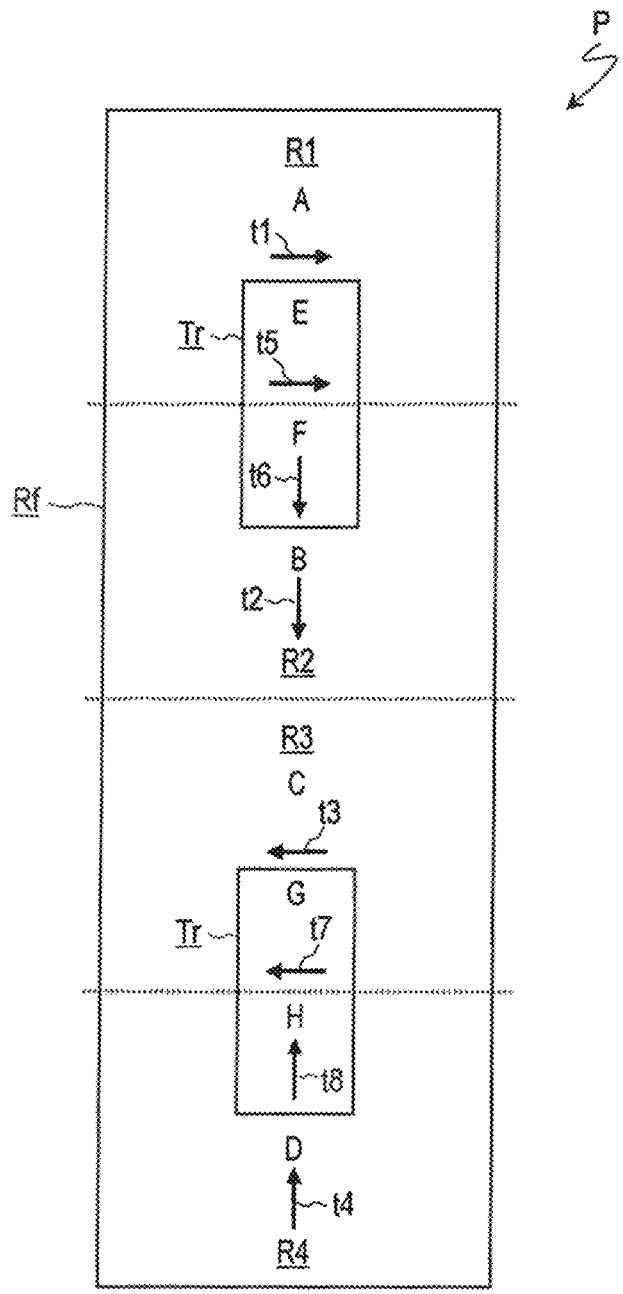
FIG. 38 is a diagram illustrating liquid crystal domains A to H formed in each pixel P of the liquid crystal display device 600.

The pretilt azimuths by the second vertical alignment film 24 are set as described above, and thus, four liquid crystal domains are formed in each of the reflective region Rf and the transmissive region Tr when a voltage is applied to the liquid crystal layer 30 in the liquid crystal display device 600 of the present embodiment. FIG. 38 is a diagram illustrating liquid crystal domains A to H formed in each pixel P.

As illustrated in FIG. 38, four liquid crystal domains A, B, C, and D are formed in the reflective region Rf, and four liquid crystal domains E, F, G, and H are formed in the transmissive region Tr. Reference alignment azimuths t1 and t5 of the liquid crystal domains A and E located in the first alignment region R1 are a substantially 0° direction, and reference alignment azimuths t2 and t6 of the liquid crystal domains B and F located in the second alignment region R2 are a substantially 270° direction. Reference alignment azimuths t3 and t7 of the liquid crystal domains C and G located in the third alignment region R3 are a substantially 180° direction, and reference alignment azimuths t4 and t8 of the liquid crystal domains D and H located in the fourth alignment region R4 are a substantially 90° direction. Note that the liquid crystal domain A and the liquid crystal domain E can be regarded as one liquid crystal domain, and the liquid crystal domain B and the liquid crystal domain F can be regarded as one liquid crystal domain. Similarly, the liquid crystal domain C and the liquid crystal domain G can be regarded as one liquid crystal domain, and the liquid crystal domain D and the liquid crystal domain H can be regarded as one liquid crystal domain.

As described above, also in the present embodiment, the reflective region Rf includes a plurality of liquid crystal domains A, B, C, and D in which the reference alignment azimuths of the liquid crystal molecules 31 are different from each other. The transmissive region Tr includes a plurality of liquid crystal domains E, F, G, and H in which the reference alignment azimuths of the liquid crystal molecules 31 are different from each other. That is, each of the reflective region Rf and the transmissive region Tr is formed into a multi-domain (formed into four domains). This improves the viewing angle characteristics of the reflective display and the transmissive display. Hereinafter, results of verifying an effect of improving the viewing angle characteristics for Example 8 having specifications shown in Tables 17 and 18 will be described.

TABLE 17

Example 8
Pretilt azimuth

| TFT substrate side | | | | Counter substrate side | | | |
|---|---|---|---|---|---|---|---|
| First alignment region | Second alignment region | Third alignment region | Fourth alignment region | First alignment region | Second alignment region | Third alignment region | Fourth alignment region |
| — | — | — | — | 315° | 225° | 135° | 45° |

TABLE 18

Example 8

| Configuration of front circular polarizer | Configuration of back circular polarizer |
|---|---|
| Linear polarizer: 45° | λ/4 plate with reverse wavelength dispersion (Re 140 nm): 0° |
| λ/4 plate with reverse wavelength dispersion (Re 140 nm): 90° | Linear polarizer: 135° |
| Negative C-plate (Rth 190 nm) | — |

As shown in Table 17, the pretilt azimuths defined by the second vertical alignment film 14 are a 315° direction, a 225° direction, a 135° direction, and a 45° direction in the first alignment region R1, the second alignment region R2, the third alignment region R3, and the fourth alignment region R4, respectively. As shown in Table 18, the configurations of the front circular polarizer 40B and the back circular polarizer 40A of Example 7 are the same as those of the front circular polarizer 40B and the back circular polarizer 40A of Example 6 except that the retardation Rth of the negative C-plate of the front circular polarizer 40B in the thickness direction is 190 nm.

Figure 39:
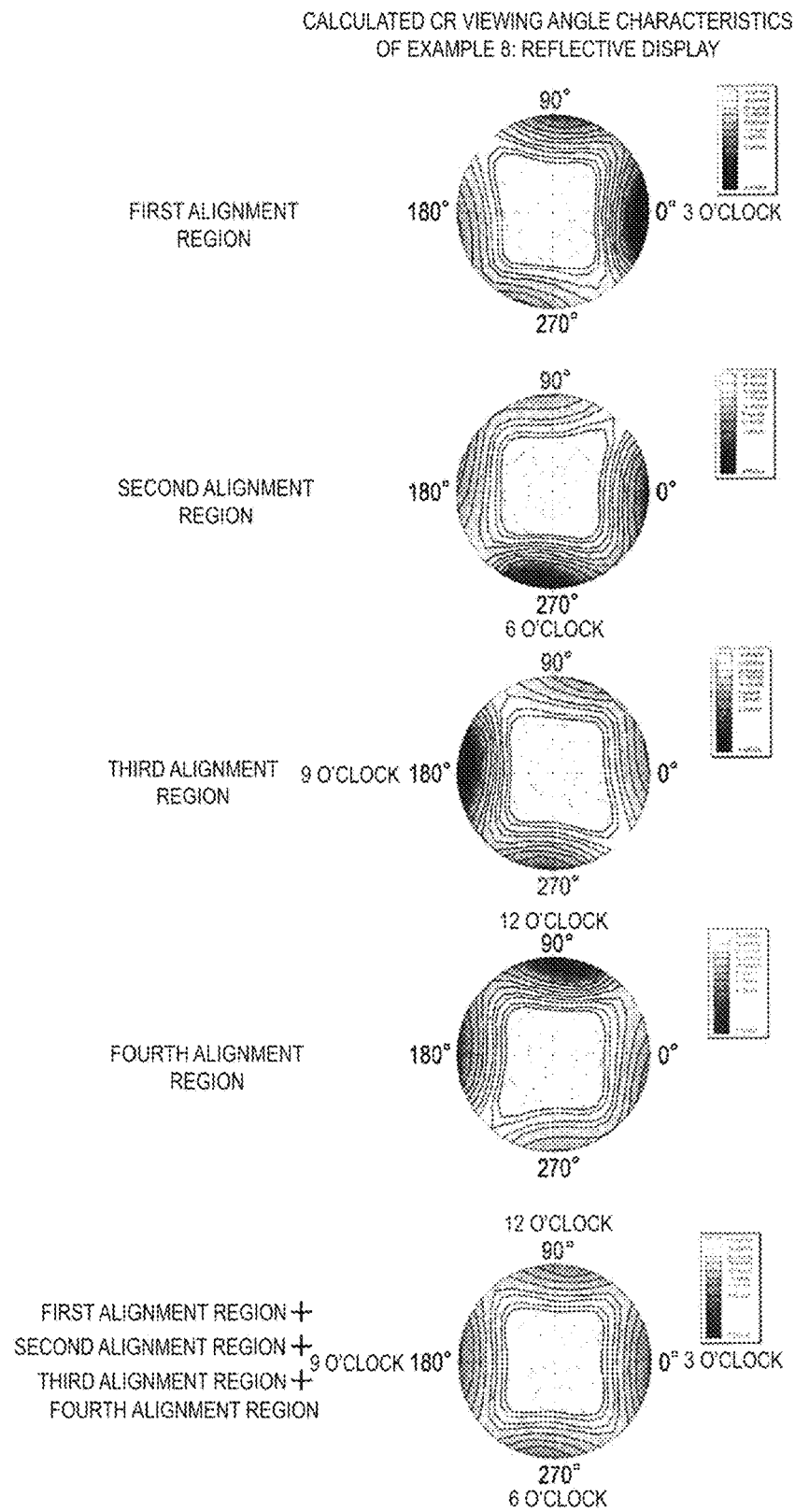
FIG. 39 is a diagram showing contrast viewing angle characteristics in Example 8 obtained by simulation calculation for reflective display.
Figure 40:
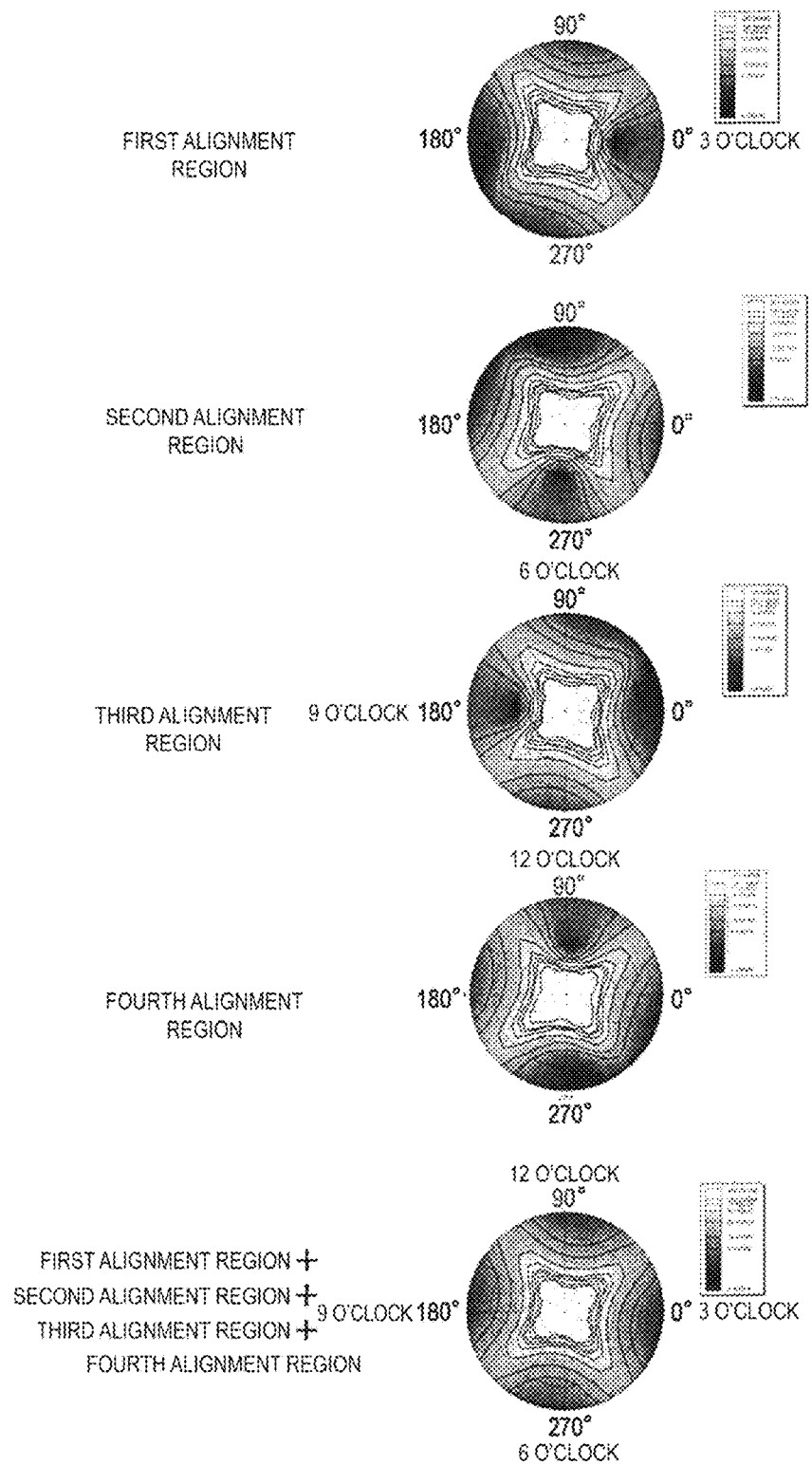
FIG. 40 is a diagram showing contrast viewing angle characteristics in Example 8 obtained by simulation calculation for transmissive display.

FIGS. 39 and 40 show contrast viewing angle characteristics of Example 8 for reflective display and transmissive display, respectively.

From FIG. 39, it can be seen that in the entire reflective region Rf having the four-domain structure, the contrast viewing angles in the 3 o'clock direction, the 6 o'clock direction, the 9 o'clock direction, and the 12 o'clock direction are improved as compared with the regions having the mono-domain structure (the first alignment region R1, the second alignment region R2, the third alignment region R3, and the fourth alignment region R4). It can also be seen from FIG. 40 that in the entire transmissive region Tr having the four-domain structure, the contrast viewing angles in the 3 o'clock direction, the 6 o'clock direction, the 9 o'clock direction, and the 12 o'clock direction are ameliorated as compared with the region having the mono-domain structure (each of the first alignment region R1, the second alignment region R2, the third alignment region R3, and the fourth alignment region R4).

As described above, it was confirmed that even in a case where only the second vertical alignment film 24 of the counter substrate 20 was subjected to the photo-alignment treatment, the contrast viewing angle characteristics of both the reflective display and the transmissive display can be improved (ameliorated) by forming each of the reflective region Rf and the transmissive region Tr into four domains.

Seventh Embodiment

Figure 41:
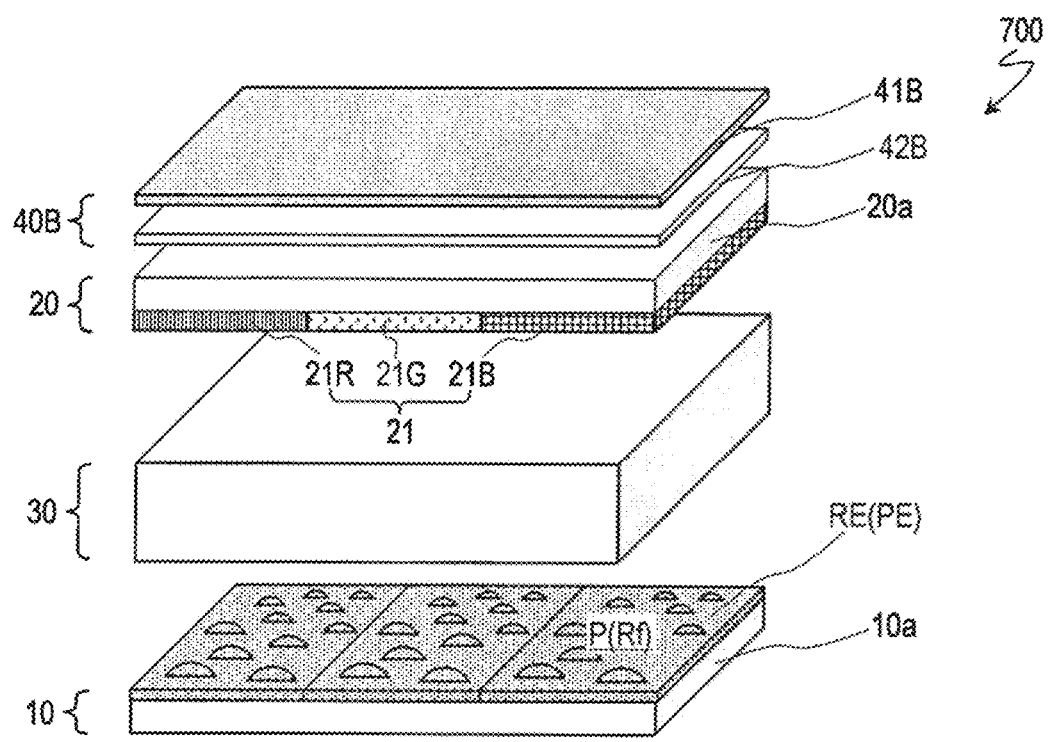
FIG. 41 is an exploded perspective view schematically illustrating yet another liquid crystal display device 700 according to an embodiment of the disclosure.

A liquid crystal display device 700 of a present embodiment will be described with reference to FIG. 41. FIG. 41 is an exploded perspective view schematically illustrating the liquid crystal display device 700.

While the liquid crystal display devices 100 to 600 of the first to sixth embodiments are transflective LCDs, the liquid crystal display device 700 of the present embodiment is a reflective LCD. That is, the pixel P of the liquid crystal display device 700 includes the reflective region Rf, but does not include the transmissive region Tr. The liquid crystal display device 700 may have substantially the same configuration as the liquid crystal display devices 100 to 600 of the first to sixth embodiments except that the back circular polarizer 40A and the backlight 50 are not provided and the reflective region Rf includes no transmissive region Tr.

Accordingly, also in the present embodiment, the reflective region Rf includes a plurality of liquid crystal domains in which reference alignment azimuths of the liquid crystal molecules 31 are different from each other, whereby the viewing angle characteristics of reflective display are improved. In addition, the liquid crystal layer 30 contains a chiral agent, and thus, it is possible to realize a moderate alignment azimuth angle change and a sufficient twist angle such that the wavelength dispersion of retardation of the liquid crystal layer 30 becomes small, further increase the reflectivity, and suppress the yellow shift of the reflection chromaticity. Furthermore, the reflective electrode RE includes silver or a silver alloy, and thus, bright reflective display can be realized, and the photo-alignment treatment can be suitably performed on the first vertical alignment film 14 of the TFT substrate 10.

Two-Stage Electrode Structure

Figure 42:
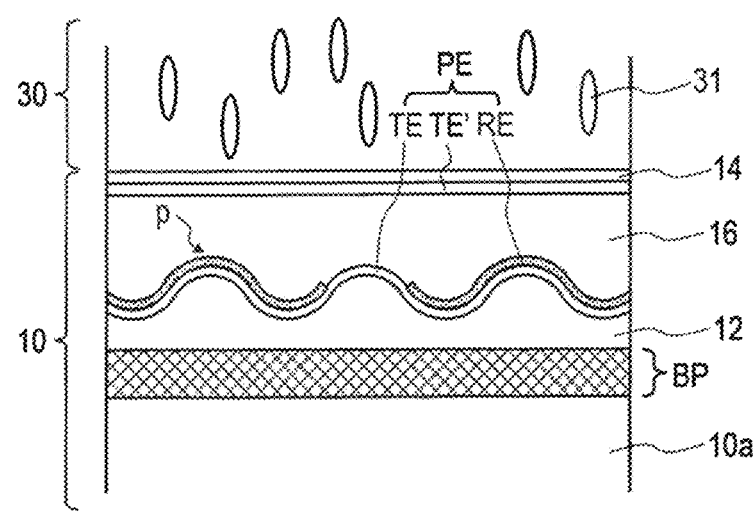
FIG. 42 is a cross-sectional view illustrating a preferred example of a structure of a pixel electrode PE.

FIG. 42 illustrates a preferred example of the structure of the pixel electrode PE. In the example illustrated in FIG. 42, the TFT substrate 10 includes an organic insulating layer (flattening layer) 16 covering the reflective electrode RE, and an additional transparent electrode TE' provided on the organic insulating layer 16. Hereinafter, the transparent electrode TE located below the organic insulating layer 16 will be referred to as a "first transparent electrode", and the transparent electrode TE' located above the organic insulating layer 16 will be referred to as a "second transparent electrode".

The organic insulating layer 16 may include a photosensitive resin material, for example. The uneven surface structure of the reflective electrode RE is flattened by the organic insulating layer 16.

The second transparent electrode TE' includes a transparent conductive material. As the transparent conductive material for forming the second transparent electrode TE', the transparent conductive material exemplified as the material of the first transparent electrode TE can be suitably used. The second transparent electrode TE' is electrically connected to the first transparent electrode TE and the reflective electrode RE in a contact hole (not illustrated) formed in the organic insulating layer 16. That is, the second transparent electrode TE' is electrically connected to the TFT 11 via the first transparent electrodes TE and the reflective electrodes RE. Accordingly, the pixel electrode PE includes the second transparent electrode TE' in addition to the first transparent electrode TE and the reflective electrode RE. The first vertical alignment film 14 is formed on the second transparent electrode TE'.

Hereinafter, the structure of the pixel electrode PE illustrated in FIG. 42 will be referred to as a "two-stage electrode structure", and the structure of the pixel electrode PE illustrated in FIG. 4 will be referred to as a "single-stage electrode structure". The pixel electrode PE having the two-stage electrode structure has the following advantages as compared with the pixel electrode PE having the single-stage electrode structure.

Figure 43A:
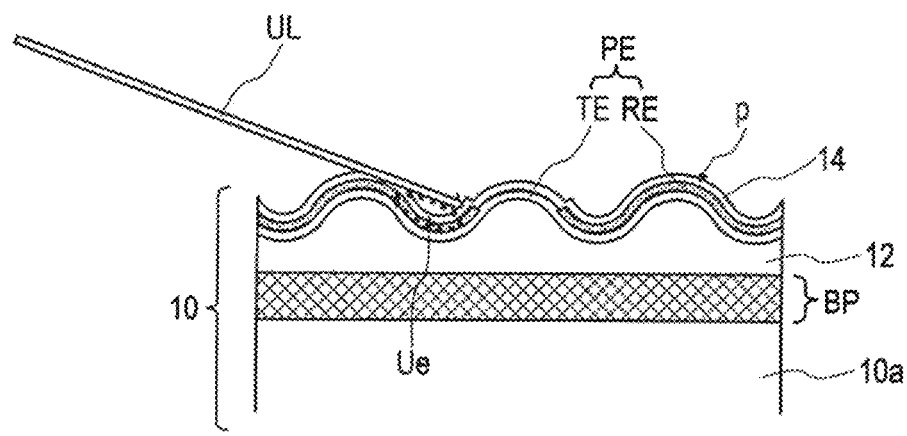
FIG. 43A is a view illustrating a state of photo-alignment treatment in a TFT substrate 10 having a pixel electrode PE of a single-stage electrode structure.
Figure 43B:
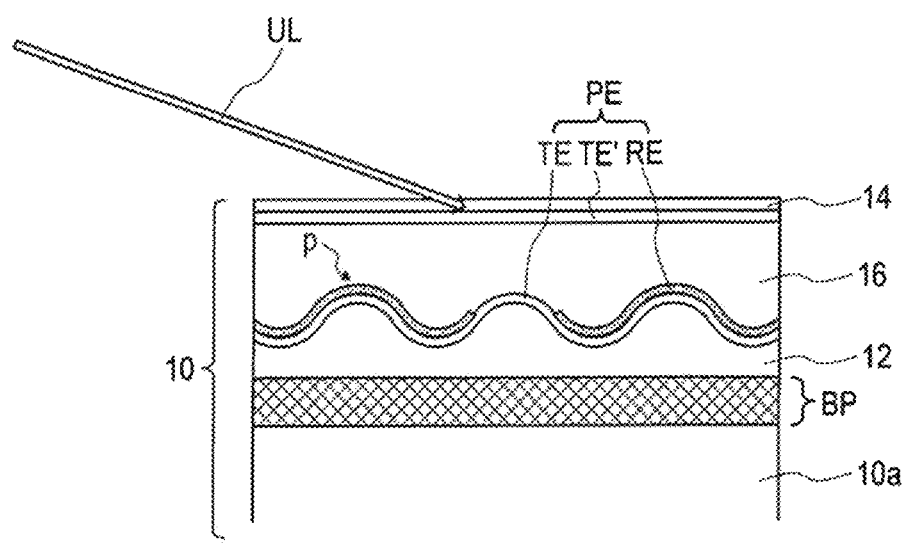
FIG. 43B is a view illustrating a state of photo-alignment treatment in a TFT substrate 10 having a pixel electrode PE of a two-stage electrode structure.

FIG. 43A is a view illustrating a state of photo-alignment treatment in the TFT substrate 10 having the pixel electrode PE of the single-stage electrode structure, and FIG. 43B is a view illustrating a state of the photo-alignment treatment in the TFT substrate 10 having the pixel electrode PE of the two-stage electrode structure.

As described above, in the photo-alignment treatment, irradiation with ultraviolet light UL is performed from a direction inclined with respect to the substrate normal direction (for example, a direction forming an angle of 5° to 70°). At this time, in a case where the pixel electrode PE has the single-stage electrode structure, depending on a depth of a recessed portion and a height of a protruding portion in the uneven surface structure of the reflective electrode RE and an irradiation angle of the ultraviolet light UL, the ultraviolet light UL may be blocked by the reflective electrode RE to generate unexposed portions Ue in the first vertical alignment film 14, as illustrated in FIG. 43A.

On the other hand, in a case where the pixel electrode PE has the two-stage electrode structure, the uneven surface structure of the reflective electrode RE is flattened by the organic insulating layer 16, and thus, there is no possibility that the unexposed portions Ue are generated in the first vertical alignment film 14 due to the blocking of the ultraviolet light UL by the reflective electrode RE, as illustrated in FIG. 43B. Accordingly, the alignment regulating force by the first vertical alignment film 14 can be further improved.

INDUSTRIAL APPLICABILITY

The embodiments of the disclosure can be broadly applied to a liquid crystal display device (that is, a reflective liquid crystal display device and a transflective liquid crystal display device) including a reflective region in which pixels perform display in a reflection mode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device, comprising:
a first substrate;
a second substrate facing the first substrate and located closer to an observer than the first substrate; and
a liquid crystal layer provided between the first substrate and the second substrate, and further including
a plurality of pixels arrayed in a matrix shape including a plurality of rows and a plurality of columns,
the liquid crystal display device configured to perform display in a twisted vertical alignment mode in which liquid crystal molecules are in a vertical alignment state when no voltage is applied to the liquid crystal layer and the liquid crystal molecules are in a twisted alignment state when a predetermined voltage is applied to the liquid crystal layer,
wherein each of the plurality of pixels includes a reflective region in which display is performed in a reflection mode,
the first substrate includes a reflective electrode including a portion located in the reflective region, and a first vertical alignment film located on a surface on the liquid crystal layer side,
the second substrate includes a second vertical alignment film located on a surface on the liquid crystal layer side,
the liquid crystal layer includes a liquid crystal material having negative dielectric anisotropy, and a chiral agent,
the reflective electrode includes silver or a silver alloy,
at least one of the first vertical alignment film and the second vertical alignment film is a photo-alignment film including an alignment film material having a reaction wavelength with respect to light of at least 313 nm, and
the reflective region includes a plurality of liquid crystal domains in which reference alignment azimuths of liquid crystal molecules are different from each other.

2. The liquid crystal display device according to claim 1, wherein each of the plurality of pixels further includes a transmissive region in which display is performed in a transmission mode, and
the transmissive region includes a plurality of additional liquid crystal domains in which reference alignment azimuths of liquid crystal molecules are different from each other.

3. The liquid crystal display device according to claim 1, wherein only one vertical alignment film of the first vertical alignment film and the second vertical alignment film is subjected to photo-alignment treatment, and
the one vertical alignment film subjected to photo-alignment treatment includes a plurality of regions defining pretilt azimuths different from each other in each of the plurality of pixels.

4. The liquid crystal display device according to claim 3, wherein only the first vertical alignment film of the first vertical alignment film and the second vertical alignment film is subjected to photo-alignment treatment.

5. The liquid crystal display device according to claim 4, wherein the second substrate does not include a black matrix.

6. The liquid crystal display device according to claim 1, wherein the first substrate further includes a transparent conductive layer formed on the reflective electrode.

7. The liquid crystal display device according to claim 6, wherein the transparent conductive layer includes indium tin oxide, and
the transparent conductive layer has a thickness of 0.04 nm or more and 12.28 nm or less.

8. The liquid crystal display device according to claim 7, wherein the transparent conductive layer has a thickness of 1.99 nm or more and 9.64 nm or less.

9. The liquid crystal display device according to claim 6, wherein the transparent conductive layer includes indium zinc oxide, and
the transparent conductive layer has a thickness of 0.04 nm or more and 12.74 nm or less.

10. The liquid crystal display device according to claim 9, wherein the transparent conductive layer has a thickness of 2.02 nm or more and 10.11 nm or less.

11. The liquid crystal display device according to claim 1, further comprising a pair of circular polarizers opposed to each other with at least the liquid crystal layer interposed between the pair of circular polarizers,
wherein each of the pair of circular polarizers includes a $\lambda/4$ plate having reverse wavelength dispersion characteristics.

12. The liquid crystal display device according to claim 1, wherein the reflective electrode has an uneven surface structure, and
the first substrate further includes
a thin film transistor provided in each of the plurality of pixels,
an organic insulating layer covering the reflective electrode, and
a transparent electrode provided on the organic insulating layer and including a transparent conductive material, the transparent electrode being electrically connected to the thin film transistor.

* * * * *